US011081904B1

(12) United States Patent
Barhoumi et al.

(10) Patent No.: US 11,081,904 B1
(45) Date of Patent: Aug. 3, 2021

(54) METHODS, SYSTEMS AND INSTALLATIONS FOR THE COMPRESSION, EXPANSION AND/OR STORAGE OF A GAS

(71) Applicant: GREEN-Y ENERGY AG, Burgdorf (CH)

(72) Inventors: Rafik Barhoumi, Burgdorf (CH); Patrick Baumann, Olten (CH); Dominik Schnarwiler, Sursee (CH)

(73) Assignee: GREEN-Y ENERGY AG, Hasle bei Burgdorf (CH)

( * ) Notice: Subject to any disclaimer, the term of this patent is extended or adjusted under 35 U.S.C. 154(b) by 0 days.

(21) Appl. No.: 17/055,978

(22) PCT Filed: May 16, 2019

(86) PCT No.: PCT/EP2019/062592
§ 371 (c)(1),
(2) Date: Nov. 16, 2020

(87) PCT Pub. No.: WO2019/219801
PCT Pub. Date: Nov. 21, 2019

(30) Foreign Application Priority Data

May 16, 2018 (CH) ..................... 00609/18

(51) Int. Cl.
*H02J 15/00* (2006.01)
*F15B 1/027* (2006.01)
(Continued)

(52) U.S. Cl.
CPC ............ *H02J 15/006* (2013.01); *F15B 1/027* (2013.01); *F15B 11/08* (2013.01); *F17C 5/06* (2013.01); *F17C 7/00* (2013.01); *F15B 2201/3152* (2013.01); *F15B 2211/20569* (2013.01); *F15B 2211/7051* (2013.01); *F17C 2205/0323* (2013.01); *F17C 2227/0135* (2013.01); *F17C 2227/03* (2013.01)

(58) Field of Classification Search
CPC ................. F15B 1/027; F15B 11/068; F15B 2211/20569; F15B 2211/7051; H02J 15/006
See application file for complete search history.

(56) References Cited

U.S. PATENT DOCUMENTS 5,169,295 A * 12/1992 Stogner ................. F04B 9/1174
417/339
8,667,788 B2 * 3/2014 Kenway .................. H02P 27/06
60/415

(Continued)

FOREIGN PATENT DOCUMENTS

WO          9306367 A1      4/1993

OTHER PUBLICATIONS

International Search Report and Written Opinion of PCT/EP2019/062592 dated Sep. 6, 2019.

(Continued)

*Primary Examiner* — Thomas E Lazo
(74) *Attorney, Agent, or Firm* — Polsinelli PC

(57) ABSTRACT

This method is used to manage a pressure accumulator (1) as a component of an energy storage system, consisting of a work machine (4), a collecting tank (7), a displacement apparatus (6) and a pressure accumulator (1) for storing a pressurised gaseous medium. The pressure accumulator (1) is partially filled with a liquid medium so as to be able to control the gas storage volume therewith. Feeding compressed gas (3) into the pressure accumulator (1) involves removing liquid (2). Removing compressed gas (3) from the pressure accumulator (1) involves feeding in liquid (2) so that the storage pressure is kept under control as necessary, in particular is kept constant. To this end, one pressurised unit of gas (3) is introduced into the pressure accumulator (1) with the removal of one unit of liquid (2) from the pressure accumulator (1) by means of the displacement (Continued)

Figure 1:
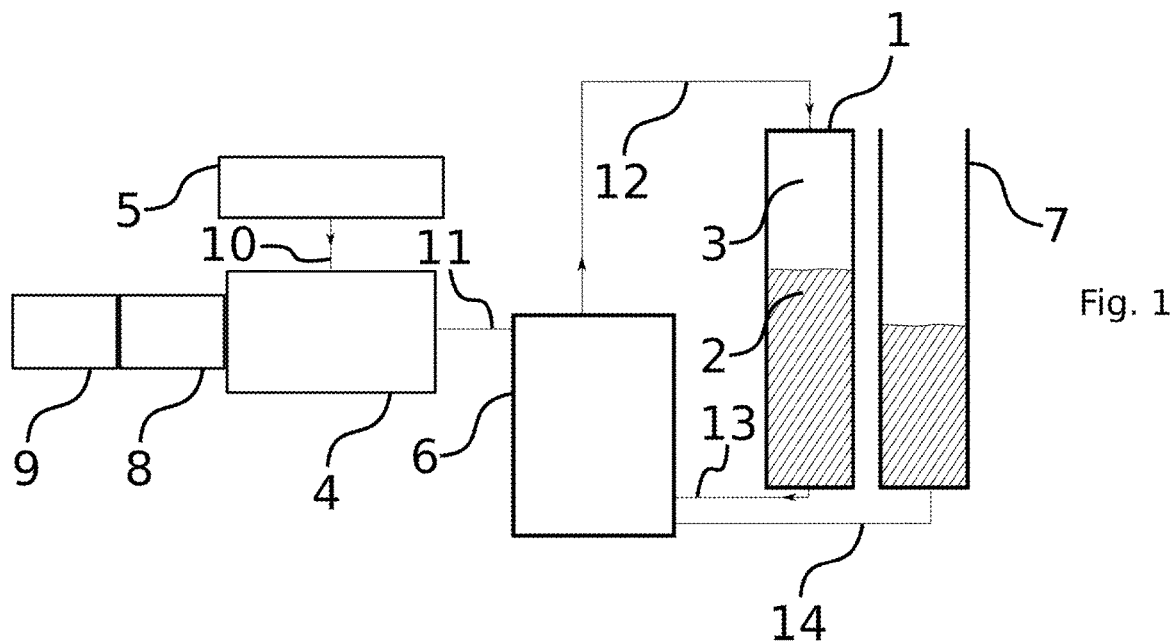

apparatus (6) and vice versa. The present method and the present arrangement make it possible to fill the pressure accumulator (1) completely with and to empty the pressured storage unit (1) completely of pressurised gas (3) at a controllable pressure, which leads to improved utilisation of the pressure accumulator volume and thus increases the energy density of the energy storage system. The method further makes it possible to operate the energy storage system at a constant operating point, thus increasing the efficiency of the individual components and of the entire system, and minimising the compression and expansion processes in the pressure accumulator (1).

11 Claims, 56 Drawing Sheets

(51) Int. Cl.
*F17C 5/06* (2006.01)
*F17C 7/00* (2006.01)
*F15B 11/08* (2006.01)

(56) References Cited

U.S. PATENT DOCUMENTS

| | | | |
|---|---|---|---|
| 9,260,966 B2* | 2/2016 | Ingersoll | F02C 6/16 |
| 9,562,521 B2* | 2/2017 | Yogev | F03G 6/06 |
| 9,611,868 B2* | 4/2017 | Kenway | H02J 1/00 |
| 10,683,742 B2* | 6/2020 | Elmer | E21B 43/168 |
| 2014/0250880 A1 | 9/2014 | Ingersoll et al. | |
| 2016/0025111 A1 | 1/2016 | Kenway et al. | |

OTHER PUBLICATIONS

Translation of International Search Report of of PCT/EP2019/062592 dated Sep. 6, 2019.
International Preliminary Report on Patentability Chapter II of PCT/EP2019/062592 dated Sep. 30, 2020.
Translation of International Preliminary Report on Patentability Chapter II of PCT/EP2019/062592 dated Sep. 30, 2020.

* cited by examiner

METHODS, SYSTEMS AND INSTALLATIONS FOR THE COMPRESSION, EXPANSION AND/OR STORAGE OF A GAS

CROSS-REFERENCE TO RELATED APPLICATIONS

This application is a national stage entry of PCT/EP2019/062592 filed May 16, 2019, which claims priority benefit to CH 00609/18 filed May 16, 2018, each of which is expressly incorporated herein in its entirety.

This method is used to manage a pressure storage tank as a component of an energy storage system, consisting of a working machine, a collecting basin for receiving liquid, a shifting device and a pressure reservoir for storing a pressurized gaseous medium. The pressure reservoir is filled to a certain extent with a liquid medium in order to be able to control the gas storage volume, whereby the charging of the pressure reservoir with pressurized gas is accompanied by the withdrawal of liquid. The withdrawal of pressurized gas from the pressure storage tank is accompanied by the charging of liquid, in particular so that the pressure storage tank pressure is kept constant by introducing a pressurized unit of gas with the unit of liquid withdrawn from the pressure storage tank into the pressure storage tank by means of the shifting device. Conversely, a unit of gas to be removed from the pressure storage tank is conveyed out of the pressure storage tank by the unit of liquid introduced into the pressure storage tank by means of the shifting device. This method or arrangement makes it possible to fill and empty the pressure storage tank completely with pressurized gas, which leads to a better utilization of the pressure storage volume and thus increases the energy density of the energy storage system. In addition, the pressure fluctuations in the pressure storage tank are minimized, which reduces the loads on the pressure storage tank and minimizes the heat flows into and out of the pressure storage tank. The working machine can be optimized for one operating point, independent of the filling level of the pressure storage tank, which brings further advantages.

Energy storage systems, such as a battery or a pumped storage power station, are used to store energy that is made available again in times of high energy demand. Energy storage is established in conventional energy production and is increasingly required for the generation of renewable, electric power in order to prevent overcapacities in the generation and distribution of electricity. Since, for example, the solar and wind energy generated depends on local weather conditions and can therefore be adjusted poorly or not at all to the current energy demand, possibilities for energy storage are in demand.

Storage systems that store energy in the form of a pressurized gas use energy generated during off-peak periods to compress a gaseous medium, primarily ambient air, and store the pressurized gas in a pressure storage tank. The energy stored in the pressure storage tank can be recovered by using the pressurized gas to drive an expansion machine, which for example drives a generator. This concept is known in various forms as CAES, an abbreviation for Compressed Air Energy Storage. In the following description of the invention, the term "air" may be used, although a wide variety of gaseous media can of course be used in accordance with the invention, such as natural gas taken from the pipeline network and stored under higher pressure in a pressure storage tank, which is later expanded to the pressure of the pipeline network. In general, gas withdrawn from a first reservoir is compressed by increasing the pressure and stored in a second reservoir which has an increased pressure level compared to the first reservoir, and/or gas withdrawn from the second reservoir is expanded and fed to a third reservoir which is at a lower pressure level than the second reservoir, this "third reservoir" may also be the first reservoir.

During the compression of air, almost all of the compression energy used is converted into heat, which is removed from the compressed air either during compression or afterwards in order to store the compressed air at moderate temperatures. If the heat dissipation occurs mainly during compression, the compressed air heats up less than if the heat is dissipated from the air only after compression. Depending on the maximum temperature difference of the air (difference between the temperature of the air at the beginning of compression and the maximum temperature during compression), it is spoken of isothermal compression (heat is largely dissipated during compression and the temperature difference remains minimal), polytropic compression (heat is partially dissipated during compression and the temperature difference lies between the minimum and maximum difference) or adiabatic compression (heat is largely dissipated after compression, resulting in a maximum temperature difference). The same applies to the expansion of compressed air, except that here the heat flow is reversed. If heat is added to the compressed air during the expansion, the air cools down less than if heat is only added to the air before or after the expansion, whereby the air experiences a maximum temperature difference. A difference in the design of the different CAES concepts occurs in where and at what temperature difference the heat flows are dissipated before, during and/or after compression, where the heat for the expansion of the compressed air comes from, and at what temperature difference the heat is supplied to the air before, during and/or after expansion of the air.

Besides the type of compression and expansion (isothermal, polytropic, adiabatic/single or multi-stage/with reversible working machine or with a compressor and expansion machine separately, under combustion of fuels), CAES concepts differ in the type of the pressure storage concept used. Here, a distinction is made as to whether a constant or variable pressure storage volume is used. If a constant pressure storage volume is charged or discharged with compressed air, the pressure of the compressed air in the pressure storage changes linearly with the stored amount of compressed air. This requires a working machine that can adapt to the storage pressure and usually prevents the complete emptying of the pressure storage tank, since the working machine can only work in a certain pressure range. As a result, a certain amount of compressed air must always remain in the pressure storage tank in order not to fall below the minimum working pressure of the working machine. Depending on the pressure storage tank, the pressure may only fluctuate within a certain range in order not to overload the pressure storage tank, which also makes it impossible to completely empty the pressure storage tank. The thermal heat flows into and out of the pressure storage tank are also not negligible, since the compressed air in the pressure storage tank is also compressed or expanded during filling and emptying.

When loading or unloading a pressure storage tank with variable storage tank volume, the pressure change of the compressed air in the pressure storage tank can be controlled. This is usually done with the aim of keeping the pressure of the air in the pressure storage tank constant or at least within a certain range during filling or discharging of the pressure storage tank. A constant storage pressure makes it possible to fill and empty the pressure storage tank completely with compressed air without having to adjust the operating parameters of the working machine to the filling level. In addition, the pressure storage tank experiences no or only minimal pressure fluctuations, which reduces the load on the pressure storage tank. Heat flows into and out of the pressure storage tank are also minimized.

During the realization of the different concepts different technical problems arise, which are shown in the following. DE19803002892/U.S. Pat. No. 4,392,354, for example, reveal an arrangement of a partially water-filled pressure storage tank in which the pressure of the compressed air in the pressure storage tank is kept constant by a water column. In order to absorb the displaced water when the pressure storage tank is loaded with compressed air, a collecting basin must be located at the upper end of the water column. At a storage pressure of 60 bar, for example, the water column must be 600 m high, which leads to a geographical dependency for the pressure storage tank.

US20120174569 A1/U.S. Pat. No. 9,109,512 B2 show an arrangement with a higher collecting basin and a hydraulically driven 2-stage piston compressor/expander. When emptying the pressure storage tank, the hydrostatic pressure of the water column maintains the minimum pressure in the pressure storage tank. To bring the pressure storage tank to a higher pressure level than the difference in height between the pressure storage tank and the collecting basin allows, only the collecting basin has to be isolated from the pressure storage tank. As soon as the pressure in the pressure storage tank corresponds to the hydrostatic pressure of the water column when the pressure storage tank is discharged, the collecting basin is reconnected to the pressure storage tank and keeps the pressure above the minimum storage pressure when the pressure storage tank is further emptied. Here, too, there is a geographical dependency for a higher-lying collecting basin.

US20120305411A1/U.S. Pat. No. 8,801,332B2 shows a construction of a pressure storage tank, which is installed under water. At the lower end of the pressure storage tank there is an opening through which the water is pressed into the pressure storage tank by the hydrostatic pressure. Compressed air is led into or out of the tank by a working machine located above the water level. There are further versions of underwater (constant) pressure storage tanks, for example in the form of an air-filled balloon which is kept under water. All these configurations depend on the geography and the pressure tank experiences a buoyancy force due to the stored compressed air, which has to be compensated to keep the pressure storage tank under water.

Figure 6:
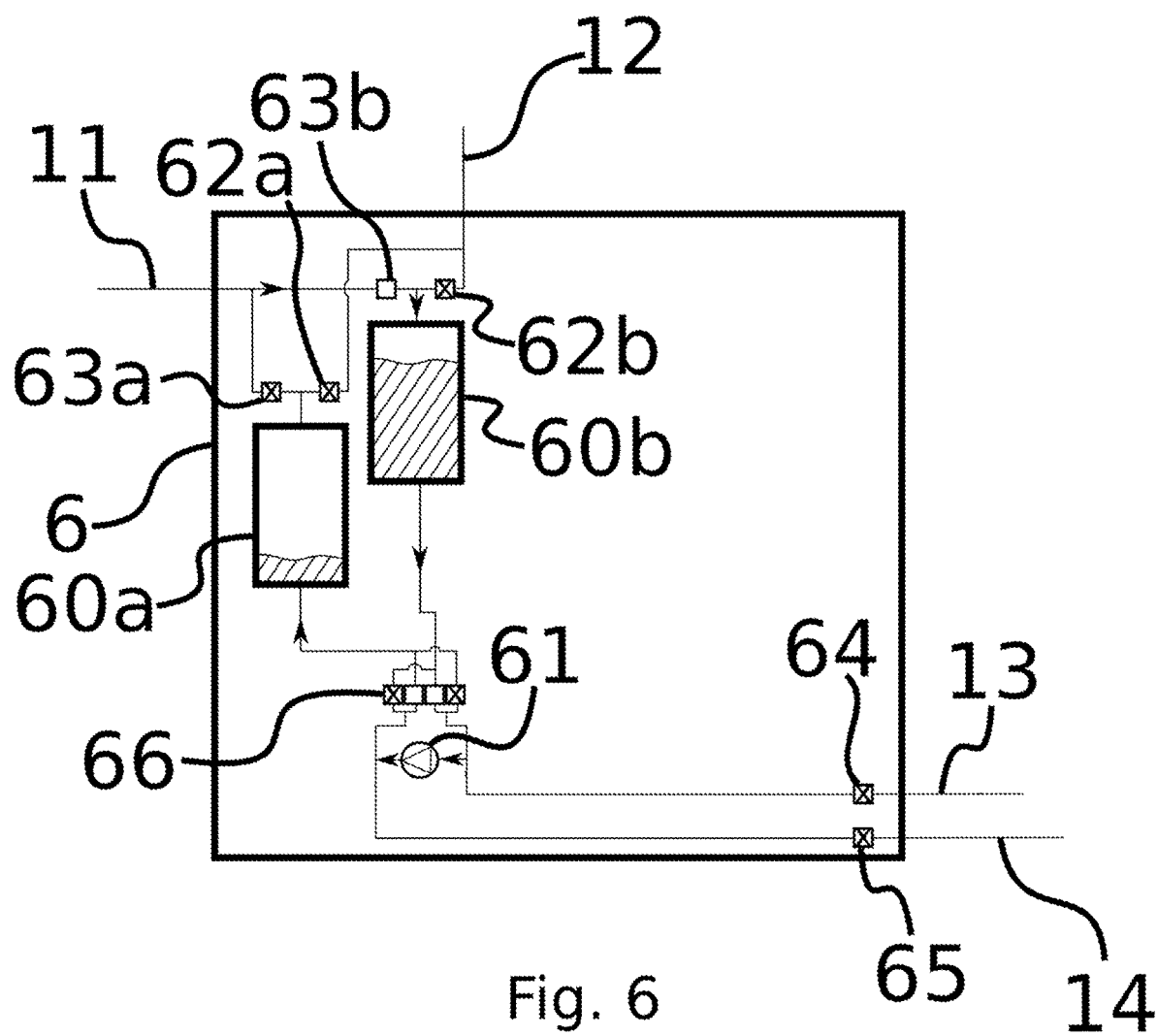

Furthermore, a system is known from the state of the art according to WO1993006367A1 in which two washed out salt caverns are partly filled with liquid and have a fluidic connection on the liquid and gas side. Such salt stocks for the leaching of salt caverns only exist in very few selected geographical areas. The system can only be set up and operated in such regions and is therefore very limited in its implementation. When filling the deeper-lying cavern with compressed air, the pressure fluctuation in the cavern is reduced by the simultaneous removal of liquid. The system is dependent on a higher-lying collecting basin and the two caverns must be located at different depths, which corresponds to a geographical dependency. If the existing height difference is too small, i.e. the hydrostatic pressure is lower than the pressure in the lower-lying cavern, the pressure in the cavern is regulated with a liquid motor or a liquid pump. This fluid motor or fluid pump reduces the overall efficiency and the power input or output of the system. The system according to WO1993006367A1, and in particular the design example according to FIG. 6, is generally dependent on a significant difference in height between the pressure reservoir 4, the "shifting reservoir" 5 and the collecting basin 21. In order to use the hydrostatic pressure of a column of liquid to apply the process in an analogous manner and to achieve a technically usable energy density for the storage of energy, a height difference of over 100 meters is necessary. This means that an energy density of a minimum sensible order of magnitude of 1 kWh/m$^3$ can be achieved. In addition, this is a closed air system in which a hermetically sealed volume of air, viewed over the two caverns, is compressed to store energy, which has a number of disadvantages. A closed air system generally has a significantly lower energy density than open air systems at the same operating pressure, since the total air mass is predefined and the introduction of additional air mass into the system is not possible. This results in a system with lower energy density at the same operating pressure. In open air systems, on the other hand, air mass can be added or removed repeatedly from the system by means of a cyclic process.

In order to eliminate the geographical dependency or the required altitude difference, the pressure in the pressure storage tank can be controlled with a liquid, as shown in WO2012160311A2, by charging the pressure storage tank with compressed air and expanding the liquid from the pressure storage tank by means of a liquid motor into a collecting basin, which does not have to have an altitude difference. Conversely, when taking compressed air out of the pressure storage tank, liquid is pumped from the collecting basin into the pressure storage tank to control the pressure in the pressure storage tank. This has the disadvantage that the overall efficiency and the total power consumption of the system (in relation to the installed air compressor/expander power and liquid motor/pump power) becomes smaller, because when compressing air and filling the pressure storage tank, liquid must be expanded from the pressure reservoir at the same time and vice versa when expanding air, liquid must be pumped into the pressure storage tank at the same time.

The teachings of WO2008023901 A1/US20090200805 A1/U.S. Pat. No. 7,663,255 B2 eliminate the geographical dependency and the problem of power and efficiency reduction by an additional liquid pump/motor, because in addition to the first pressure storage tank, which is partially filled with a liquid and connected to the air compressor/expander, a second pressure storage tank must be available, which again must be partially filled with a liquid. This second pressure storage tank is hermetically sealed on the gas side and connected to the first pressure storage tank via a line, so that when the first pressure storage tank is loaded with compressed air, a liquid pump built into the line pumps liquid from the first to the second pressure storage tank, where it compresses the enclosed gas. When the first pressure tank is empty, i.e. filled with liquid, the gas trapped in the second pressure storage tank is at the minimum system pressure. When the first pressure storage tank is filled with compressed air and the liquid has been pumped into the second pressure storage tank, the pressure in the second pressure tank is several times higher than in the first pressure tank. The second pressure storage tank can store little energy in relation to the maximum operating pressure and its volume, which makes the system expensive.

Accordingly, the task of the present invention is to create a structurally simple, inexpensive and reliable pressure storage system which is capable of controlling the pressure of the compressed air in the pressure storage tank during the loading or unloading of the pressure storage tank with compressed air with a liquid, firstly, without having to rely on the hydrostatic pressure of a column of liquid (higher level collecting basin or underwater storage tank), that means no height difference between two containers is necessary, and secondly, no hermetically sealed gas cushion in one or more pressure storage tanks and/or containers is necessary, and thirdly, without the disadvantage of the above-mentioned reduction in power and efficiency, that means that for the shifting of liquid only the overcoming of a pressure difference caused by friction and flow losses as well as a pressure difference caused by a possibly existing height difference is necessary, and with the advantage of a high energy density in the system, and with good control over the heat flows into and out of the system, which complements the actual pressurized storage system with an efficient and flexible heat or cold generation.

This task is solved by a pressurized storage system according to the characteristics of patent claim 1 for a process and according to the characteristics of patent claim 8 for an installation for carrying out the process.

The property of controlling the pressure in the pressure storage tank during filling with compressed gas or withdrawal of compressed gas with a liquid, in particular to keep it constant, firstly, without having to rely on the hydrostatic pressure of a column of liquid (higher level collecting basin or underwater storage tank), that means no height difference between two containers is necessary, and secondly, no hermetically sealed gas cushion in one or more pressure storage tanks and/or containers is necessary, and thirdly, without the disadvantage of the above-mentioned reduction in power and efficiency, that means that for the shifting of liquid only the overcoming of a pressure difference caused by friction and flow losses as well as a pressure difference caused by a possibly existing height difference is necessary, we designate in the following also as when required low-power filling of the pressure storage with compressed gas or when required low-power withdrawal of compressed gas from the pressure storage, or in general when required low-power displacement of compressed gas into or out of the pressure storage. The system does not depend on any height difference, but can, for example, work with a height difference between two containers of 10 meters, which may be due to a requirement for a specific installation site. With this height difference of 10 meters, a hydrostatic pressure of 1 bar can be built up from a water-liquid column, which is technically not usable for energy storage due to the low energy density. The maximum energy density that can be achieved by this hydrostatic pressure of 1 bar is given when the collecting basin or the lower pressure level is at 1 bar ambient pressure and the storage pressure can be doubled with the hydrostatic pressure from 1 bar to 2 bar. Then the following energy density results:

$$\text{Energy density} = p_2 \cdot \left( \frac{p_1}{p_2} - 1 + \ln \frac{p_2}{p_1} \right) = 2\,bar \cdot \left( \frac{1\,bar}{2\,bar} - 1 + \ln \frac{2\,bar}{1\,bar} \right) =$$

$$200000\,\text{Pa} \cdot \left( \frac{100000\,\text{Pa}}{200000\,\text{Pa}} - 1 + \ln \frac{200000\,\text{Pa}}{100000\,\text{Pa}} \right) \cdot \frac{1}{3600000} \frac{kWh}{J} =$$

$$0{,}011 \frac{kWh}{m^3}$$

This low energy density is not technically usable to store energy. Technically useful energy densities for energy storage start at around 1 kWh/m³. Systems that achieve a reasonable energy density in this order of magnitude with hydrostatic pressure are dependent on significant height differences above 100 meters. Therefore, these existing processes, systems and the equipment necessary for the implementation of compression, expansion and/or storage of a gas can be clearly distinguished from such known systems. Furthermore, the displacement or shifting of compressed gas into or out of the pressure reservoir for the displacement or shifting of liquid only involves a pressure difference for overcoming friction and flow losses as well as a pressure difference caused by any existing altitude difference. The resulting combined pressure difference is made up of the friction and flow losses plus the hydrostatic pressure of a water-liquid column, which is 1 bar for example at a height difference of 10 meters. At this pressure difference, the reduction in performance and efficiency is further negligible and the method of the present invention can be applied analogously.

The fact that the charging of the pressure storage tank with compressed air is accompanied by the withdrawal of liquid from the pressure storage tank and that the withdrawn liquid is used to move the compressed air into the pressure storage tank at the same time means that the pressure in the pressure storage tank can be controlled, and in particular kept constant. The compressed air can also be introduced into the pressure storage tank without further compressing the compressed air in the pressure storage tank. The quantity of liquid removed from the pressure storage tank is moved to the collecting basin after the shifting process for introducing compressed air into the pressure storage tank, in order to be shifted back into the pressure storage tank when compressed air is removed from the pressure storage tank.

In order to fill or empty the pressure storage tank with working machines (compressor/turbine) of any design, a shifting device is required in addition to the pressure storage tank and the collecting basin. This shifting device can additionally be used as a compression stage or as a pressure expansion stage. The shifting device can also be arranged parallel and/or serially. Since the shifting device can also be used as compressor/expansion stage, an additional working machine (compressor/turbine) is not necessarily required, or at least one compressor/expansion stage in the working machine can be replaced by the shifting device.

The liquid in the system can be used as a heat buffer if required to store compression heat and reuse this heat later during expansion to prevent the system from overcooling. It is also possible to use the compression heat in other ways (e.g. in buildings for hot water and heating) and to return the heat for expansion to the system from the environment, or vice versa, the compression heat can be released to the environment and heat for expansion can be returned to the system from other sources (e.g. for cooling buildings). Of course, the compression heat can be used elsewhere and the heat for expansion can be drawn from an object to be cooled. This makes sense because the compression heat can be released at a different temperature level than the temperature level at which the heat for expansion is fed back into the system.

A constant pressure in the pressure storage tank means that the compression or expansion processes in the pressure storage tank itself are eliminated, so that the heat flows into and out of the pressure storage tank are also eliminated and all compression heat and/or expansion cold can be dissipated at the compressor or expander. This results in a pressure storage system combined with efficient heat or cold generation by minimizing the heat flows into and out of the pressure storage tank. A so-called system with trigeneration, a combined heat-power-cold coupling enables the sectorial coupling of electricity, heat and cold production.

In order to eliminate the given dependencies between heat generation and filling of the pressurized storage tank as well as cold generation and emptying of the pressure storage tank and to achieve full flexibility with regard to the satisfaction of demand for electricity, heat and cold, the pressurized storage system must contain at least two compressor/expansion stages arranged in parallel. This allows heat or cold to be generated independently of the level of the pressure storage tank by simultaneously compressing air and expanding air.

Preferably, the shifting container is partially filled with a solid mass which serves as regenerator mass. For example, metal or ceramics, preferably with a large surface area compared to the volume, can be used to dissipate heat into or out of the air, which is then absorbed or released consecutively by the liquid or by a heat exchanger.

It is understood that the liquid can be in direct contact with the air or can be separated from the air by various media separation devices such as bubbles, pistons, membranes, etc. The fluid can either be displaced directly by a fluid pump/motor or by pistons, which are displaced for example by a hydraulic or pneumatic piston or by a crankshaft with connecting rod.

Figure 2:
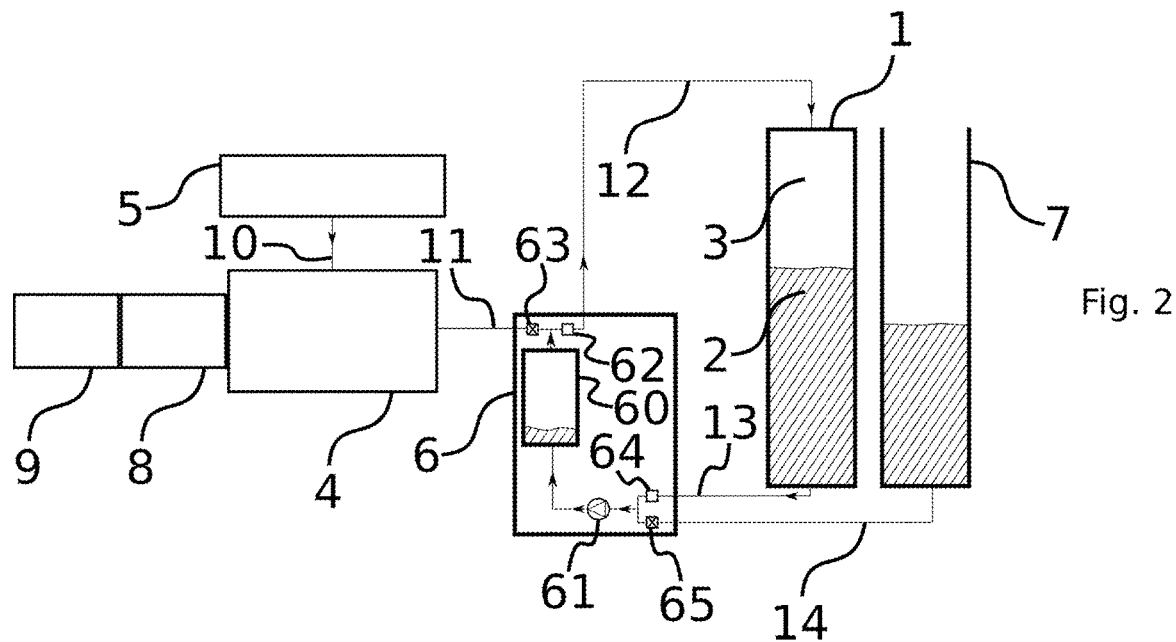
Figure 2A:
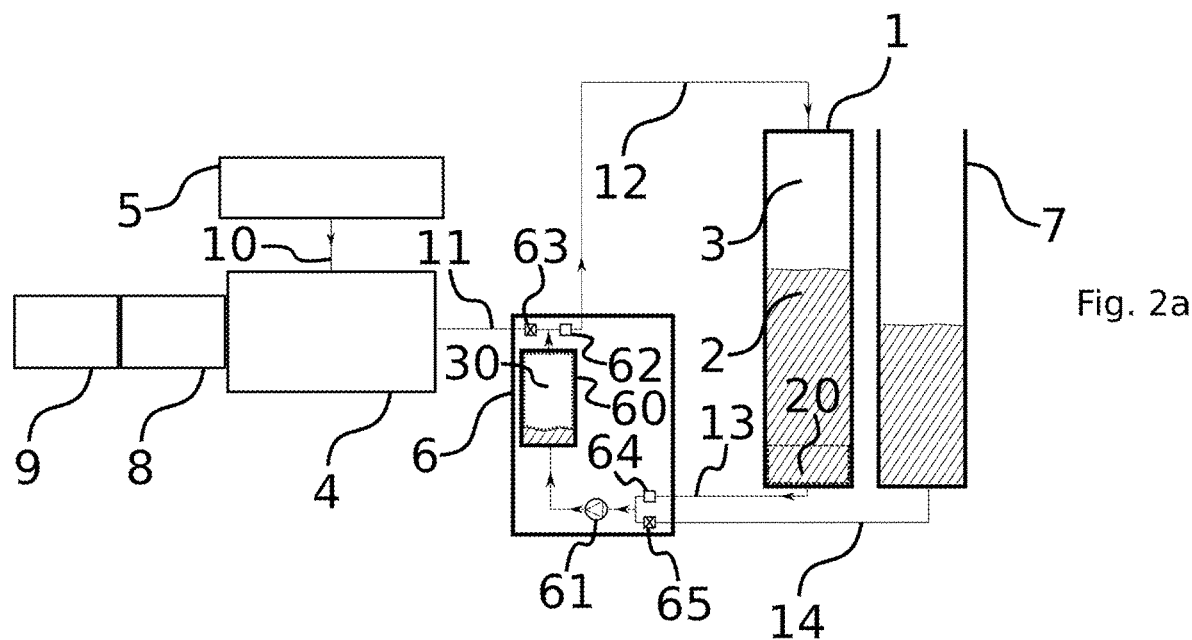
Figure 2B:
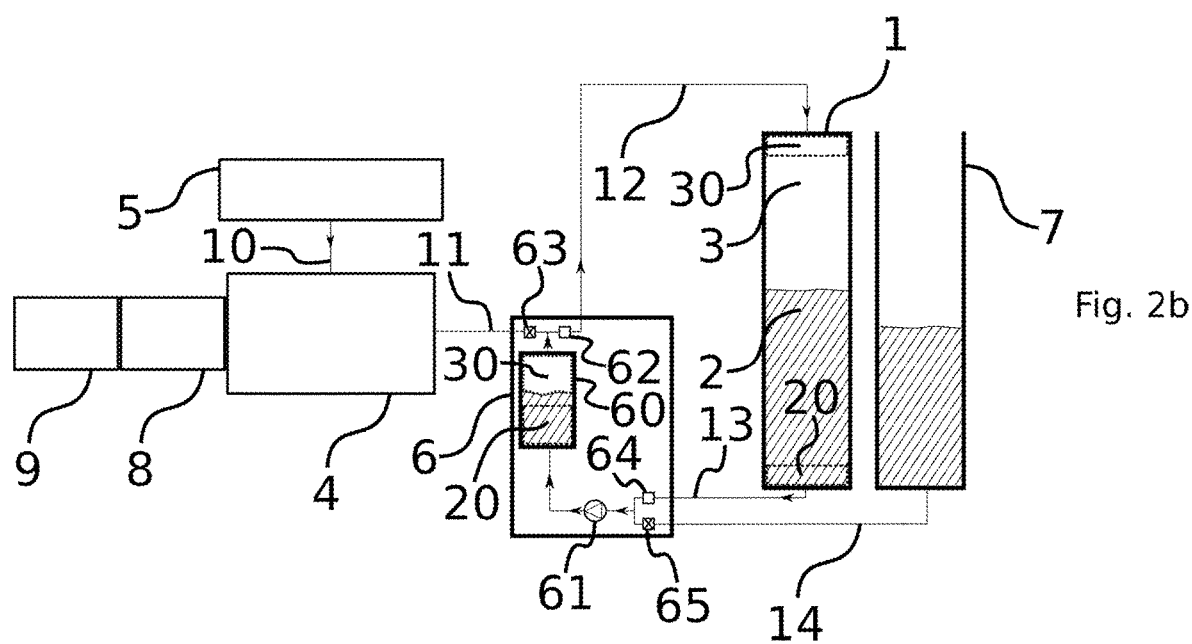
Figure 2C:
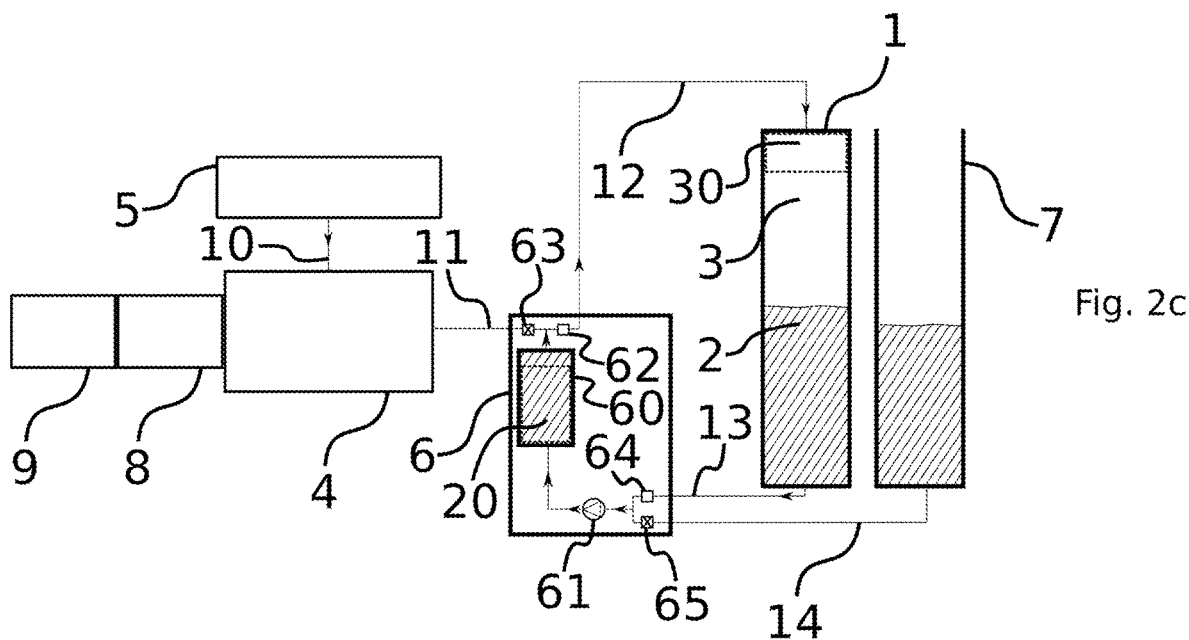
Figure 2D:
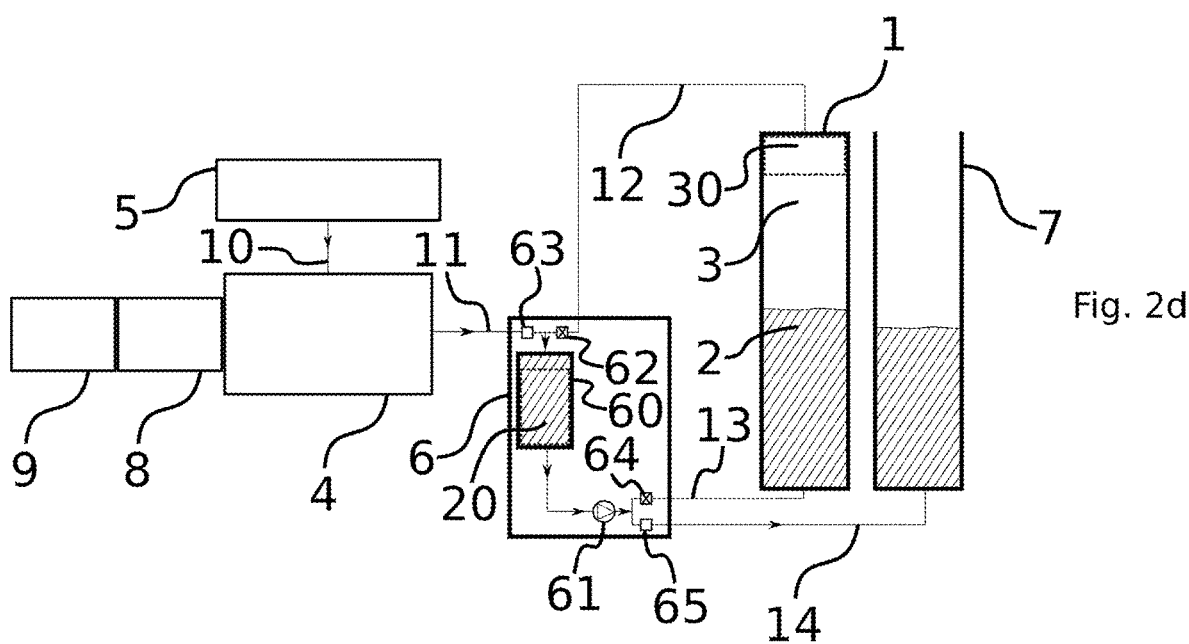
Figure 2E:
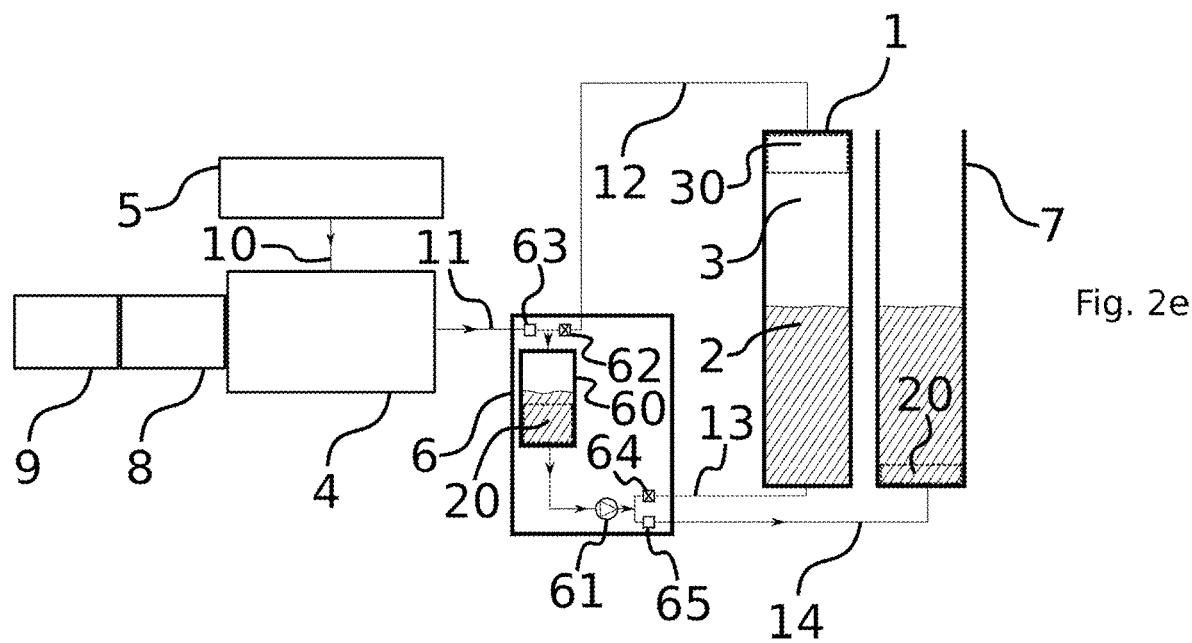
Figure 2F:
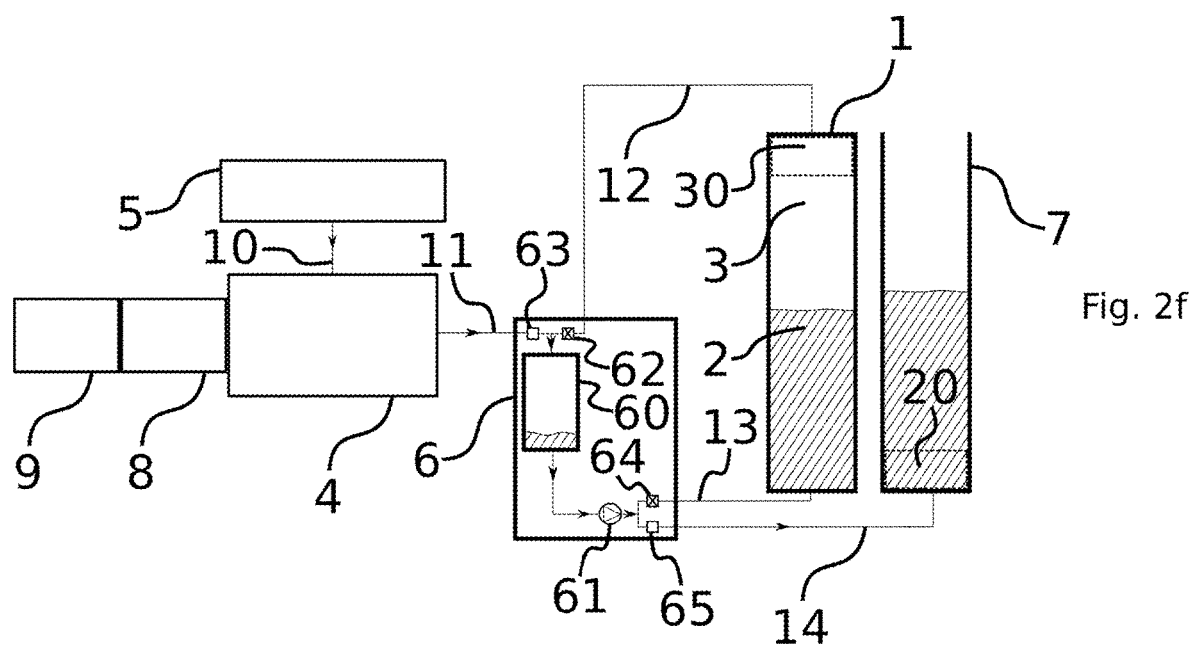
Figures 2G, 2H:
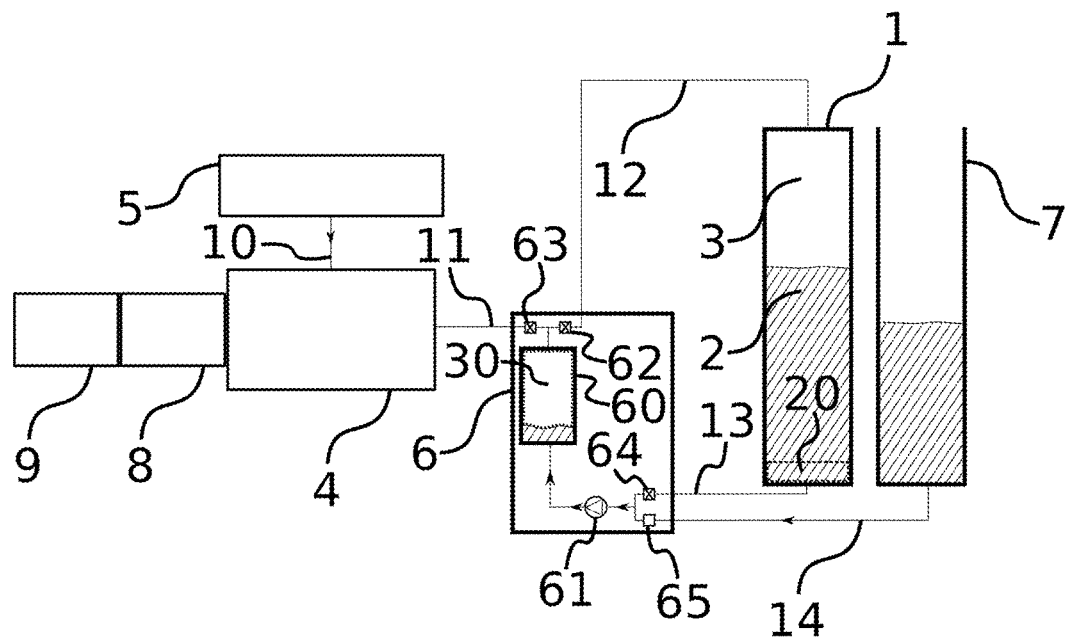
Figure 2I:
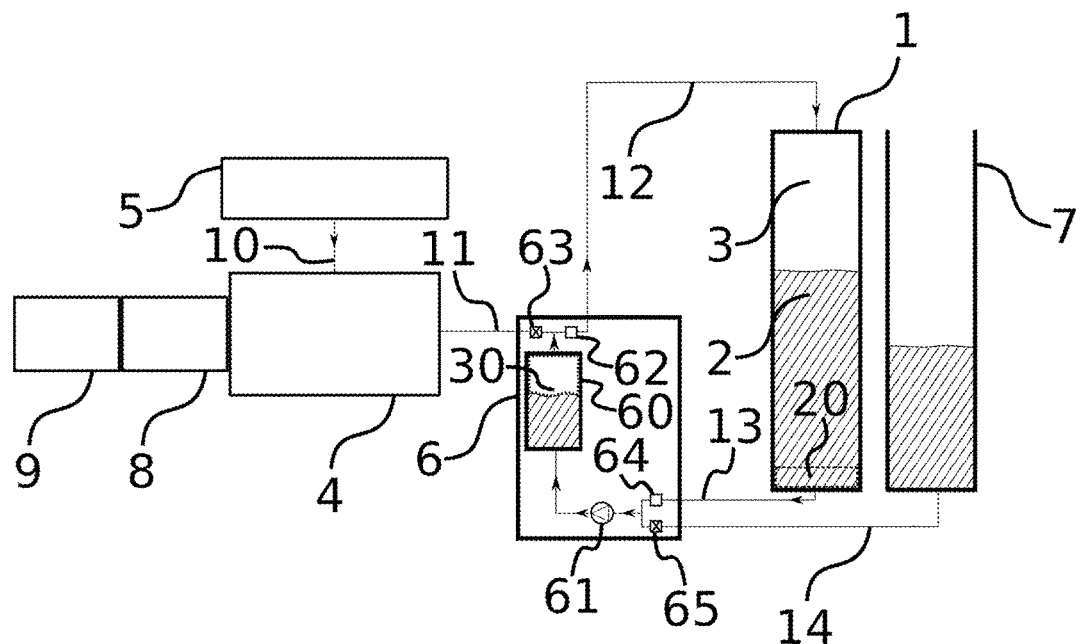
Figure 2J:
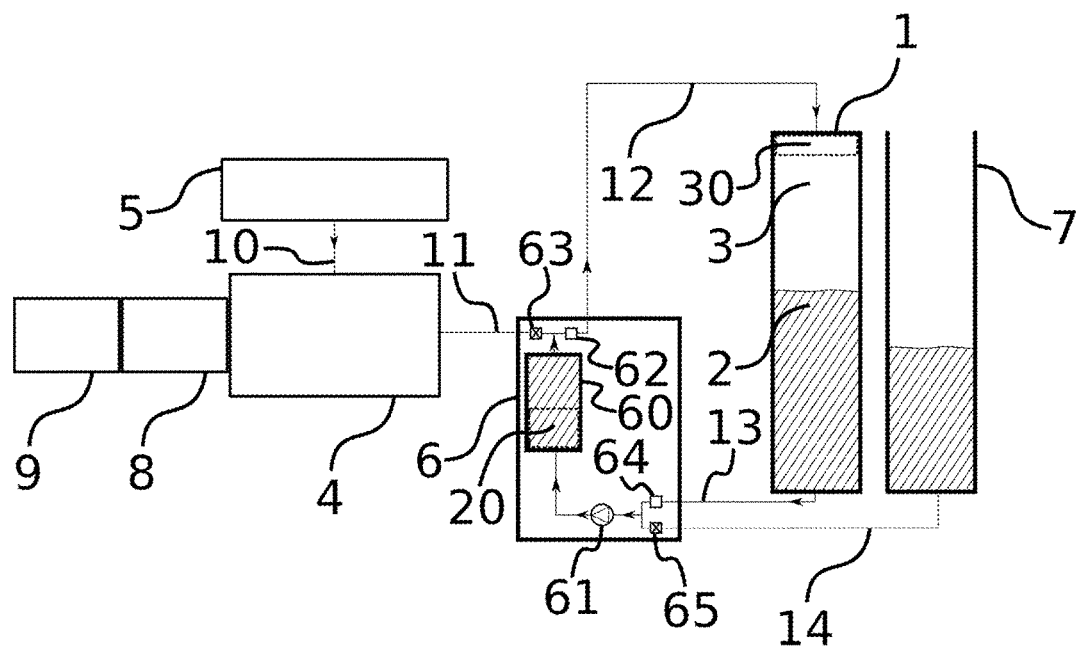
Figure 2K:
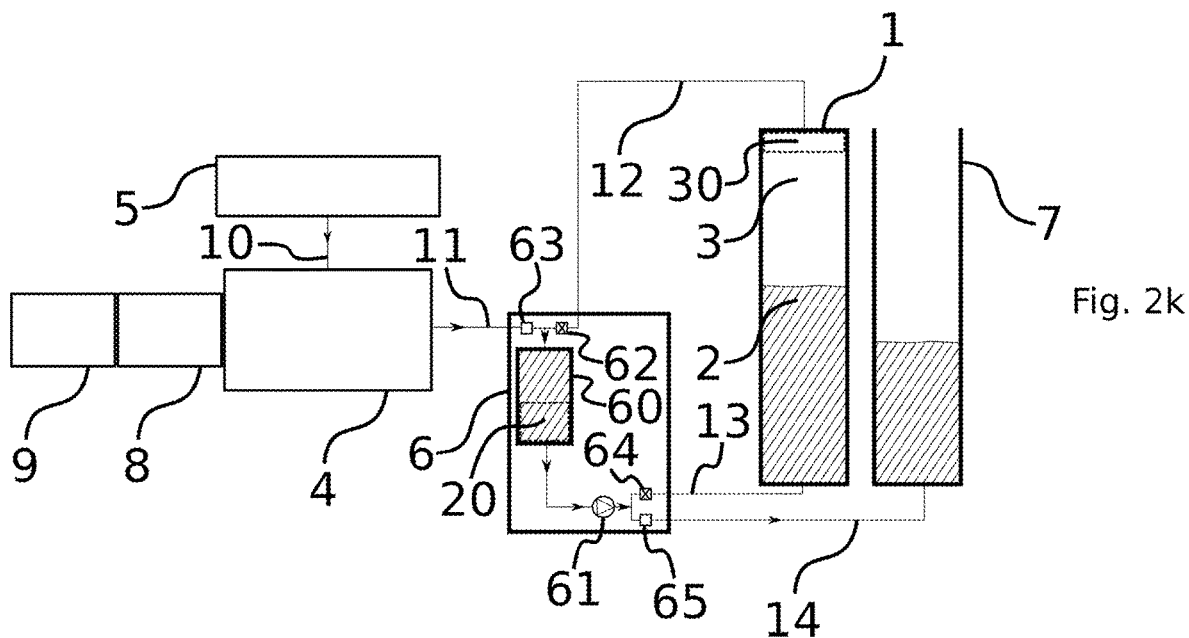
Figure 2L:
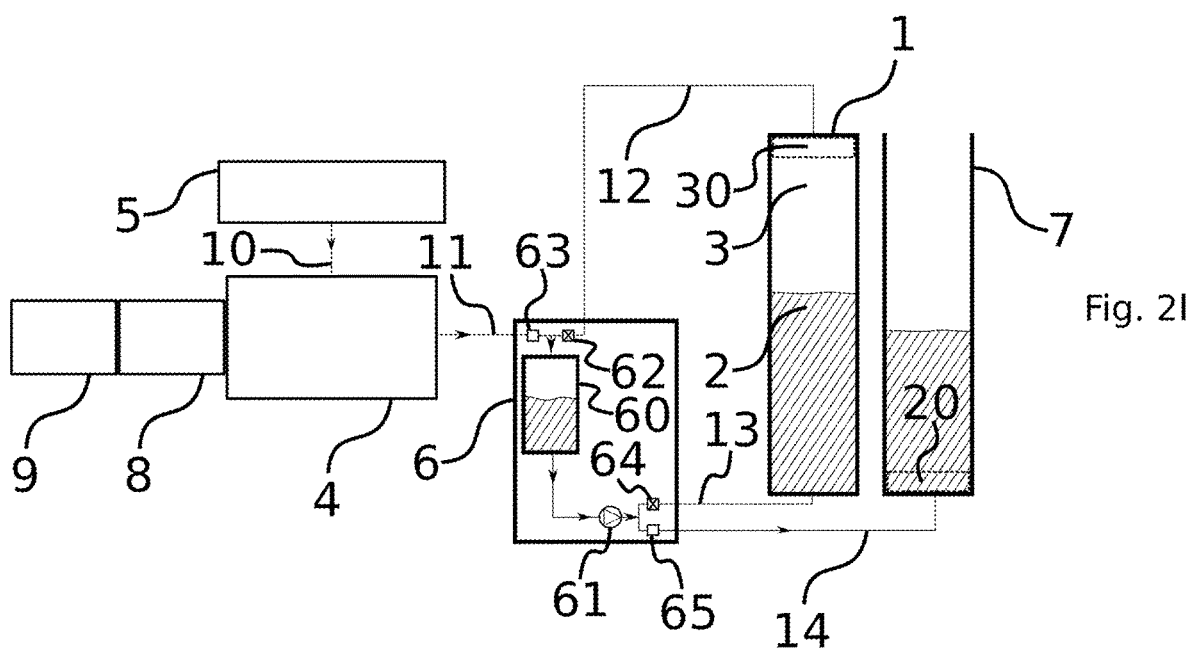
Figure 2M:
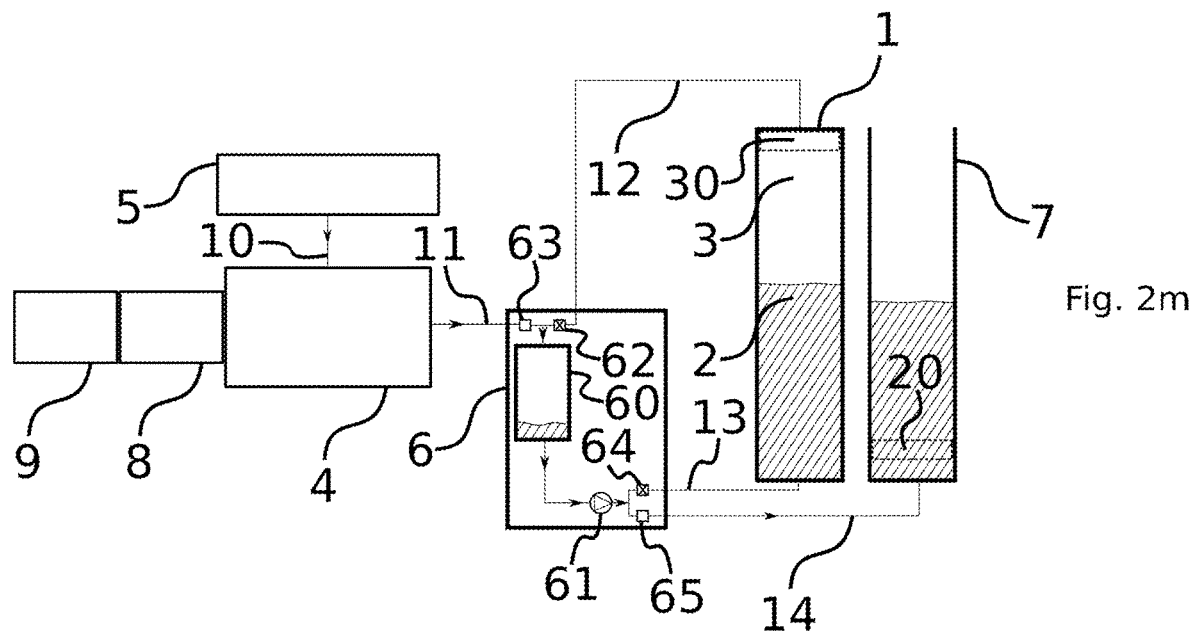
Figure 2N:
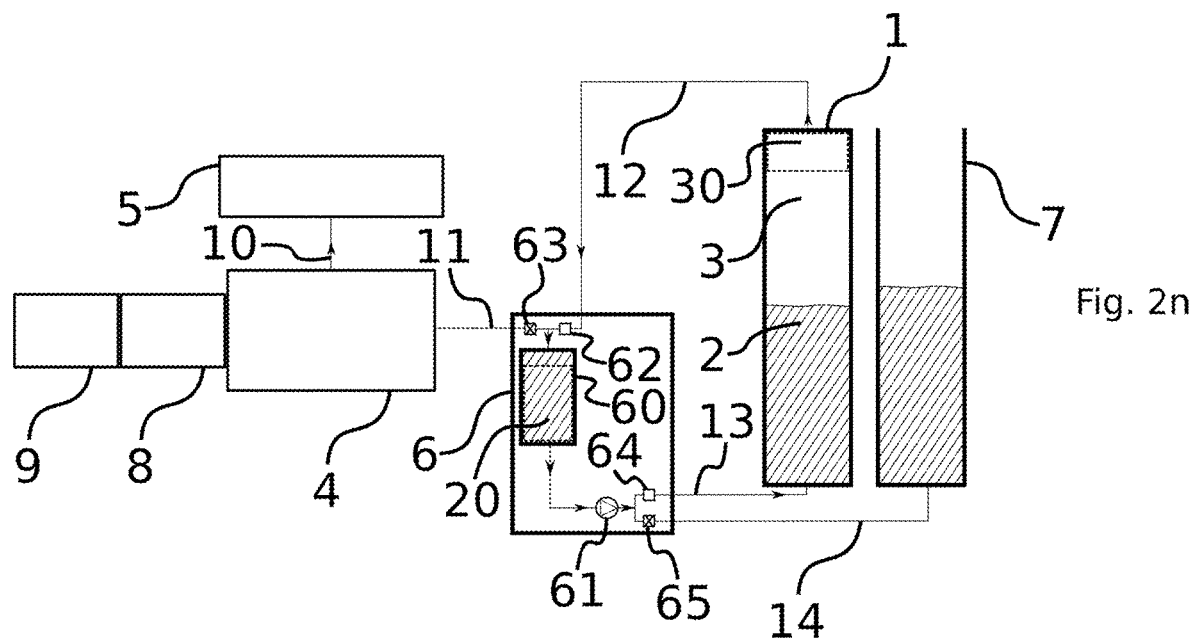
Figure 2O:
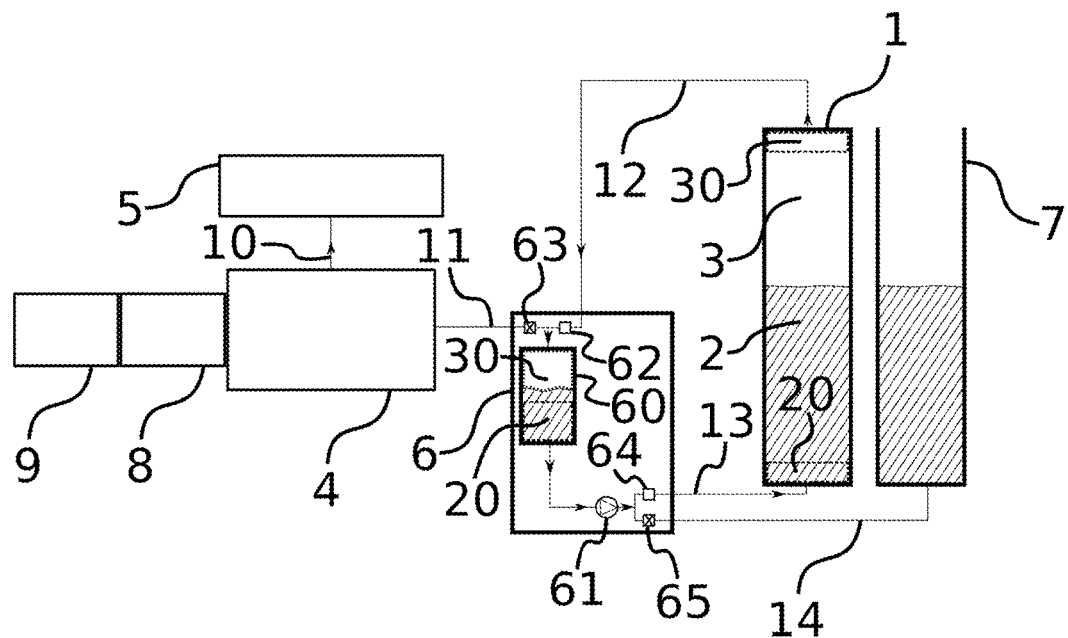
Figure 2P:
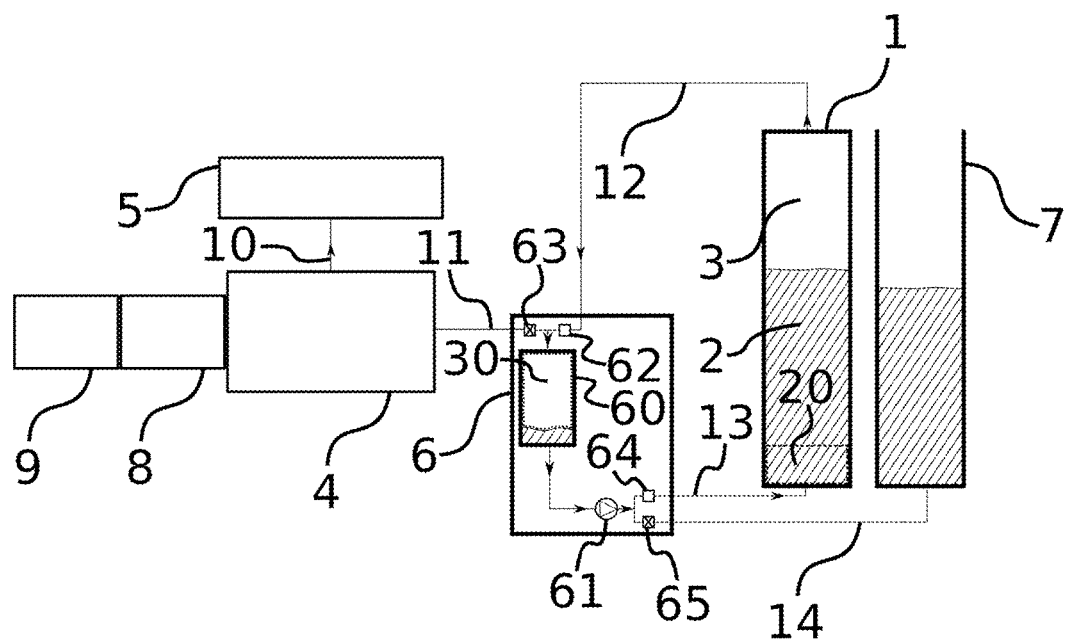
Figure 2Q:
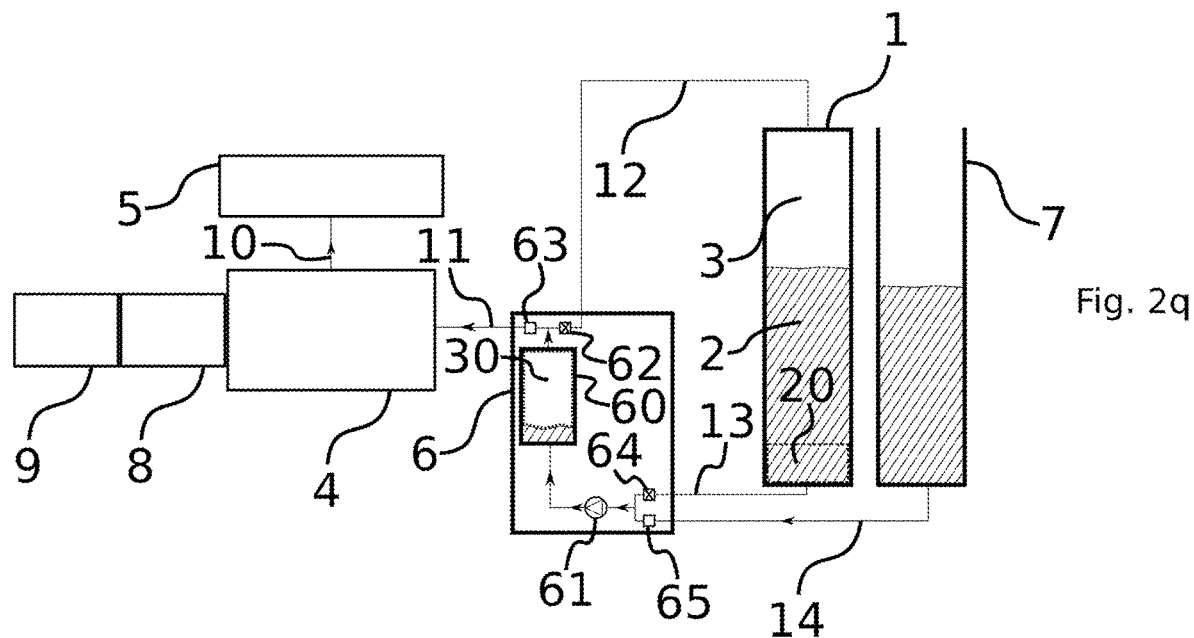
Figure 2R:
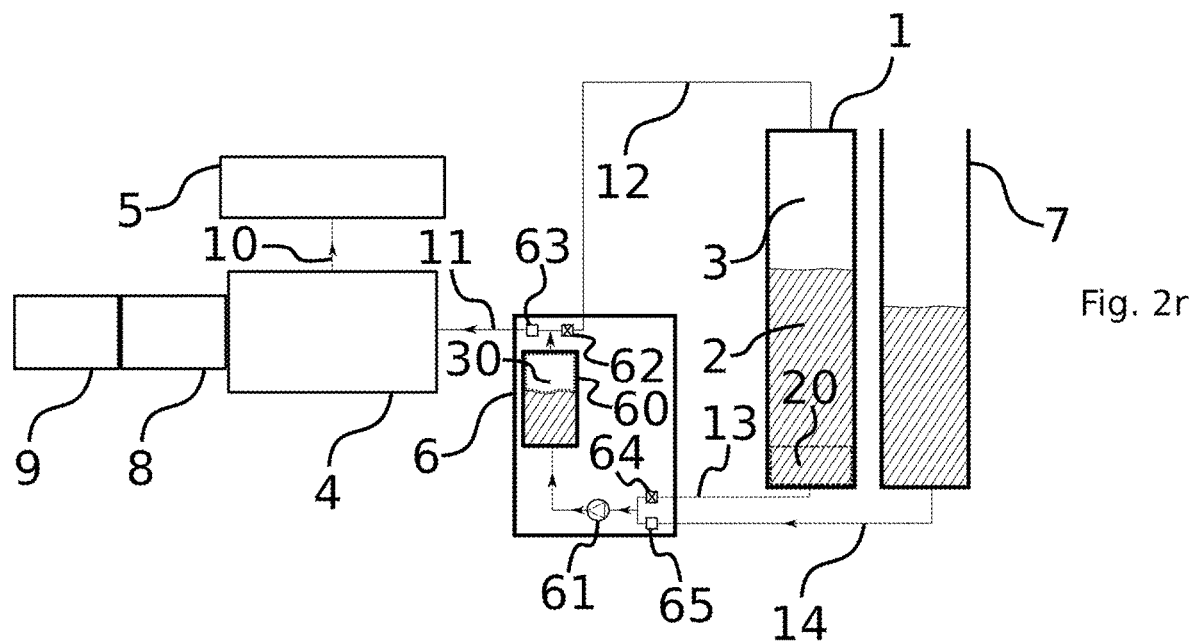
Figure 2S:
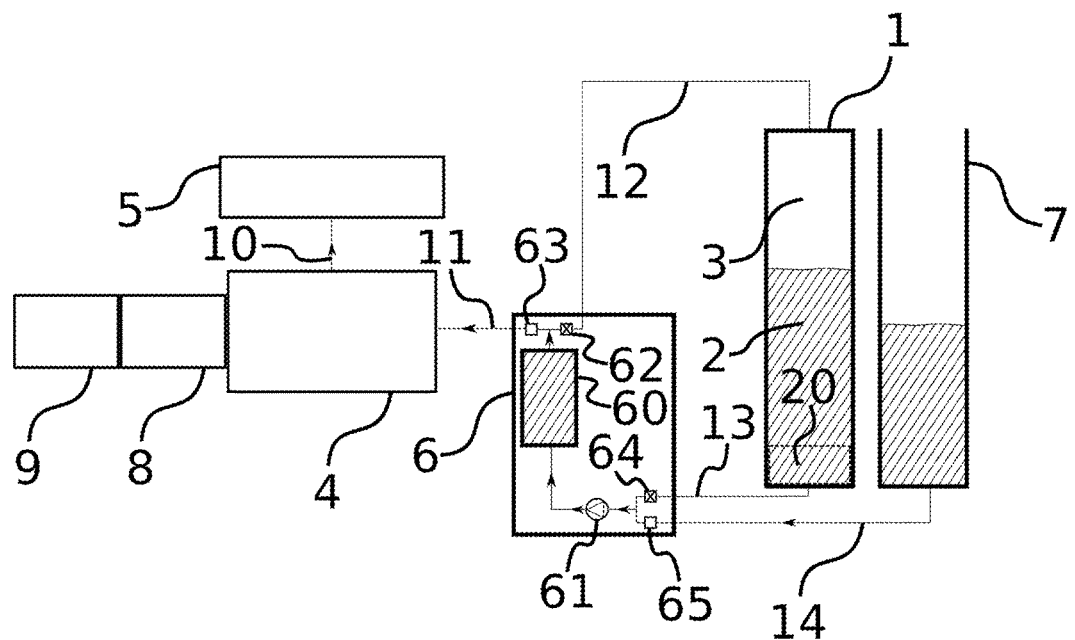
Figure 2T:
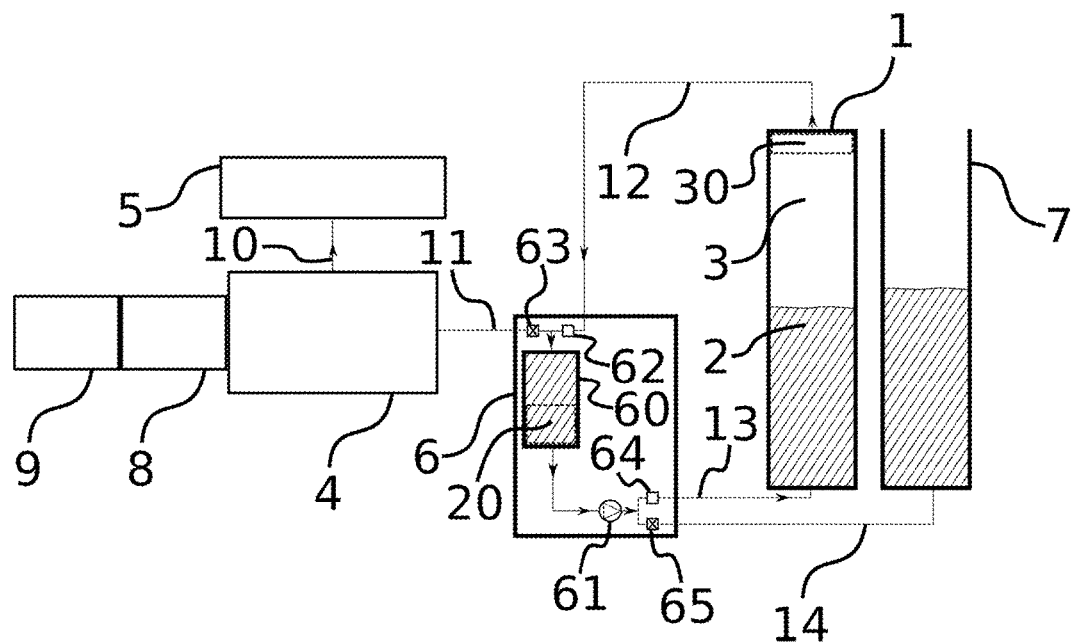
Figure 2U:
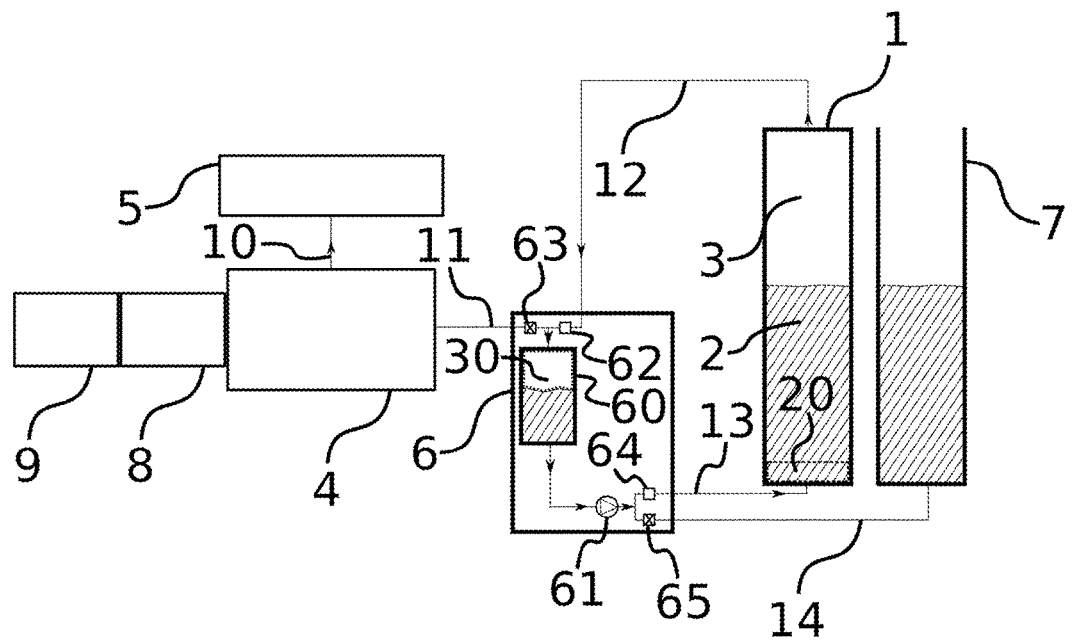
Figure 2V:
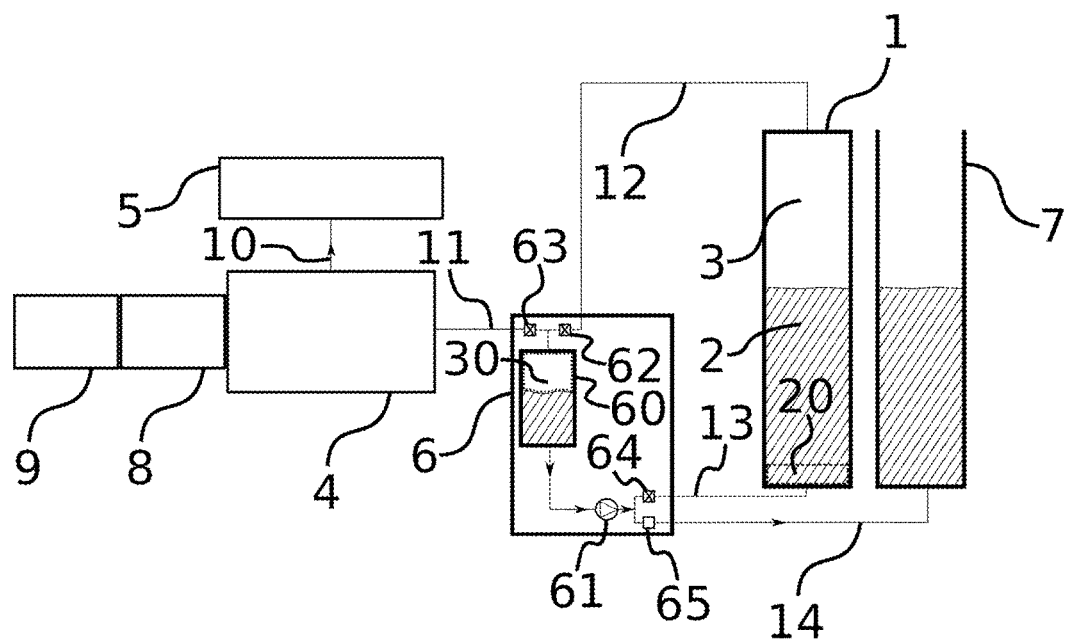
Figure 2W:
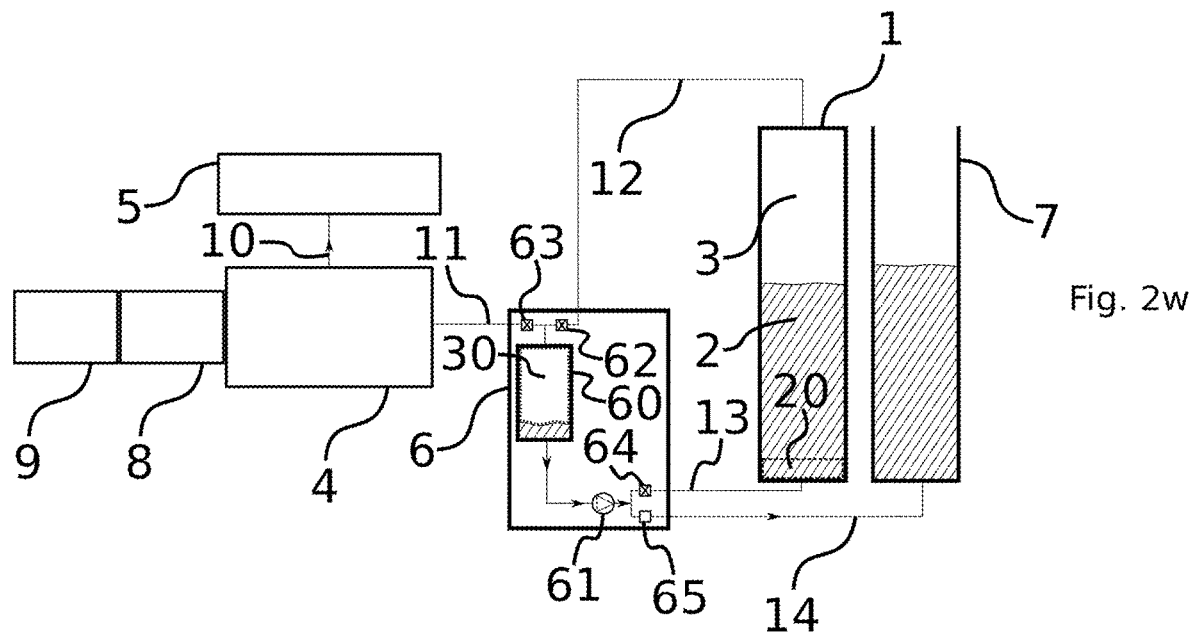
Figure 2X:
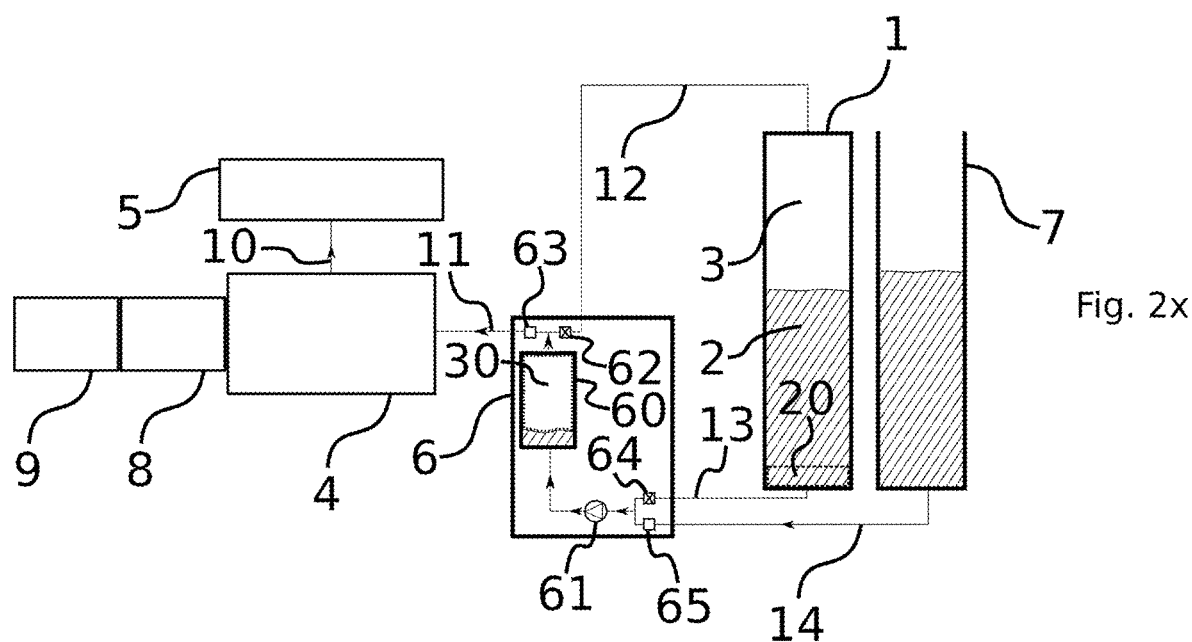
Figure 2Y:
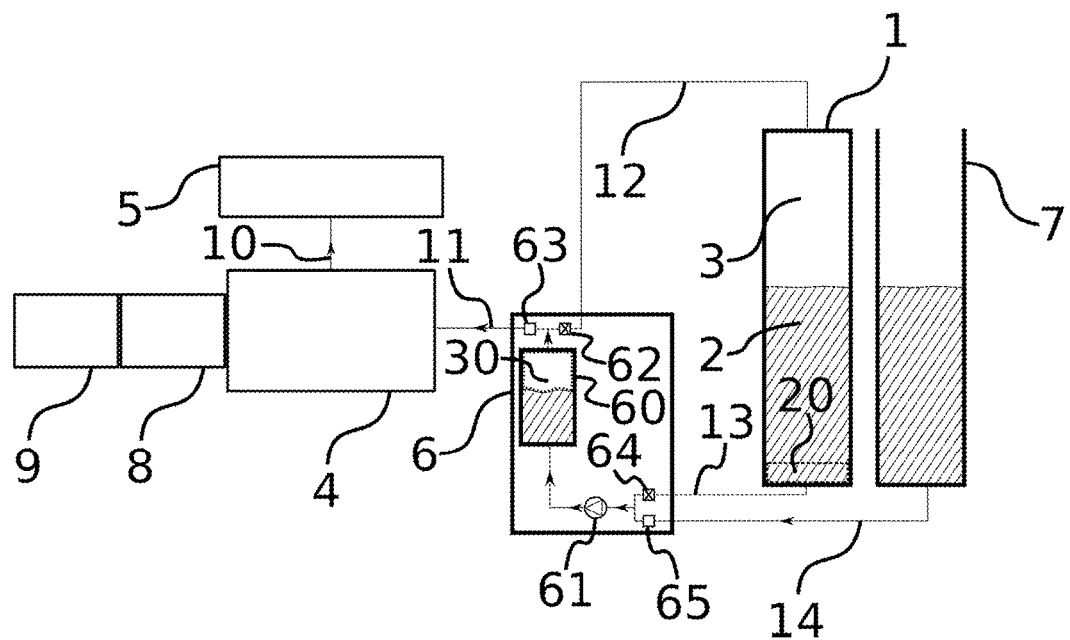
Figure 2Z:
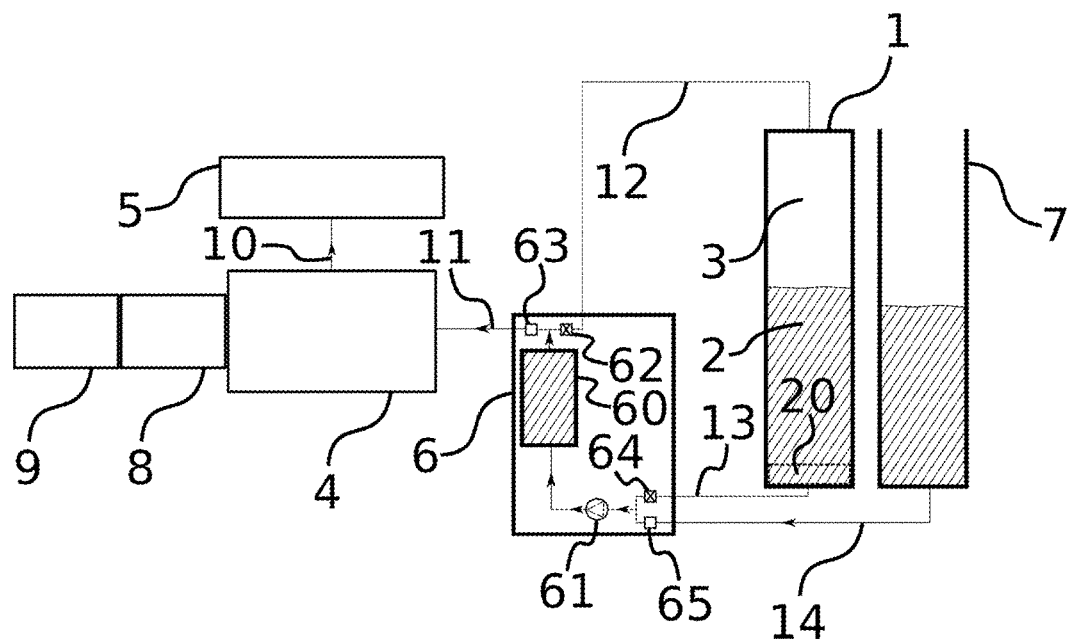
Figure 3A:
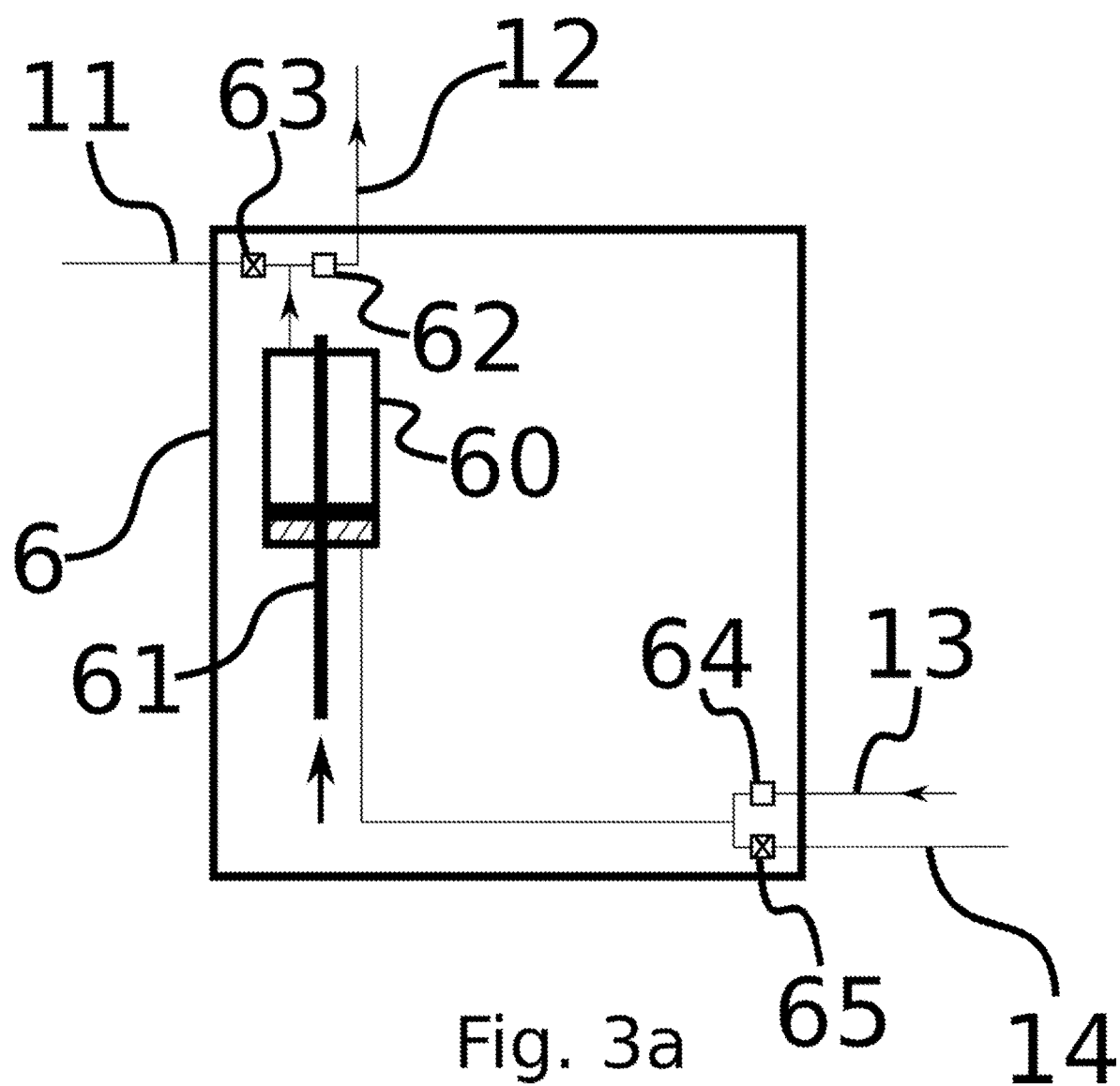
Figure 3B:
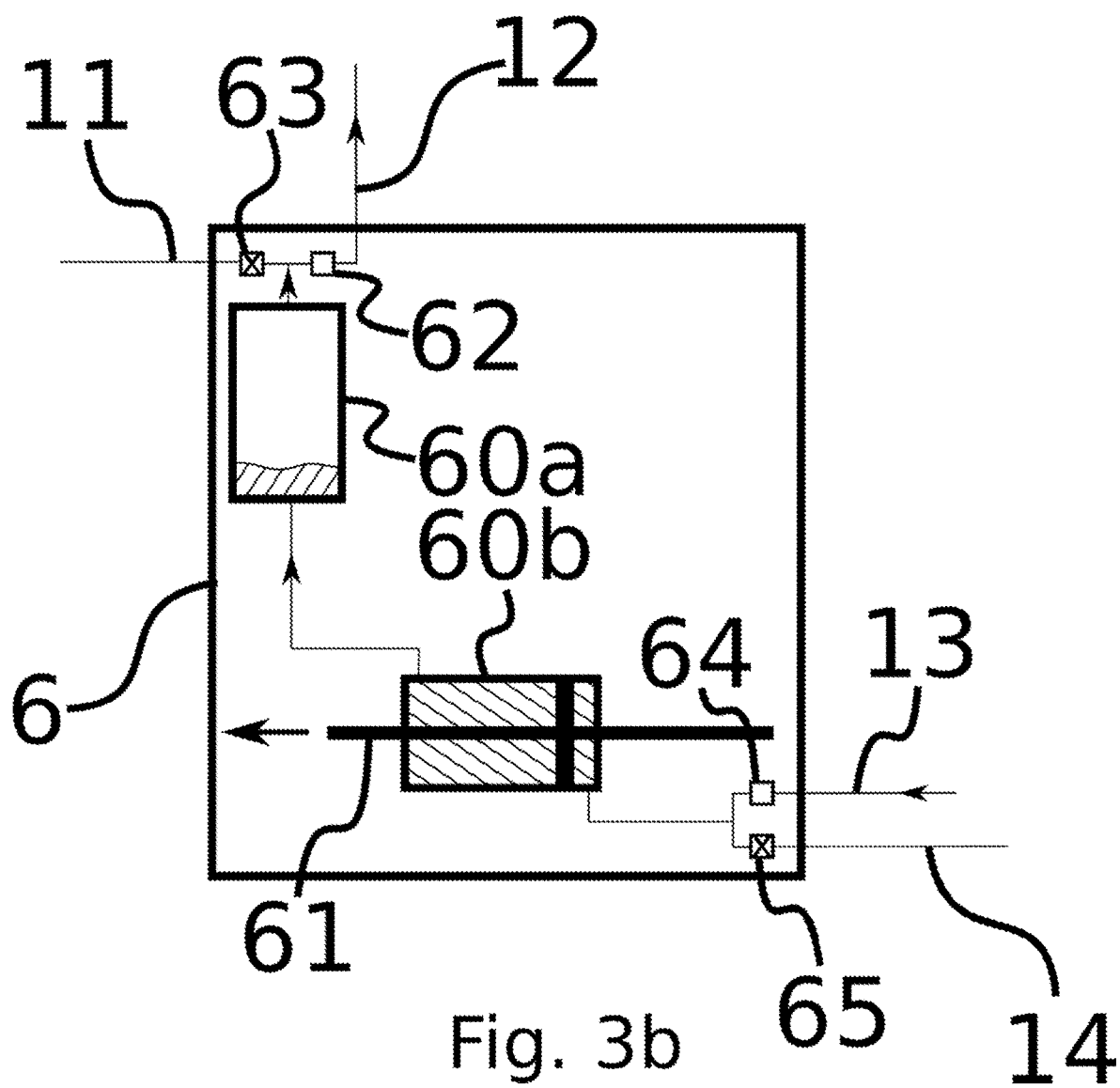
Figure 3C:
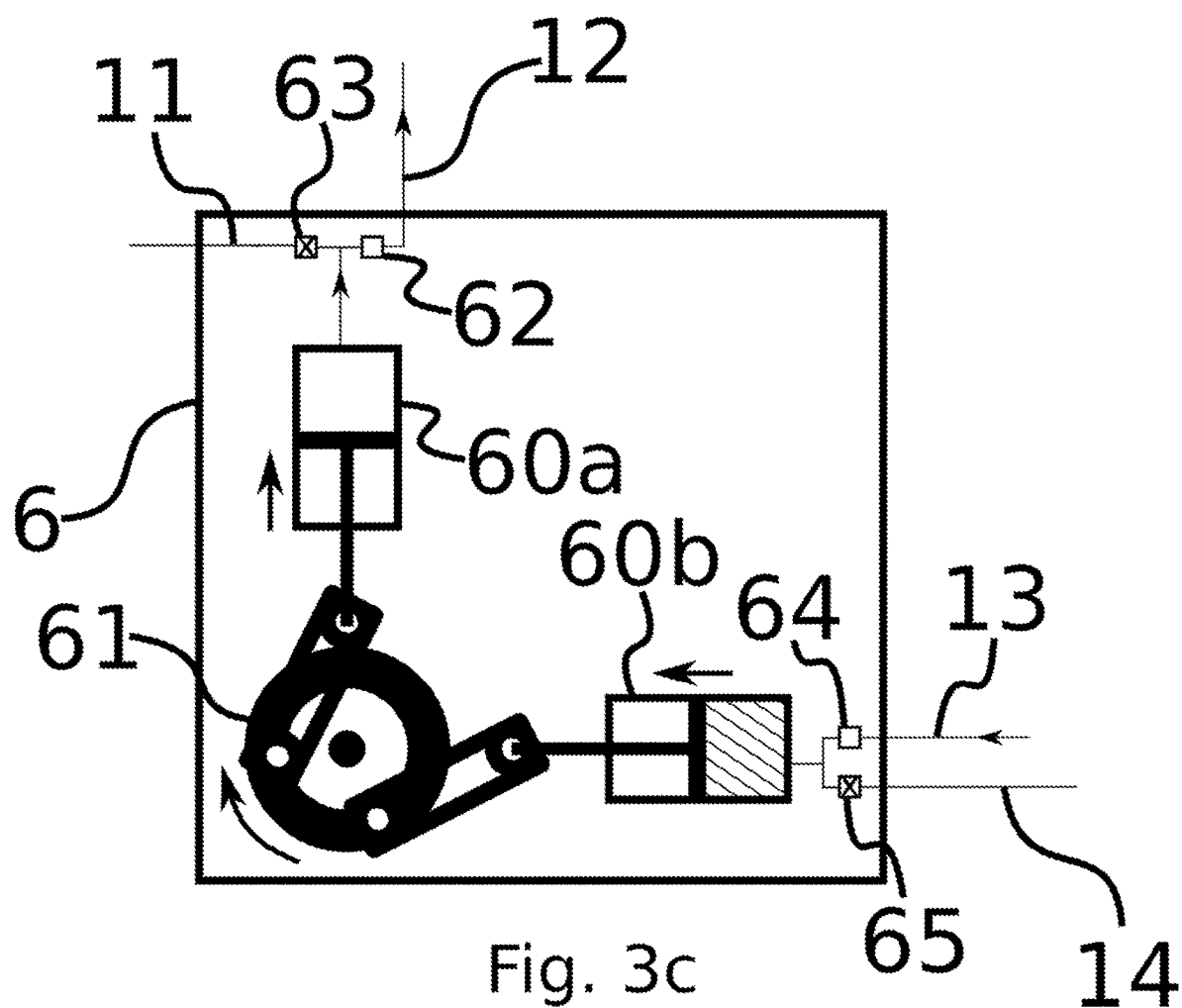
Figure 4:
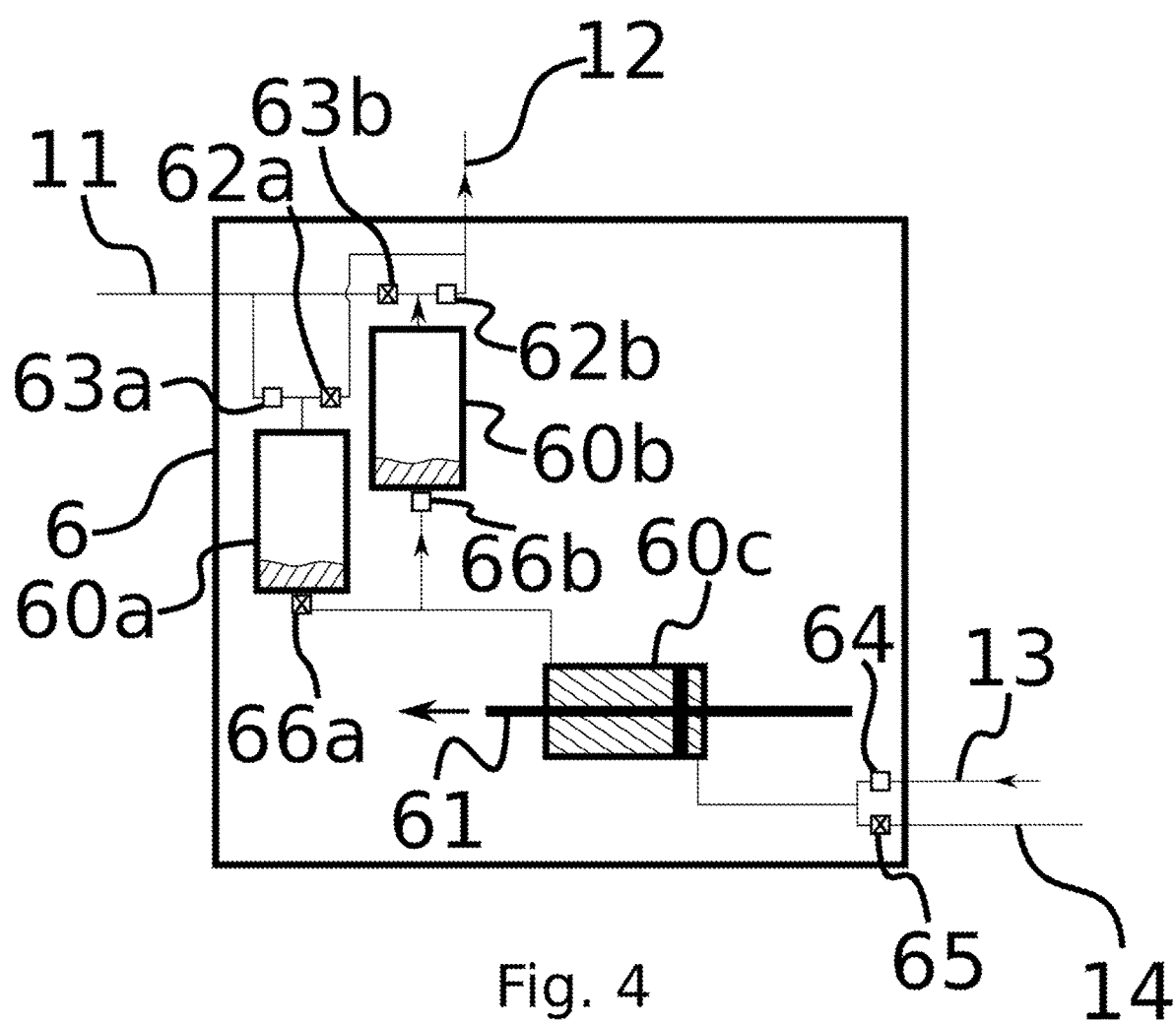
Figure 5:
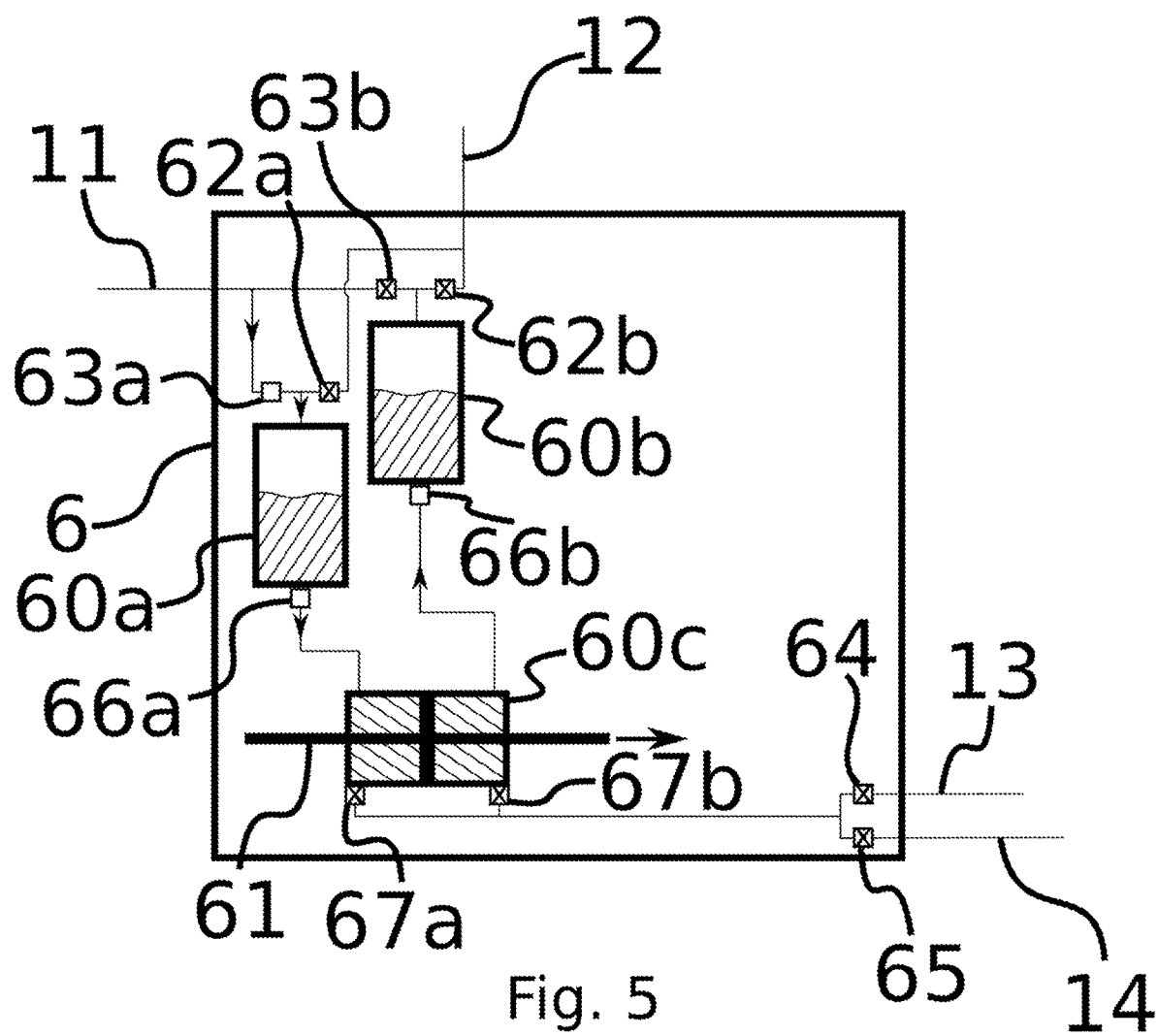
Figure 7:
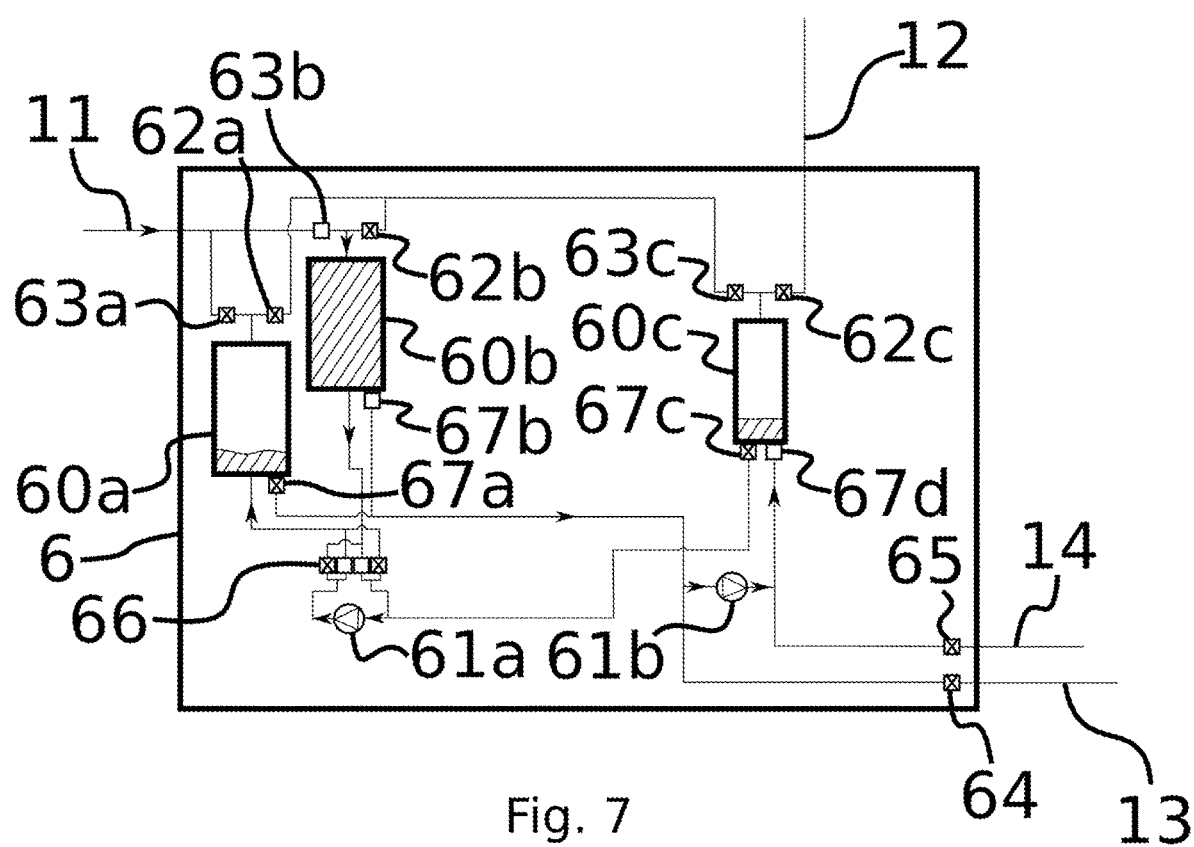
Figure 8:
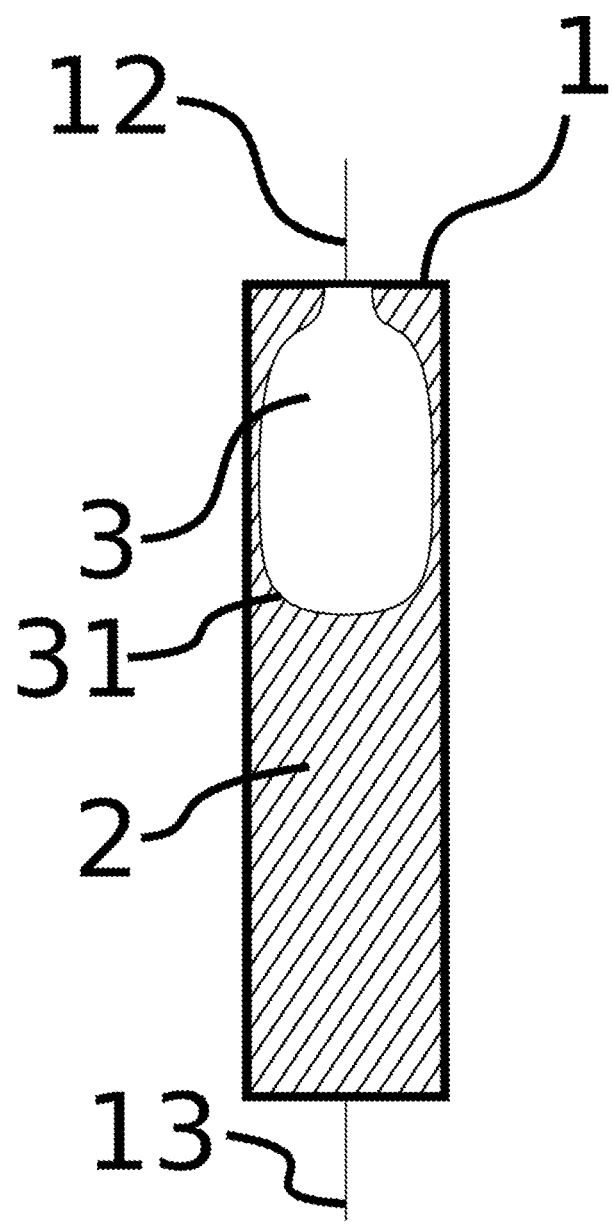
Figure 9:
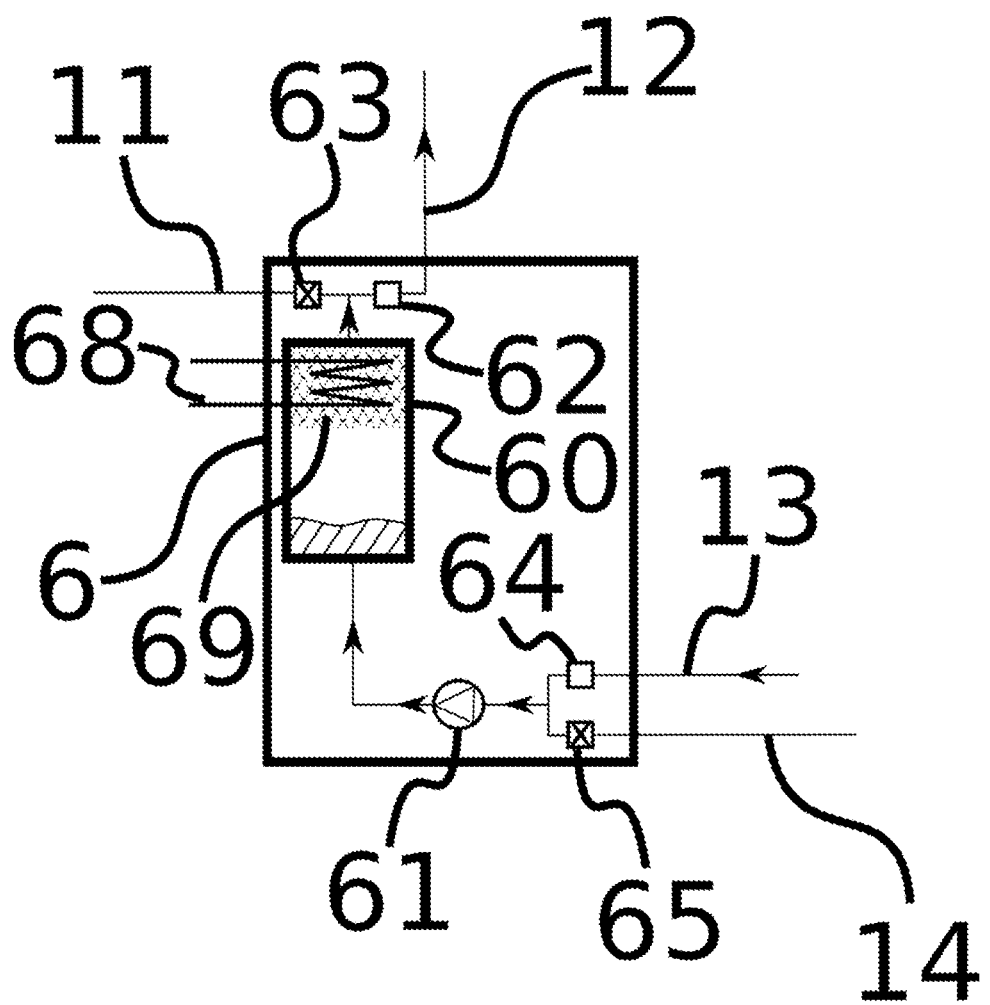
Figure 10:
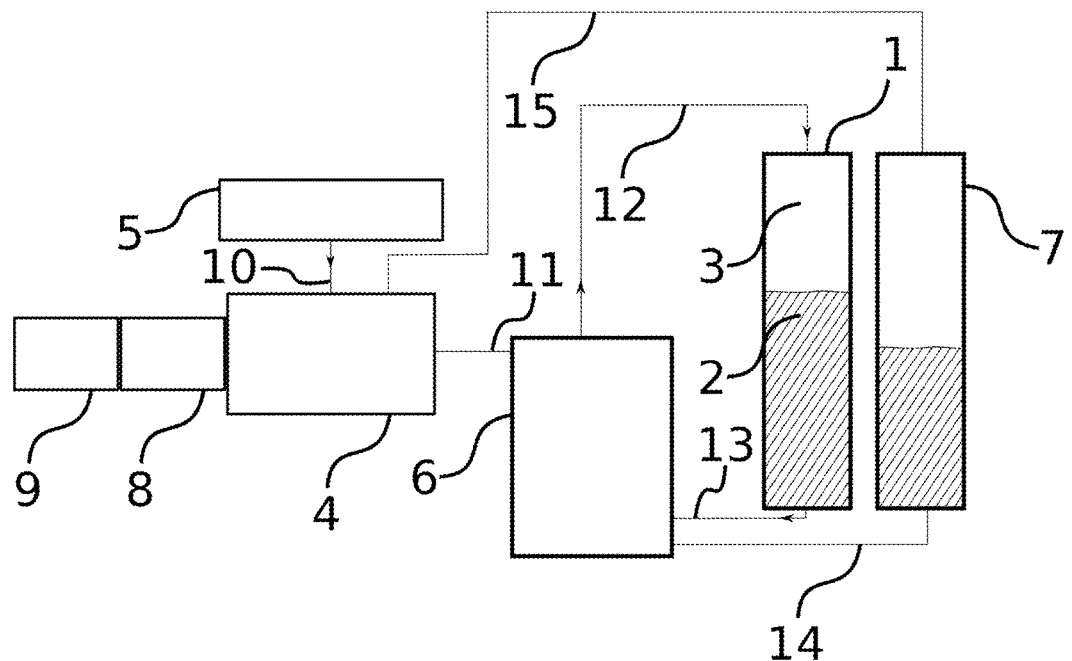
Figure 11:
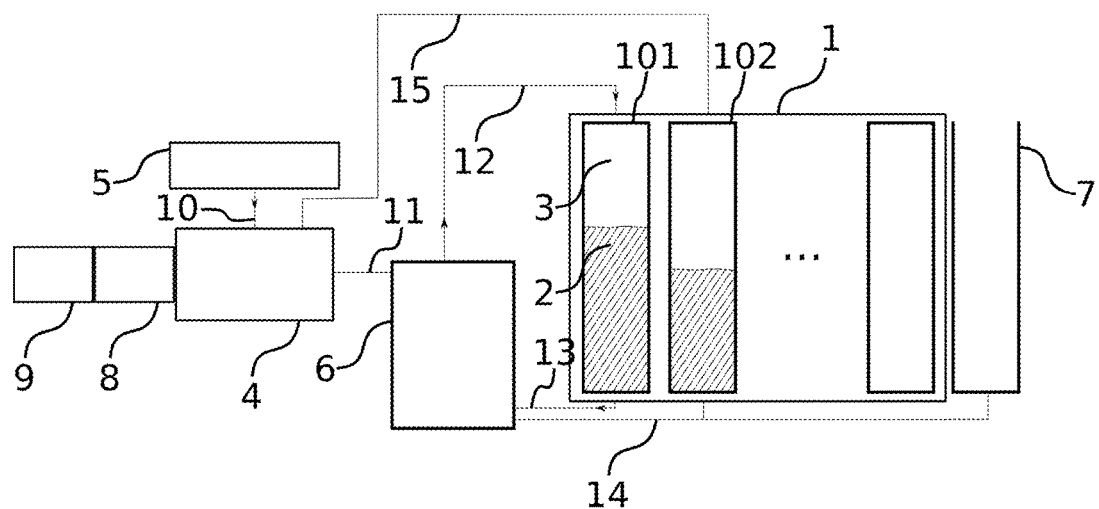

The invention is described below using the figures and its function is explained. It shows:

FIG. 1 a schematic arrangement of a pressure storage system with a shifting device. In order to use the shifting device according to the invention, an input and output drive, a pressure storage tank and a collecting basin must be available;

FIG. 2 the schematic arrangement of the pressure storage system of FIG. 1 and an exemplary design of the shifting device;

FIG. 2*a*-2*z* all different operating modes of the arrangement of FIG. 2;

FIG. 2*a*-2*f* the operating mode "Compression mode without post-compression";

FIG. 2*g*-2*m* the operating mode "Compression mode with post-compression";

FIG. 2*n*-2*s* the operating mode "Expansion mode without pre-expansion";

FIG. 2*t*-2*z* the operating mode "Expansion mode with pre-expansion";

FIG. 3*a*-3*c* possible design forms of the shifting device with one or more and separate and/or combined gas and liquid shifting containers and shifting mechanisms designed as pistons;

FIG. 3*a* a combined gas and liquid shifting container;

FIG. 3*b* a combined gas and liquid shifting container and a separate liquid shifting container;

FIG. 3*c* separate gas and liquid shifting containers;

FIG. 4 a possible parallel arrangement of two combined shifting containers 60*a*, 60*b*, a separate shifting container 60*c* and a piston with piston rod as shifting mechanism 61;

FIG. 5 another possible parallel arrangement of shifting containers 60*a* and 60*b* and a piston as shifting mechanism 61;

FIG. 6 a possible parallel arrangement of shifting containers 60*a* and 60*b* and a liquid pump as shifting mechanism 61;

FIG. 7 a possible parallel and serial design of shifting containers and liquid pumps as shifting mechanisms 61*a* and 61*b*, whereby the shifting process is applied between the second stage and the pressure storage tank 1 but also between the first stage and the second stage;

FIG. 8 a separating device 31 to separate liquid 2 in the pressure storage tank 1 from the compressed gas 3;

FIG. 9 a possible arrangement of a regenerator 69 and/or a heat exchanger 68 in a shifting container 60;

FIG. 10 an energy storage system as shown in FIG. 1, with the difference that the collecting basin 7 is brought to a pressure level between that of the gas source/sink 5 and that of the pressure reservoir 1;

FIG. 11 pressure containers 101, 102, . . . combined to a pressure storage tank 1.

FIG. 1 shows a pressure storage tank 1, partially filled with a liquid 2 (here water) and compressed gas 3 (here air), whereby the gas and the liquid are either in direct contact or separated by a device (not shown in FIG. 1). Further shown is a working machine 4, which is fluidically connected with a gas source/sink 5 (here the atmosphere), and which is able to take gas from the gas source 5, to compress it and to transport it into the pressure storage tank 1 by means of the shifting device 6 and/or take gas from the pressure reservoir 1 by means of the shifting device 6, to expand it and to supply it to the gas sink 5. The working machine 4 can consist separately of a compressor and an expander and the necessary drives 8 or output 8 or of a combined compressor/expander, which can both compress and expand a gas, whereby the working machine 4 can also be constructed in a multi-stage design. The drive 8 or output 8 of the working machine 4 is, for example, an electric motor or generator connected to the electrical grid 9. When compressing gas, electricity is drawn from the grid 9 and when expanding gas, electricity is fed into the grid 9.

The shifting device 6 is characterized by the fact that on the gas side a fluidic connection 11, 12 can be established to the working machine 4 and/or the pressure storage tank 1 and that on the liquid side a fluidic connection 13, 14 can be established to the pressure storage tank 1 and/or the collecting basin 7, namely in such a way that it is possible to transport liquid into or out of the pressure reservoir 1 or the collecting basin 7 and in the same time to shift, compress or expand gas which is in the shifting device 6 or the pressure storage tank 1.

By moving liquid from the pressure storage tank 1 or the collecting basin 7 into the shifting device 6, the gas in the shifting device 6 can be shifted into the pressure storage tank 1 or into the working machine 4 and/or the gas can be compressed by means of the shifting device 6, depending on whether the gas in the shifting device 6 is connected with a fluidic connection 11, 12 to the working machine 4 or to the pressure storage tank 1 or whether the connections 11, 12 are interrupted. The flow directions of the flows generated by the shifting device 6 and/or by the working machine 4 through the fluidic connections 10, 11, 12, 13, 14 are shown with arrows.

By shifting liquid from the shifting device 6 into the pressure storage tank 1 or into the collecting basin 7, gas from the pressure storage tank 1 or from the working machine 4 can be sucked into the shifting device 6 or can move up and/or the gas in the shifting device 6 can be expanded by the shifting device 6, depending on whether there is a fluidic connection 11, 12 to the working machine 4 or to the pressure storage tank 1 for the gas in the shifting container or whether the connections 11, 12 are interrupted.

In the case of an existing fluidic connection 11 of the shifting device 6 to the working machine 4, there may also be a connection to the gas source/sink 5 or to gas at a pressure level between that of the pressure storage tank 1 and that of the gas source/sink 5 or to gas at or above the pressure level of the pressure storage tank 1 or generally to gas at any pressure level.

The arrangement of FIG. 1 makes it possible to drive the working machine 4 via the electrical grid 9 in order to compress gas and to feed the compressed gas to the shifting device 6, in which the supplied gas can either be compressed and shifted into the pressure storage tank 1 or from which the supplied gas can be shifted into the pressure storage tank 1 without further compression of the gas. According to the invention, when moving the compressed gas from the shifting device 6 into the pressure storage tank 1, the pressure in the pressure storage tank 1 or the gas storage volume in the pressure storage tank 1 can be controlled by taking the liquid shifted by the shifting device 6 for the shifting and/or compression process either from the pressure storage tank 1 or from the collecting basin 7.

The arrangement of FIG. 1 also allows compressed gas from the pressure storage tank 1 to be shifted into the shifting device 6 and/or expanded into the latter in order to either expand the compressed gas and then make it available to the working machine 4 for further expansion, or to make compressed gas without prior expansion available to the working machine 4 for expansion, which in turn drives a generator 8, with which electricity is fed into the grid 9. According to the invention, when moving the compressed gas from the pressure storage tank 1 into the shifting device 6, the pressure in the pressure storage tank 1 or the gas storage volume in the pressure storage tank 1 can be controlled by shifting liquid from the shifting device 6 either into the pressure storage tank 1 or into the collecting basin 7.

FIG. 2 shows a possible design form of the shifting device 6, consisting of a shifting container 60 for providing a shifting volume, whereby this volume can be provided by a separate container, but can also be integrated in working machine 4, or can be present as a pipe volume between working machine 4 and pressure storage tank 1. Furthermore, the shifting device includes a shifting mechanism 61, which is here exemplarily designed as a liquid pump 61, whereby in general the liquid pump 61 only indicates the direction of flow and not whether compression or expansion is taking place, and has valves 62, 63, 64, 65, which allow a fluidic connection 11, 12, 13, 14 between the shifting device 6 and the working machine 4, the pressure storage tank 1 and/or the collecting basin 7 to be established [ ] or interrupted [X]. In the following, it is not being explicitly discussed in general which valves establish or interrupt a fluidic connection at which point in time, since this is evident from the figures and an established fluidic connection is also characterized by the direction of flow of the fluid.

At this point it should also be mentioned that the shifting mechanism 61 must of course also be driven or braked, and that this can be done in various ways, for example by a mechanical connection to the working machine and its drive and output, or by a separate drive or output respectively. This mechanical connection or this input and output are not shown in FIGS. 2 and 2*a* to 2*z*, as the liquid pump 61 is only used as an example of a shifting mechanism 61. In the following, it can generally be assumed that both input and output power are available to shifting mechanism 61 (here liquid pump) and that, if necessary, additional valves or devices can be used, for example, to reverse the direction of action of shifting mechanism 61 or to partially or completely cancel or adjust its action.

The various operating modes resulting from the arrangement of FIG. 2 are explained on the basis of FIGS. 2*a* to 2*z*, whereby the representations at different points in time describe the states or the current processes in the system and are to be understood schematically.

The process shown in FIGS. 2*a* to 2*f* will be designated as "Compression mode without post-compression" in the following. The compression mode is recognized by the fact that the flow direction of the gas (at least in the time average) points from gas source 5 to working machine 4. This means that the working machine 4 is driven to compress gas and power is drawn from the grid 9. FIG. 2*a* shows the beginning of a shifting process by shifting a compressed unit of gas 30, which is located in the shifting container 60, into the pressure storage tank 1. This is done by the liquid pump 61 pumping or shifting respectively a unit of liquid 20 from the pressure storage tank 1 into the shifting container 60 where the liquid level rises and consequently, the unit of compressed gas 30 is pressed into the pressure storage tank 1, where the unit of compressed gas 30 replaces the released volume of the unit of liquid 20 just taken out of the pressure storage tank 1. This process is shown in FIGS. 2*a* to 2*c* with three consecutive time steps. Since the unit of liquid 20 and the unit of compressed gas 30 are at the pressure level of the pressure storage tank 1 during this process, the liquid pump 61 only needs to apply a small amount of power (e.g. flow losses, gravitational forces, buoyancy forces) to move the unit of liquid 20 and thus the unit of compressed gas 30 within a certain time.

FIGS. 2*d* to 2*f* show the continuation of the process from FIGS. 2*a* to 2*c* by moving the unit of liquid 20 in the shifting container from the shifting container 60 into the collecting basin 7. For this purpose, the fluidic connection 12 of the shifting container 60 with the pressure storage tank 1 is interrupted and the fluidic connection 11 is established between the working machine 4 and the shifting container 60 so that gas can flow from the working machine 4 into the shifting container 60 or can be sucked in. Furthermore, the fluidic connection 14 is established between the shifting container 60 and the collecting basin 7 so that the shifting mechanism 61 can shift the unit of liquid 20 from the shifting container 60 into the collecting basin 7. It is relevant at which pressure level the gas flows from the working machine 4 into the shifting container 60 or is sucked in. If this is done with gas which is, for example, at the pressure level of the gas source 5 and the liquid in the collecting basin 7 is also at the pressure level of the gas source 5, then the liquid pump 61 in turn only has to apply a small power (e.g. flow losses, gravitational forces, buoyancy forces) to pump the unit of liquid 20 from the shifting container 60 into the collecting basin 7 within a certain time. The higher the pressure difference between the liquid in the shifting container 60 and the liquid in the collecting tank 7 during this process, the more power must be applied by the liquid pump 61 to pump (compress) or brake (expand) the liquid, depending on whether the pressure level is higher in the collecting basin 7 or in the shifting container 60. If the gas contained in the shifting container 60 (as shown in FIG. 2f) is not yet at the desired pressure level, the working machine 4 can continue to feed gas into the shifting container 60 without shifting liquid until the gas contained in the shifting container 60 has reached the desired pressure level and another unit of compressed gas 30 is located in the shifting container 60 to be fed into pressure storage tank 1.

Then the fluidic connection 11 between the working machine 4 and the shifting container 60 is interrupted and the fluidic connection 12 between the shifting container 60 and the pressure storage tank 1 is established and the cycle starts again with the changed contents of the pressure storage tank 1 with the condition according to FIG. 2a, whereby the compressed gas 30 unit in the shifting container 60 is shifted into the pressure storage tank 1. If the compressed gas 30 unit in shifting container 60 was at the pressure level of pressure storage tank 1 before fluidic connection 12 was established between pressure storage tank 1 and shifting container 60, the pressure level of pressure storage tank 1 will remain constant when the shifting process (FIGS. 2a to 2f) is repeated. If the compressed gas 30 unit is at a lower pressure level than the pressure level of pressure storage tank 1 before fluidic connection 12 is established between pressure storage tank 1 and shifting container 60, the pressure level of pressure storage tank 1 will decrease. If the unit of compressed gas 30 is at a higher pressure level than the pressure level of pressure storage tank 1 before the fluidic connection 12 is established between pressure storage tank 1 and shifting container 60, the pressure level of the pressure storage tank 1 will increase. Thus the pressure level of the pressure storage tank 1 can be controlled during filling with compressed gas (independent of the filling level of the pressure storage tank 1). Thereby the unit of compressed gas 30 in the shifting container 60 is not or only slightly compressed due to a level change of the liquid in the shifting container 60. Therefore this operating mode is called "Compression mode without post-compression".

The process shown in FIGS. 2g to 2m will be titled "Compression Mode with post-compression". The compression mode is recognized by the fact that the flow direction of the gas (at least in the time average) points from the gas source 5 to the working machine 4. This means that the working machine 4 is driven to compress gas and power is drawn from the grid 9. The difference to the "compression mode without post-compression" is that a unit of compressed gas 30 by working machine 4, which is located in the shifting container 60, is not only shifted into the pressure storage tank 1 by the rising liquid level in the shifting container 60, but can also be compressed. This is achieved by using the liquid pump 61 to move liquid from the collecting basin 7 into the shifting container 60 as shown in FIGS. 2g and 2h, whereby the compressed gas 30 unit is enclosed in the shifting container 60, i.e. on the gas side, there is no fluidic connection 11,12 between the shifting container 60 and the pressure storage tank 1 or the working machine 4. When the desired pressure level is reached in the shifting container 60, the fluidic connection 14 between the collecting basin 7 and the shifting container 60 can be interrupted and a fluidic connection 12 between the shifting container 60 and the pressure storage tank 1 can be established. FIGS. 2i to 2m shows the following shifting process, whereby the recompressed unit of gas 30 in the shifting container 60 is placed in the pressure storage tank 1 and then the unit of liquid 20 and the amount of liquid for post-compression is transferred to the collecting basin 7.

This procedure is in principle identical to the procedure described in the operating mode "Compression mode without post-compression" (2b to 2f) and is not explained further.

Depending on the application, the shifting container 60 can be directly connected to the gas source 5 and the shifting mechanism 61 can be equipped with the drive 8 of the working machine 4 so that no working machine 4 is required for pre-compression. In the following, this is referred to as "compression mode with post-compression", even if the shifting device 6 is used to withdraw gas from the gas source 5 and to compress this same gas without using a working machine 4 in the pressure storage system.

The process shown in FIGS. 2n to 2s will be designated as "Expansion Mode without pre-expansion". The expansion mode is recognized by the fact that the flow direction of the gas (at least in the time average) points from the working machine 4 to the gas sink 5. This means that the working machine 4 expands compressed gas and drives the generator 8, whereby electricity is fed into the grid 9. FIG. 2n shows the beginning of a shifting process, where a compressed unit of gas 30, which is located in the pressure storage tank 1, is shifted into the shifting container 60. This is done by the liquid pump 61 moving liquid from the shifting container 60 into the pressure storage tank 1, where the liquid level rises and consequently forces compressed gas via the fluidic connection 12 into the shifting container 60, where the compressed gas 30 unit takes the place of the unit of liquid 20 that has just been fed into the pressure storage tank 1. This process is shown in FIGS. 2n to 2p with three successive time steps. Since the liquid unit 20 and the unit of compressed gas 30 are at the same pressure level as the pressure storage tank 1 during this process, the liquid pump 61 only needs to apply a small amount of power (e.g. flow losses, gravitational forces, buoyancy forces) to move the unit of liquid 20 and thus the unit of compressed gas 30 within a certain time.

FIGS. 2q to 2s shows the continuation of the process in FIGS. 2n to 2p by moving the liquid 20 in collecting basin 7 from collecting basin 7 into shifting container 60. For this purpose, the fluidic connection 12 of the shifting container 60 with the pressure storage tank 1 is interrupted and the fluidic connection 11 is established between the working machine 4 and the shifting container 60 so that gas can flow from shifting container 60 into the working machine 4 or can be sucked in. Furthermore, the fluidic connection 14 is established between the shifting container 60 and the collecting basin 7, so that the shifting mechanism 61 can shift liquid from the collecting basin 7 into the shifting container 60. The pressure level at which the gas is located in the shifting container 60 is relevant here. If, for example, the gas in the shifting container 60 is at the pressure level of the gas source 5 and the liquid in the collecting basin 7 is also at the pressure level of the gas source 5, then the liquid pump 61 in turn only needs to apply a small amount of power (e.g. flow losses, gravitational forces, buoyancy forces) in order to pump the liquid from the collecting basin 7 into the shifting container 60 within a certain time. The higher the pressure difference between the liquid in the shifting container 60 and the liquid in the collecting basin 7 during this process, the more power must be applied by the liquid pump 61 to pump or brake the liquid, depending on whether the pressure level in collecting basin 7 or shifting container 60 is higher. If the gas contained in the shifting container 60 (as shown in FIG. 2q) is not yet at the desired pressure level, the working machine 4 can first release gas from the shifting container 60 without shifting liquid until the gas contained in the shifting container 60 has reached the desired lower pressure level.

After reaching the condition as shown in FIG. 2s, the fluidic connection 11 between the working machine 4 and the shifting container 60 is interrupted and the fluidic connection 12 between the shifting container 60 and the pressure storage tank 1 is opened and the cycle starts again with the condition as shown in FIG. 2n with changed contents of the pressure storage tank 1, whereby again a unit of compressed gas 30 in the pressure storage tank 1 is shifted into the shifting container 60. During the withdrawal of compressed gas, the pressure level of the pressure storage tank 1 remains constant, whereby the unit of compressed gas 30 in the shifting container 60 is not or only slightly expanded or compressed due to a level change of the liquid in the shifting container 60. Therefore this operating mode is called "expansion mode without pre-expansion".

The process described in FIGS. 2t to 2z will be referred to in the following as "Expansion mode with pre-expansion". The expansion mode is recognized by the fact that the flow direction of the gas (at least in the time average) points from the working machine 4 to the gas sink 5. This means that the working machine 4 expands compressed gas and drives the generator 8, whereby electricity is fed into the grid 9. The difference to the "expansion mode without pre-expansion" is that a compressed unit of gas 30 (as shown in FIGS. 2t to 2u) taken from the pressure storage tank 1 and located in the shifting container 60 is not only shifted by the decreasing liquid level in the shifting container 60, but can also be expanded. This is achieved by using the liquid pump 61 to move liquid from the shifting container 60 into the collecting basin 7, as shown in FIGS. 2v and 2w, whereby the compressed gas 30 unit is enclosed in the shifting container 60, i.e. on the gas side, there is no fluidic connection 11, 12 between the shifting container 60 and the pressure storage tank 1 or the working machine 4. When the desired pressure level is reached in the shifting container 60, the fluidic connection 11 can be established between the shifting container 60 and the working machine 4. FIGS. 2x to 2z shows the subsequent shifting process, whereby the pre-expanded unit of gas 30 in the shifting container 60 is shifted to the working machine 4. This process is basically identical to that of the operating mode "Expansion mode without pre-expansion" (FIGS. 2q to 2s) and is not explained further.

If necessary, the procedure shown in FIGS. 2t and 2u could also be carried out with an existing fluidic connection 14 between the shifting container 60 and the collecting basin 7 instead of an existing fluidic connection 13 between the shifting container 60 and the pressure storage tank 1. In this case, the pressure level in pressure reservoir 1 would decrease. Or the procedure, as shown in FIGS. 2v and 2w, is carried out with an existing fluidic connection 13 between the shifting container 60 and pressure storage tank 1, instead of an existing fluidic connection 14 between the shifting container 60 and the collection basin 7. Then the pressure level in the pressure storage tank rises. Thus the pressure level of the pressure storage tank 1 can be controlled during the withdrawal of compressed gas (independent of filling level).

Depending on the application, the shifting container 60 can be directly connected to the gas source 5 and the shifting mechanism 61 can be equipped with the output 8 of the working machine 4, so that no working machine 4 is required for pre-expanding. In the following, the term "expansion mode with pre-expansion" can be used, even if the shifting mechanism 6 is used to withdraw gas from the pressure storage tank 1 and to expand this gas without using a working machine 4 in the pressure storage system.

FIGS. 3a to 3c are intended to clarify what is meant by a combined gas and liquid or separate gas or liquid shifting container 60, without finally describing the possible combinations of separate or combined shifting containers. One or more pistons are used as displacement mechanism 61. The piston and the piston rod replace the liquid pump, which serves as shifting mechanism 61 in FIGS. 2, 2a to 2z. The piston movement, which is shown by a larger arrow, is controlled by the piston rod and has an input or output drive, which is not shown in FIGS. 3a to 3c. The piston can also perform a separating function to separate media (gas/gas, liquid/gas, liquid/liquid). The pressure storage tank 1, the collecting basin 7 and other components such as the working machine 4 are not shown in FIGS. 3a to 3c, as they have the same function as shown in the figures above. The shown design variants of the shifting device 6 can be used for the operating modes "Compression mode without post-compression" or "Compression mode with post-compression" as well as "Expansion mode without pre-expansion" or "Expansion mode with pre-expansion". The individual steps of the compression and expansion process correspond to the processes shown in FIGS. 2a to 2z and are not explained in detail again.

FIG. 3a shows a shifting device 6, consisting among other things of a combined gas and liquid shifting container 60 and a piston with piston rod, which serves as shifting mechanism 61. The piston can be used to separate gas and liquid. On the gas side, a fluidic connection 11 to the working machine 4 or a gas source/sink 5 and/or a fluidic connection 12 to the pressure storage tank 1 can be made from the combined shifting container 60 and on the liquid side a fluidic connection 13 to the pressure storage tank 1 and/or a fluidic connection 14 to the collecting basin 7 can be made.

FIG. 3b shows a shifting device 6, consisting among other things of a combined gas and liquid shifting container 60a, a separate liquid shifting container 60b and a piston with piston rod, which serves as shifting mechanism 61. The piston can be used to separate liquids. There is a fluidic connection between the shifting containers 60a and 60b, through which the shifting mechanism 61 can transport liquid in both directions. From the combined shifting container 60a, a fluidic connection 11 to the working machine 4 or to the gas source/sink 5 and/or a fluidic connection 12 to the pressure storage tank 1 can be established on the gas side. A fluidic connection 13 to the pressure storage tank 1 and/or a fluidic connection 14 to the collecting basin 7 can be established on the fluid side of the liquid shifting container 60b.

FIG. 3c shows a shifting device 6, consisting of a separate gas shifting container 60a, a separate liquid shifting container 60b and two pistons with piston rods, which serve as shifting mechanism 61. As shown schematically, the pistons are connected by a crank mechanism. A rigid connection of the piston rods is also possible, but for this purpose the shifting containers 60a, 60b would have to be arranged in a line. The shifting containers 60a and 60b are mechanically connected by shifting mechanism 61. This enables the distribution of liquid and gas to two different shifting containers. Optionally, an additional liquid cushion can be attached to the piston of the shifting container 60a in order to promote desired properties and processes, such as controlling the heat transfer from and to the gas or to minimize the dead space volume of the shifting container 60a. On the gas side, a fluidic connection 11 to the working machine 4 or the gas source/sink 5 and/or a fluidic connection 12 to the pressure reservoir 1 can be established from the gas shifting container 60a. A fluidic connection 13 to the pressure reservoir 1 and/or a fluidic connection 14 to the collecting basin 7 can be made from the liquid shifting container 60b on the liquid side.

FIG. 4 shows a possible parallel arrangement of two combined gas and liquid shifting containers 60a, 60b, a separate liquid shifting container 60c and a piston with piston rod as shifting mechanism 61. pressure storage tank 1, collecting basin 7 and other components such as the working machine 4 are not shown in FIG. 4 as they have the same function as in the previous figures. A fluidic connection can be established between the shifting containers 60a and 60c or 60b and 60c via which the shifting mechanism 61 can transport fluid in both directions. A fluidic connection 11 can be made between the shifting containers 60a and 60b on the gas side and the working machine 4 or the gas source/sink 5 and/or a fluidic connection 12 to the pressure storage tank 1. A fluidic connection 13 to the pressure storage tank 1 and/or a fluidic connection 14 to the collecting basin 7 can be made from the liquid shifting container 60c on the liquid side. With this version of the shifting device 6, the shifting mechanism 61 alternately acts on the shifting containers 60a and 60b. As a result, there is more time available in the shifting containers 60a and 60b for the compression or expansion process with a similar performance profile of the shifting mechanism 61 in order to favour any desired thermodynamic properties and processes, such as optimizing and controlling the heat transfer from and to the gas.

FIGS. 5 and 6 show parallel arrangements of shifting containers, which allow liquid to be shifted between the shifting containers 60a, 60b and the pressure storage tank 1 or the collecting basin 7, but also between the shifting containers 60a, 60b themselves by means of the shifting mechanism 61 in the operating modes "Compression mode with post-compression" and "Expansion mode with pre-compression. The time sequence of this process is explained using FIGS. 6a to 6y.

Figure 6A:
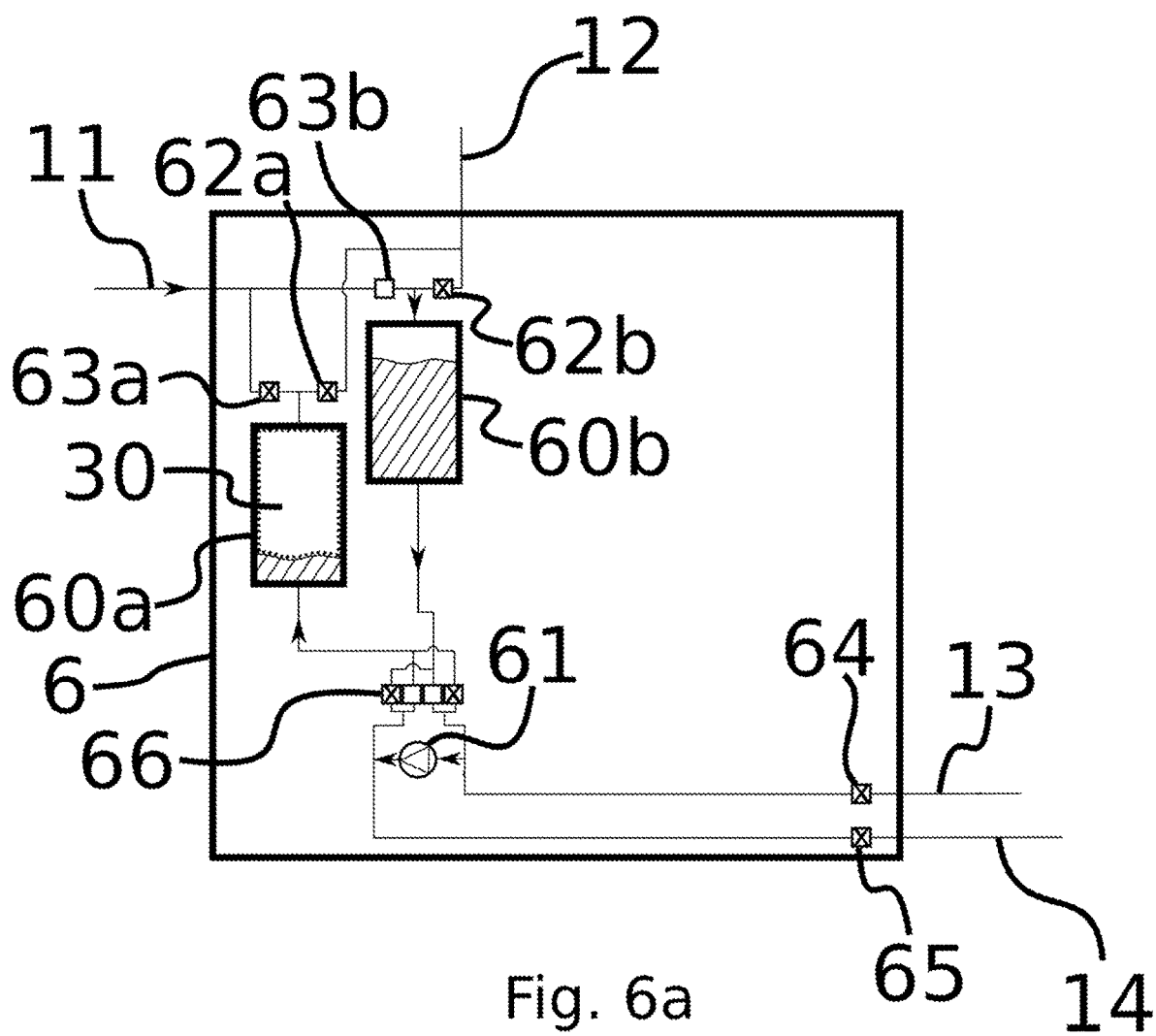
Figure 6B:
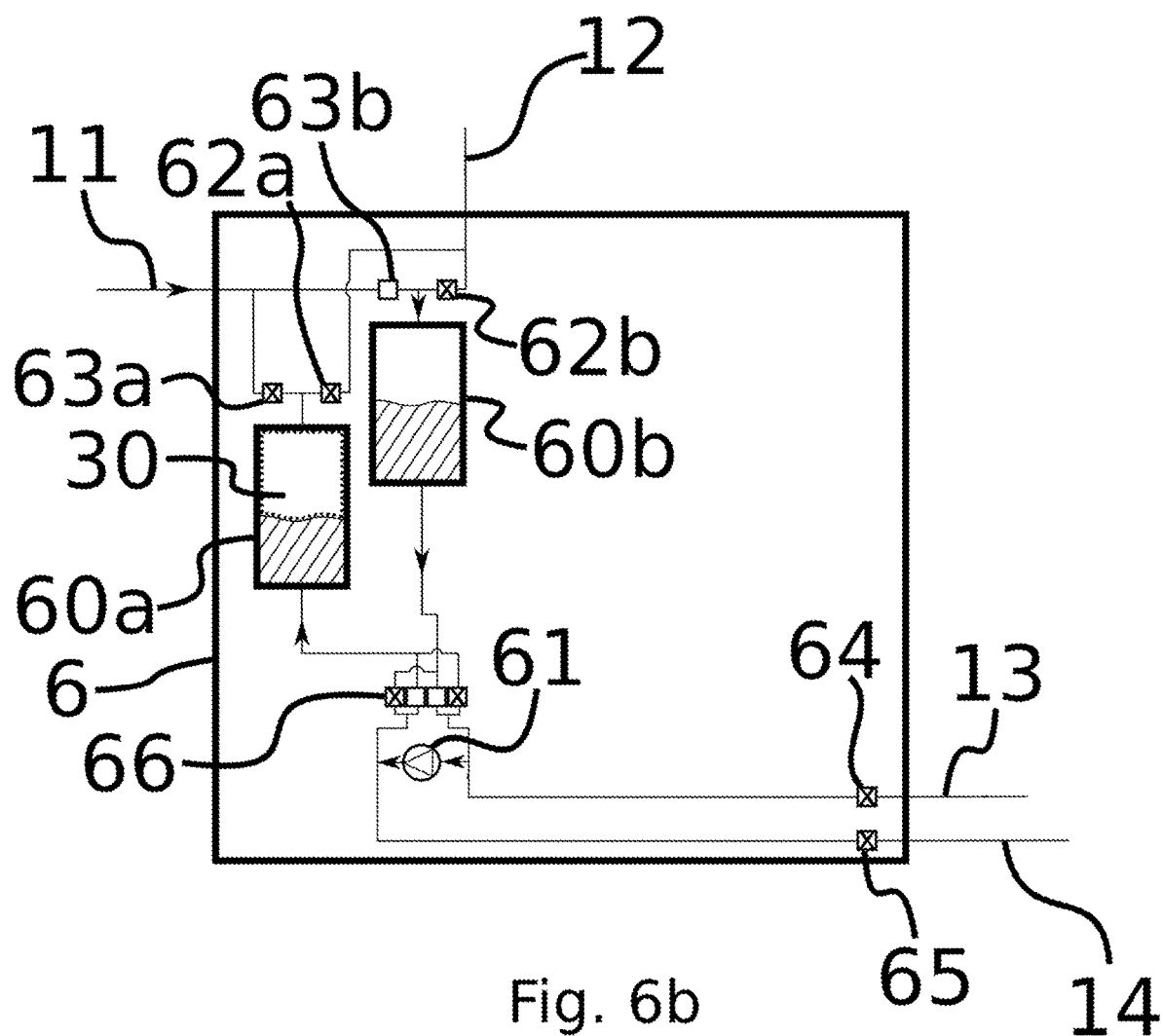
Figure 6C:
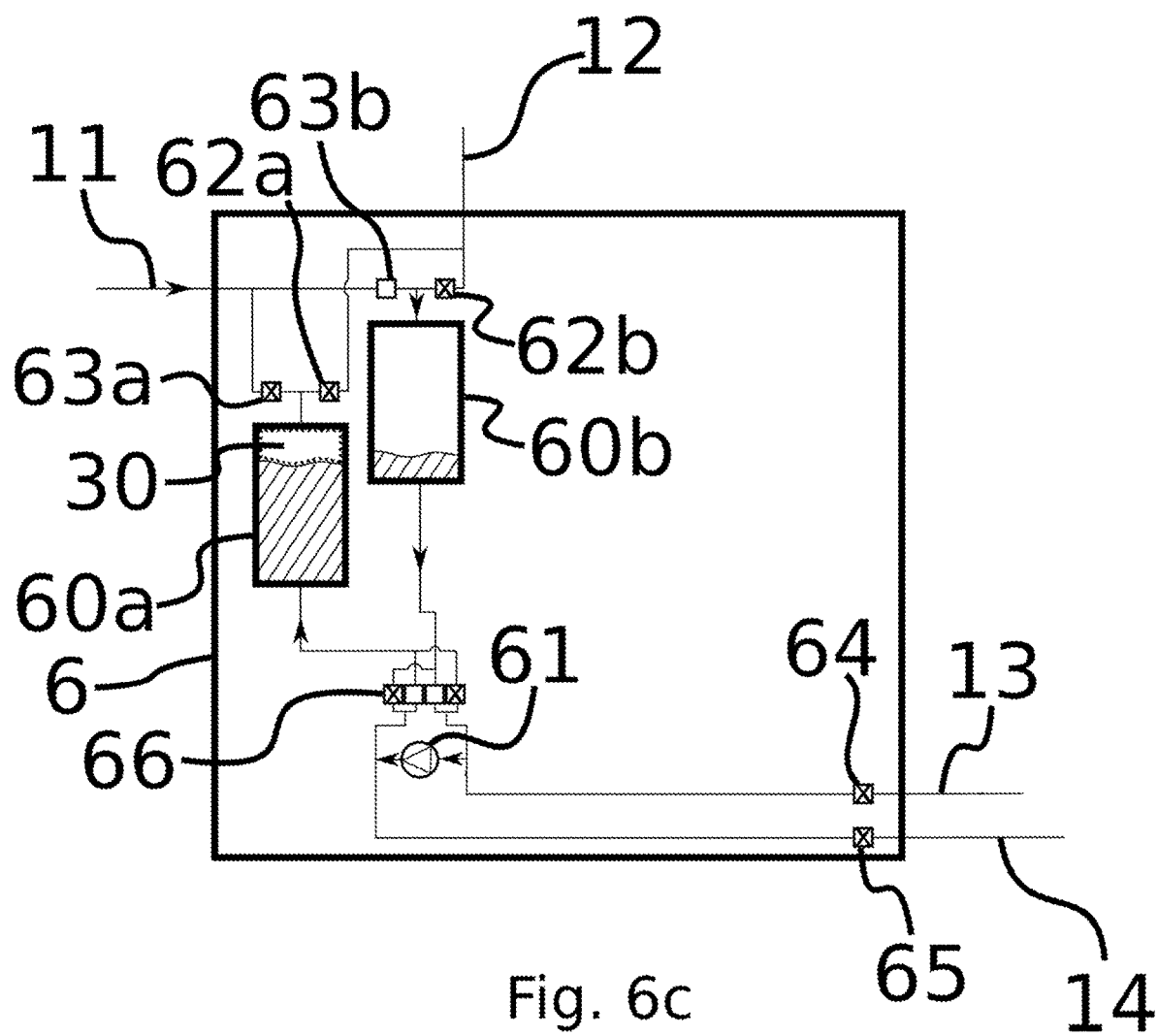
Figure 6D:
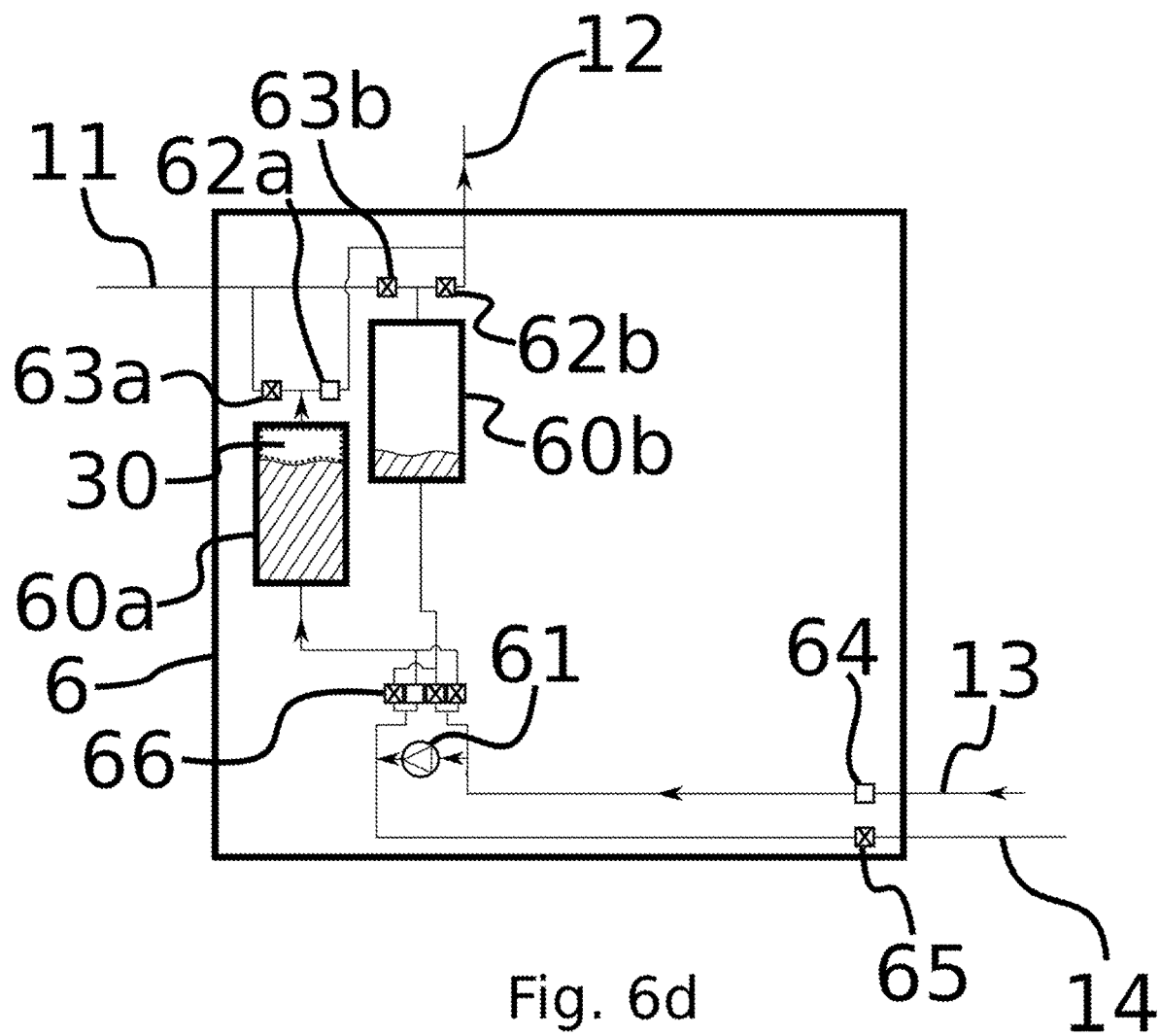
Figure 6E:
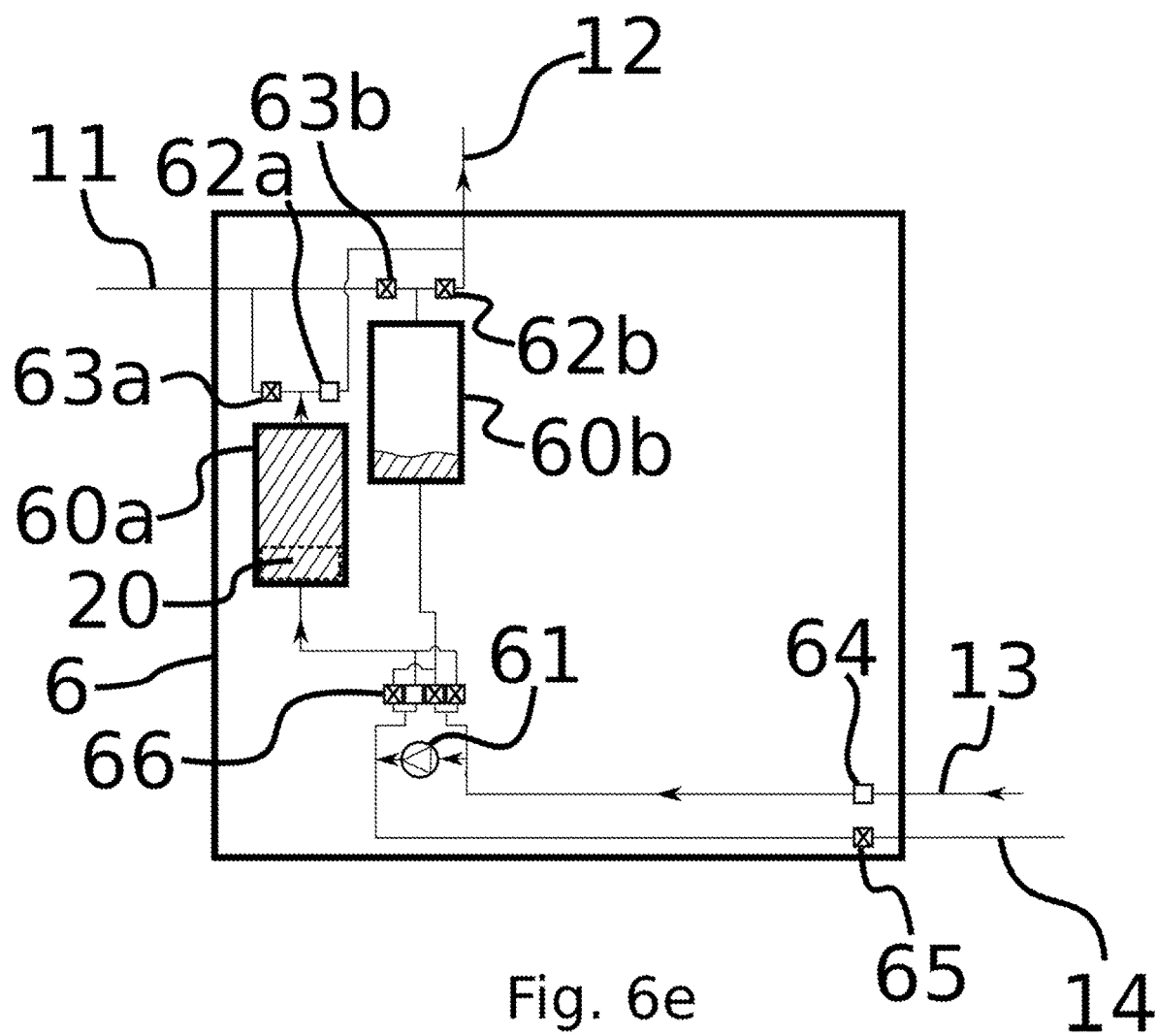
Figure 6G:
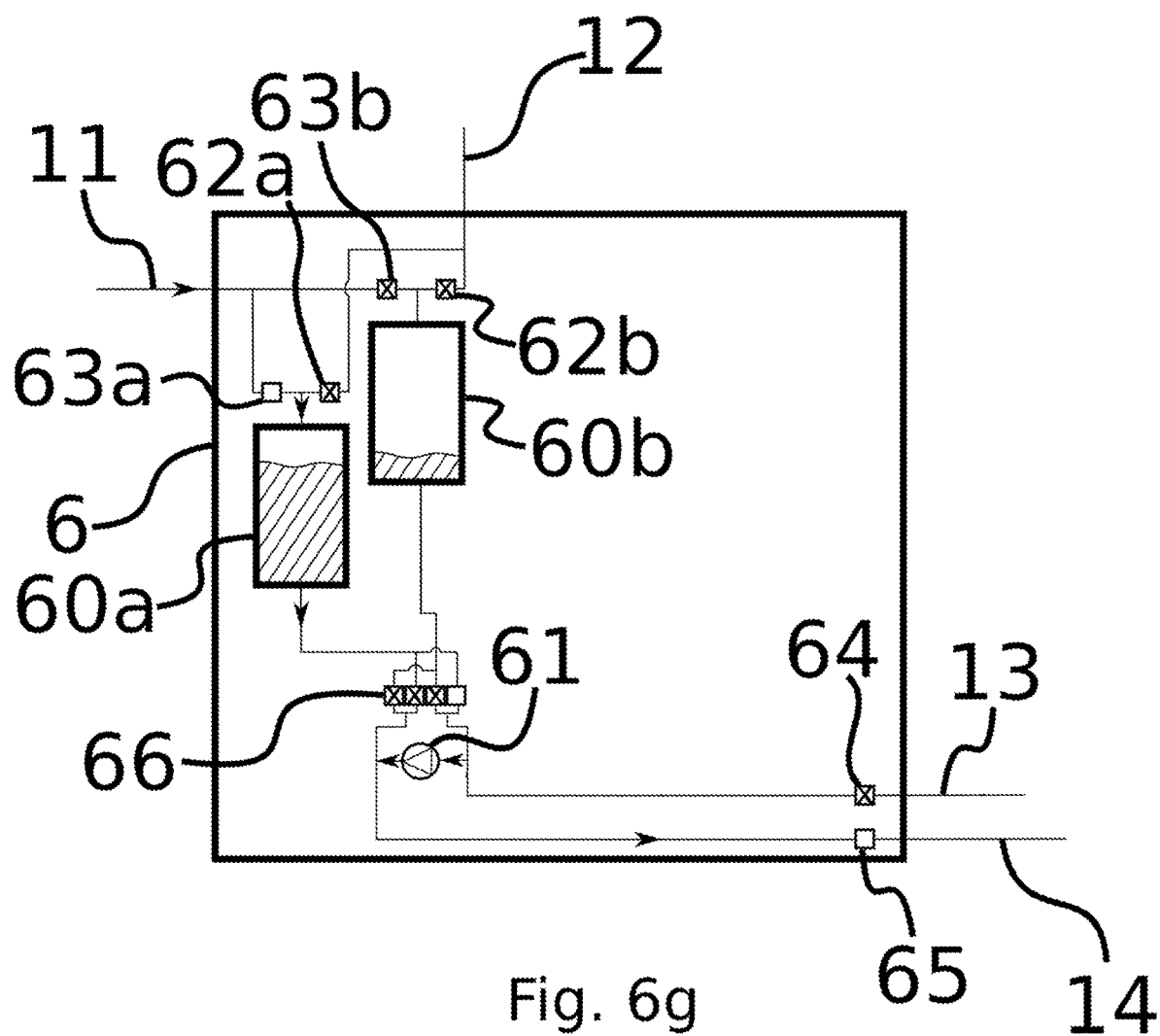
Figure 6H:
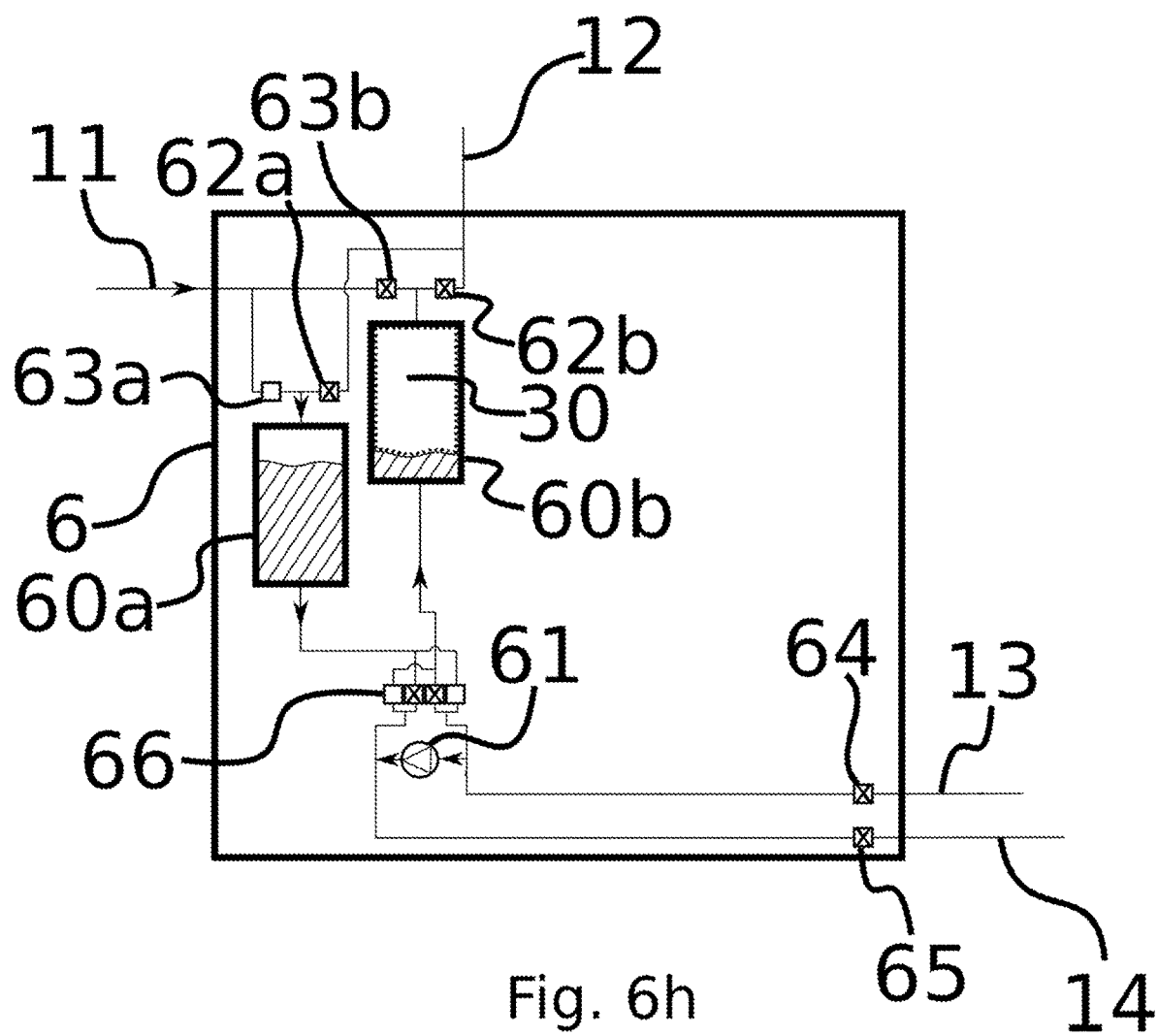
Figure 6I:
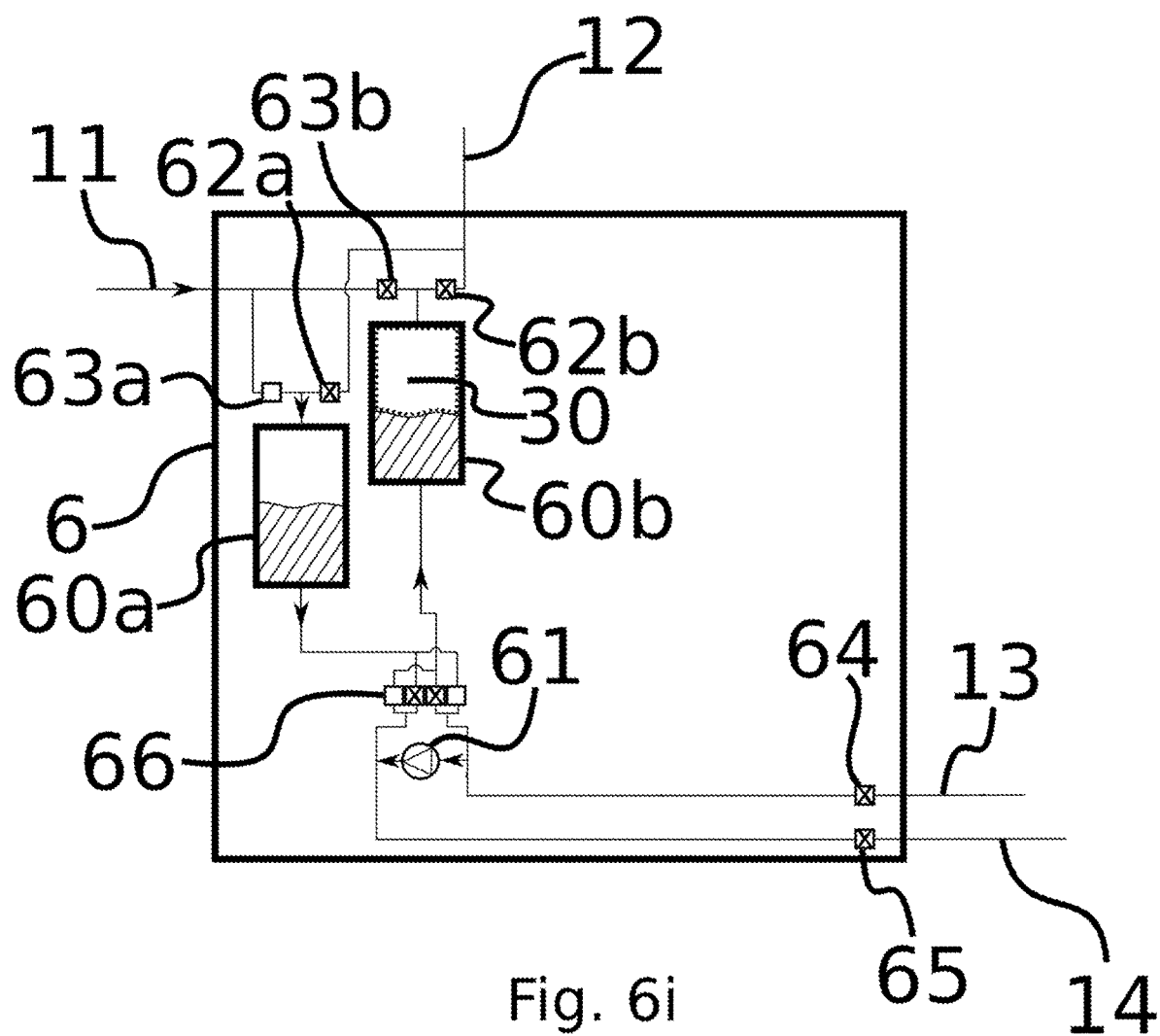
Figure 6J:
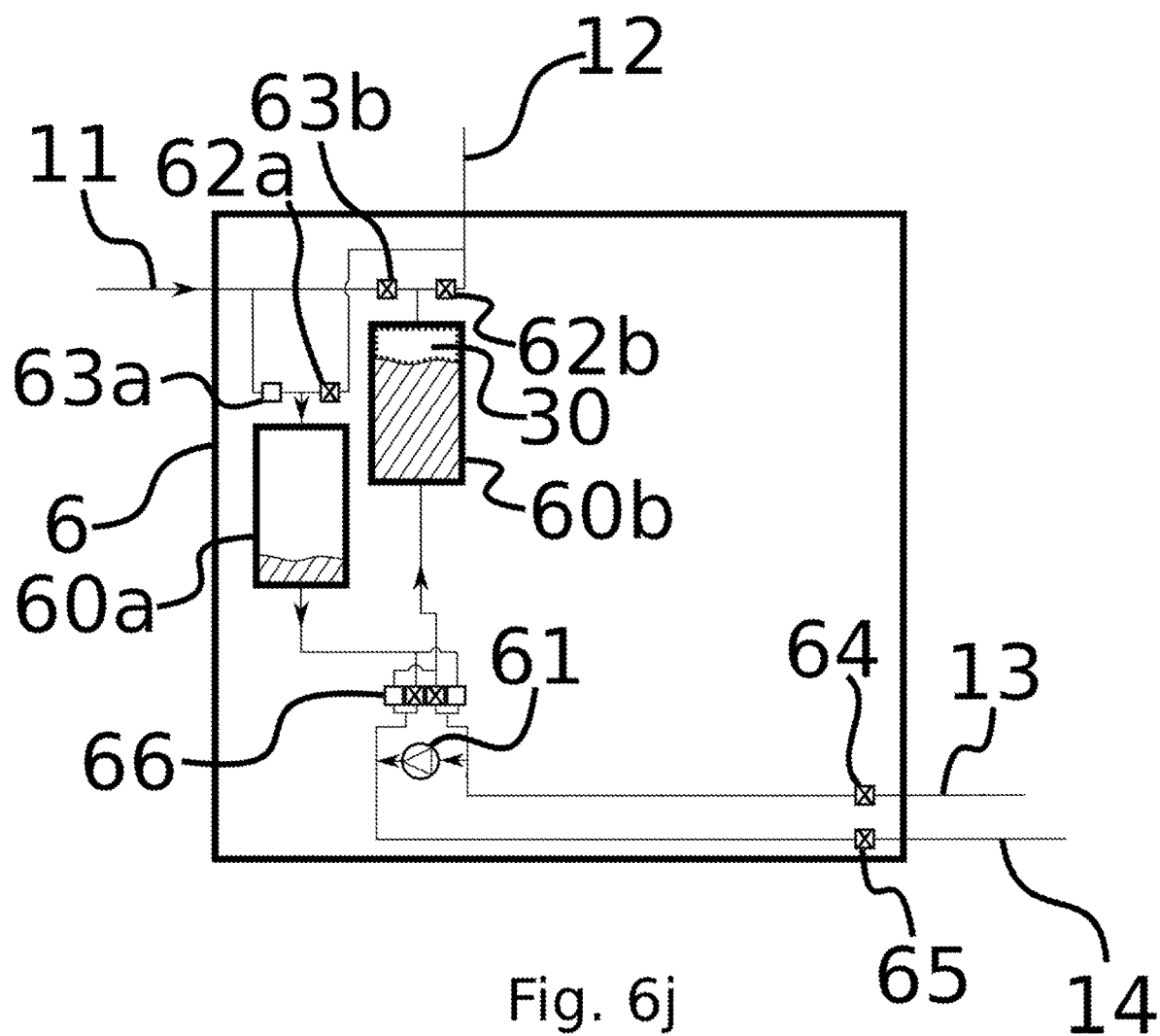
Figure 6K:
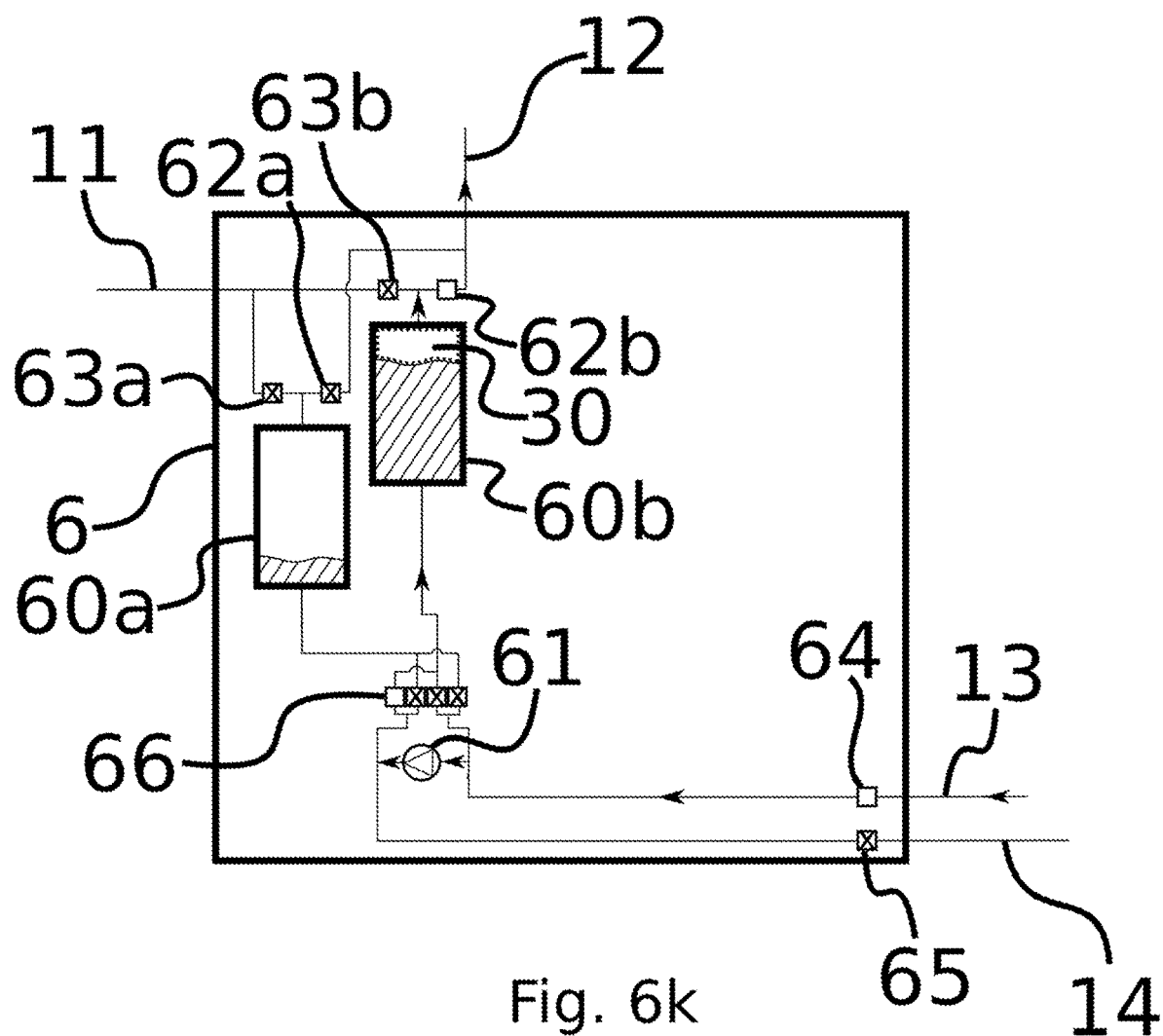
Figure 6L:
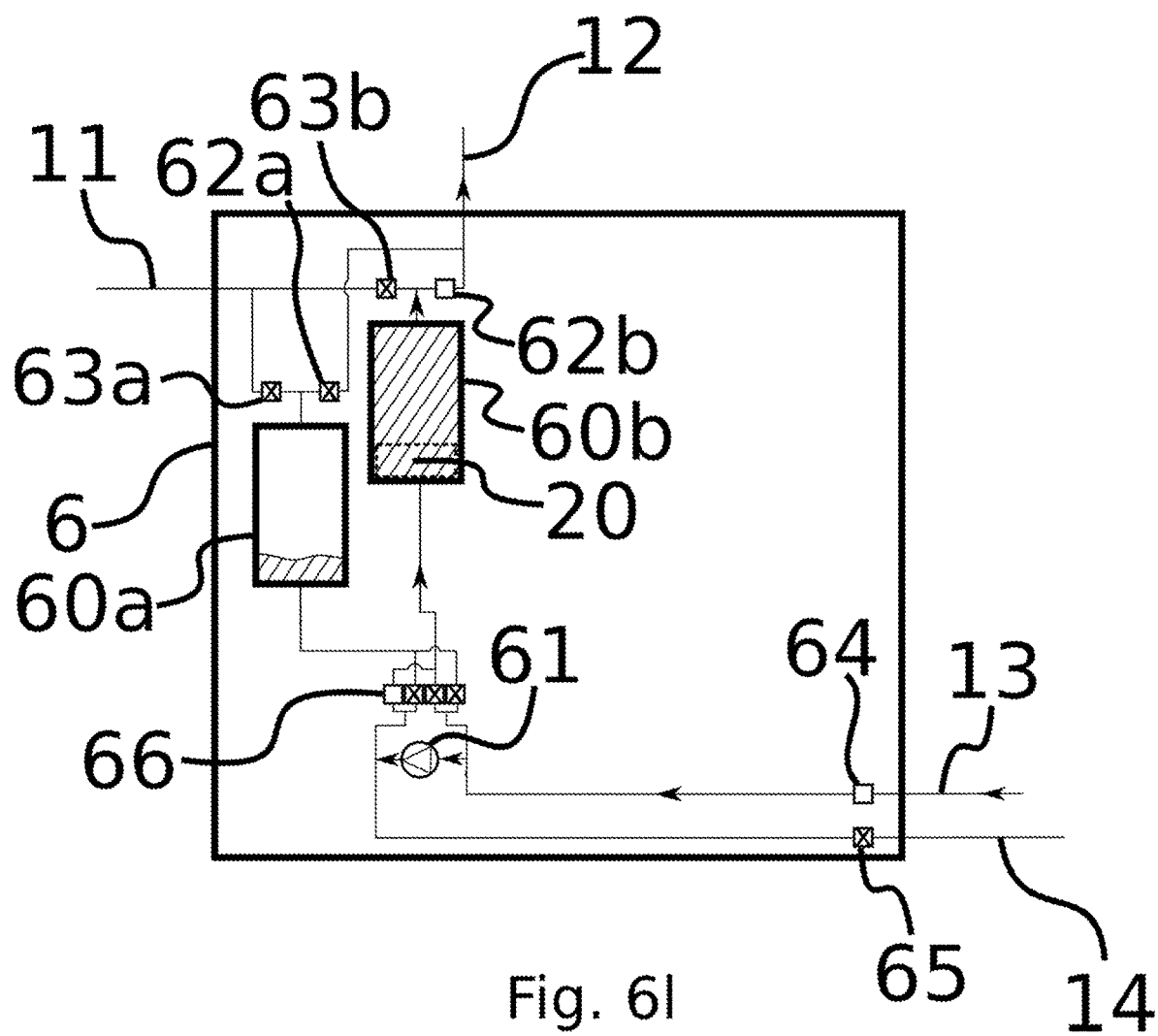
Figure 6M:
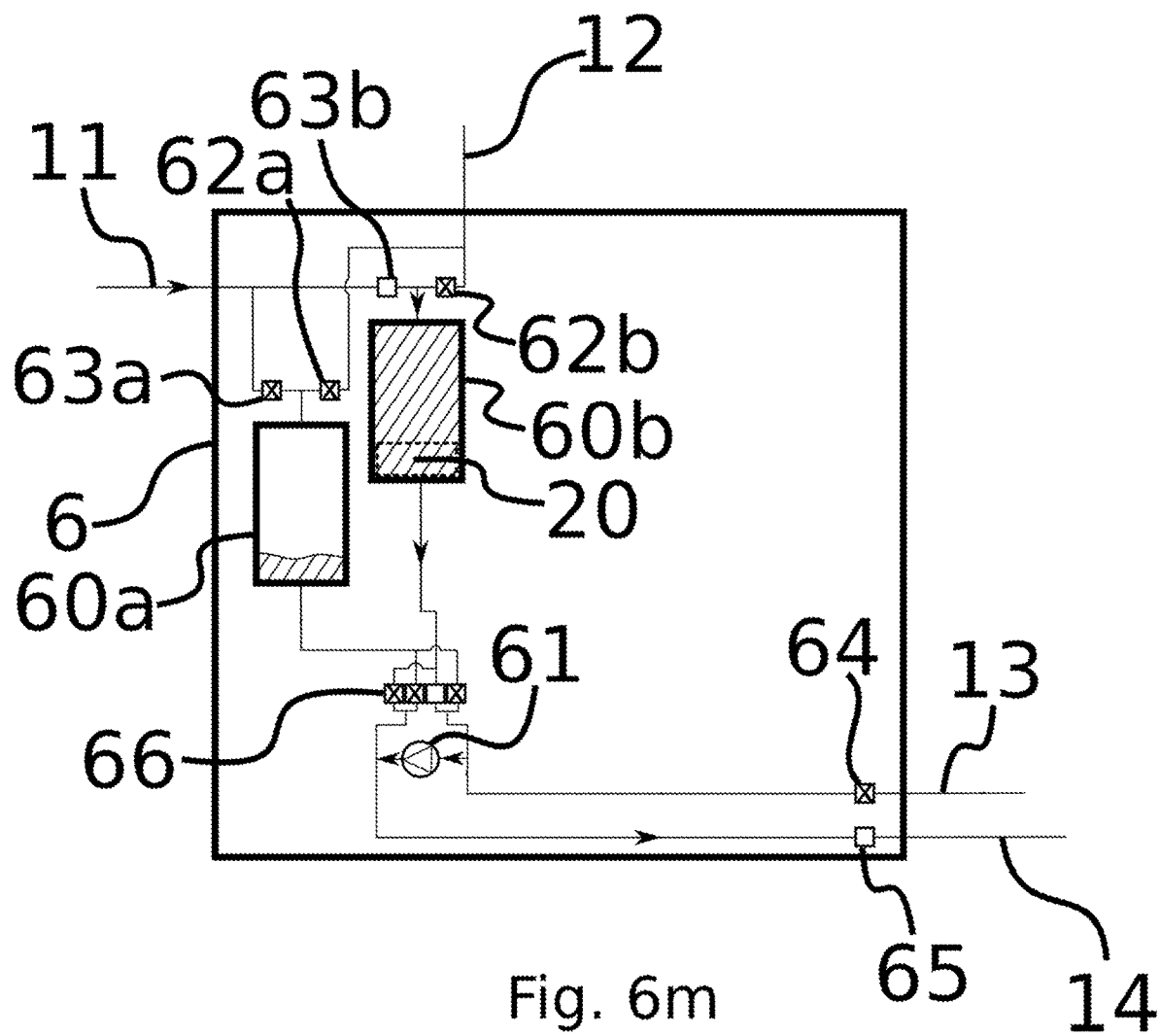
Figure 6N:
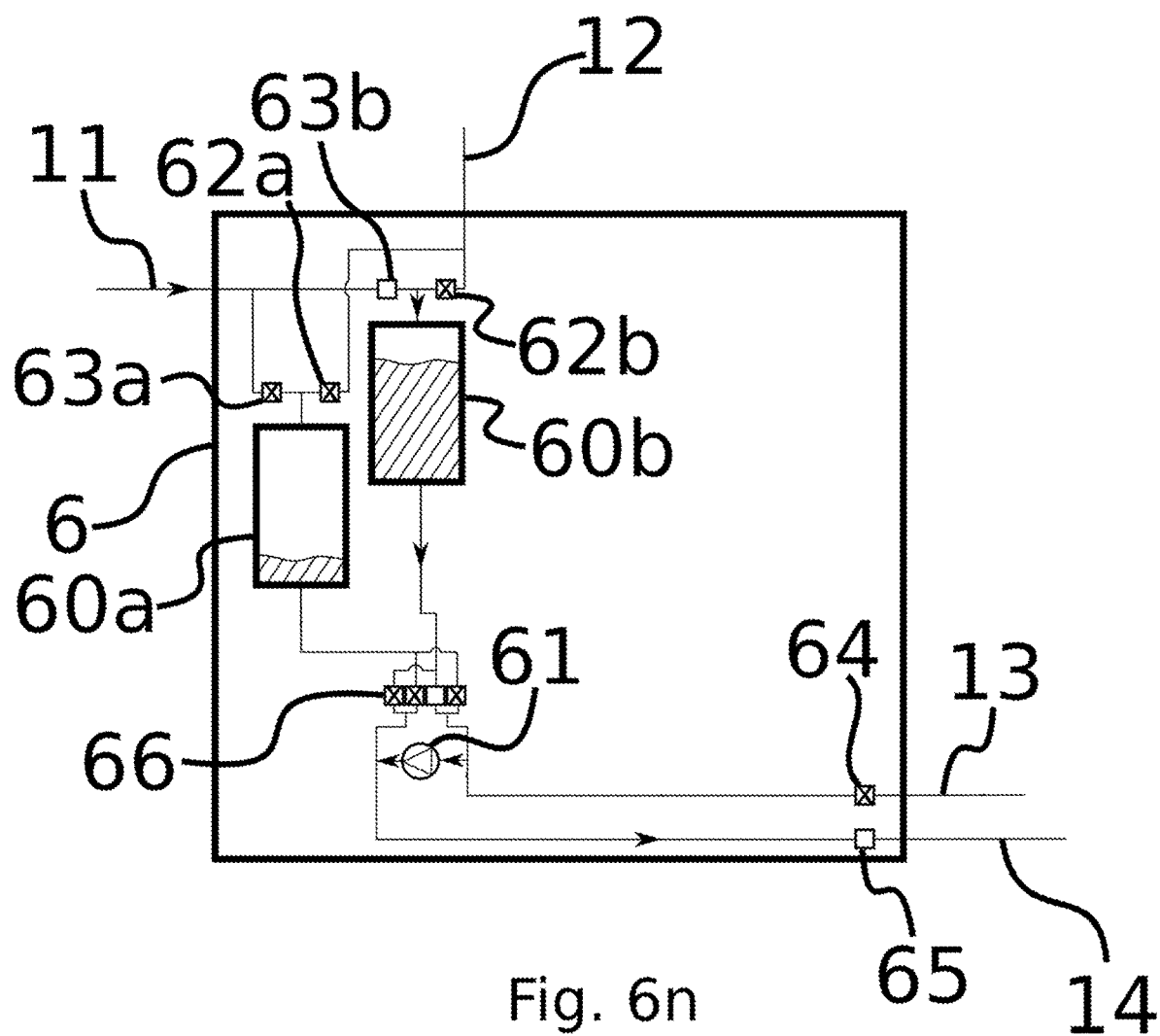
Figure 6O:
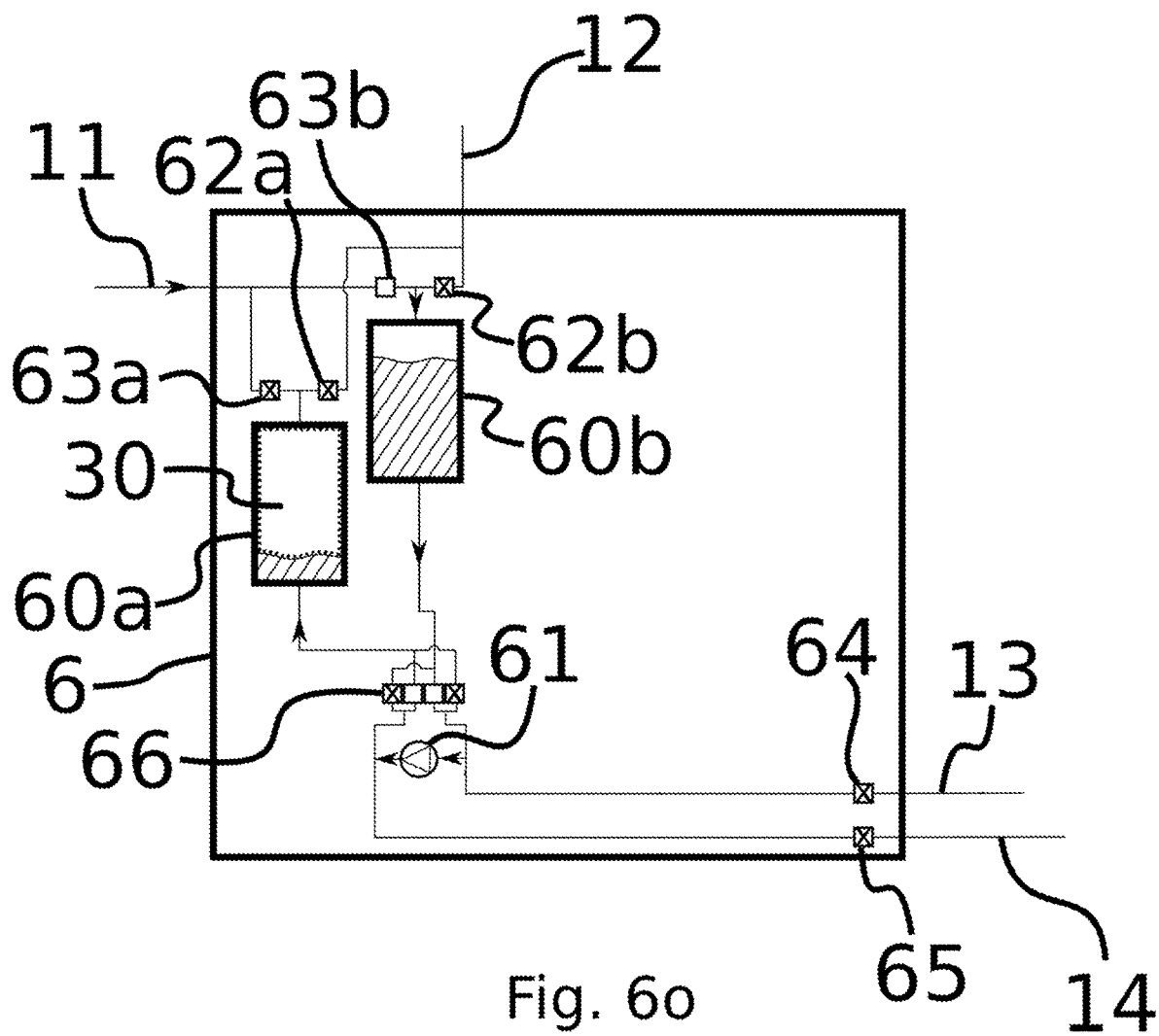
Figure 6P:
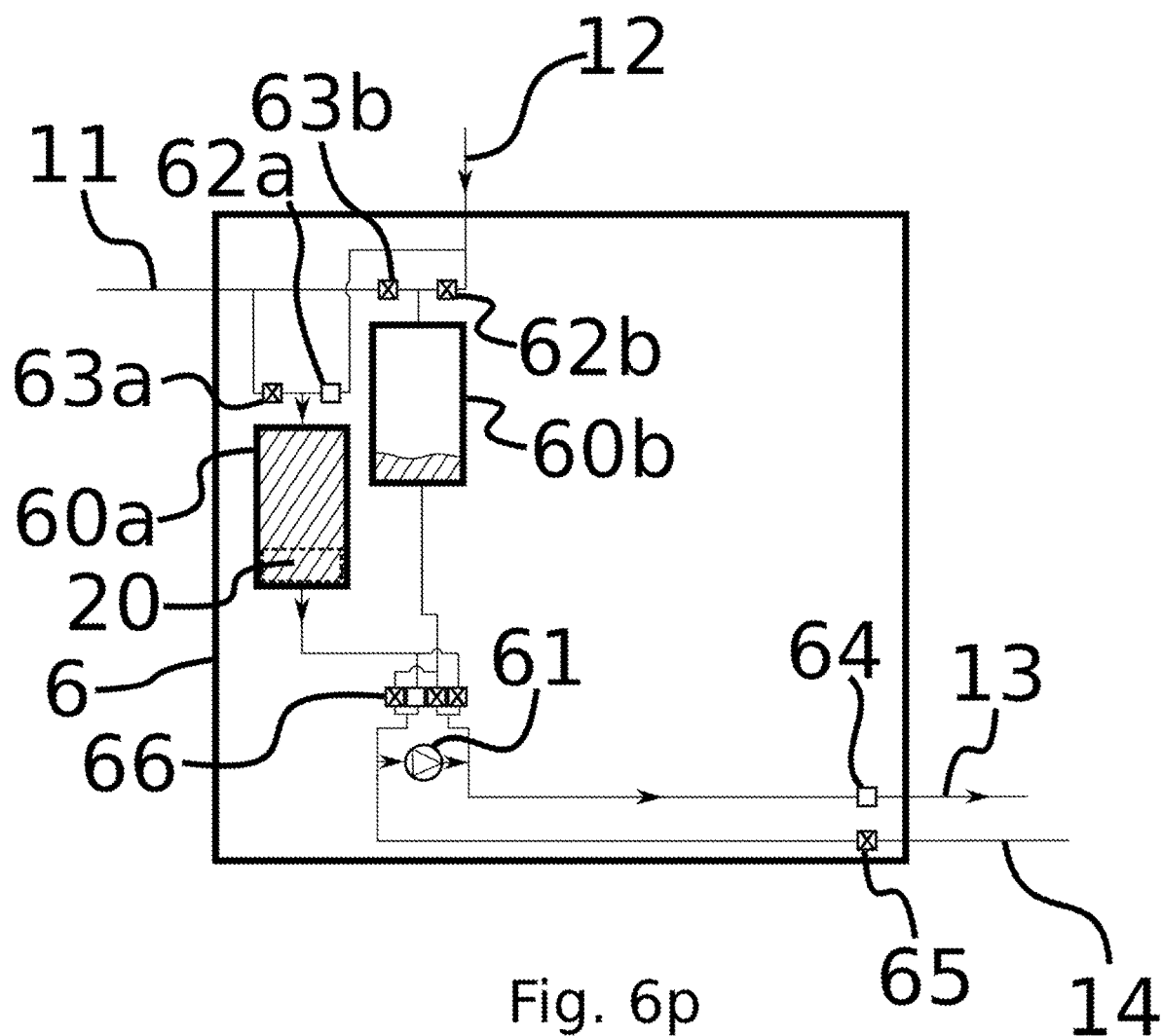
Figure 6Q:
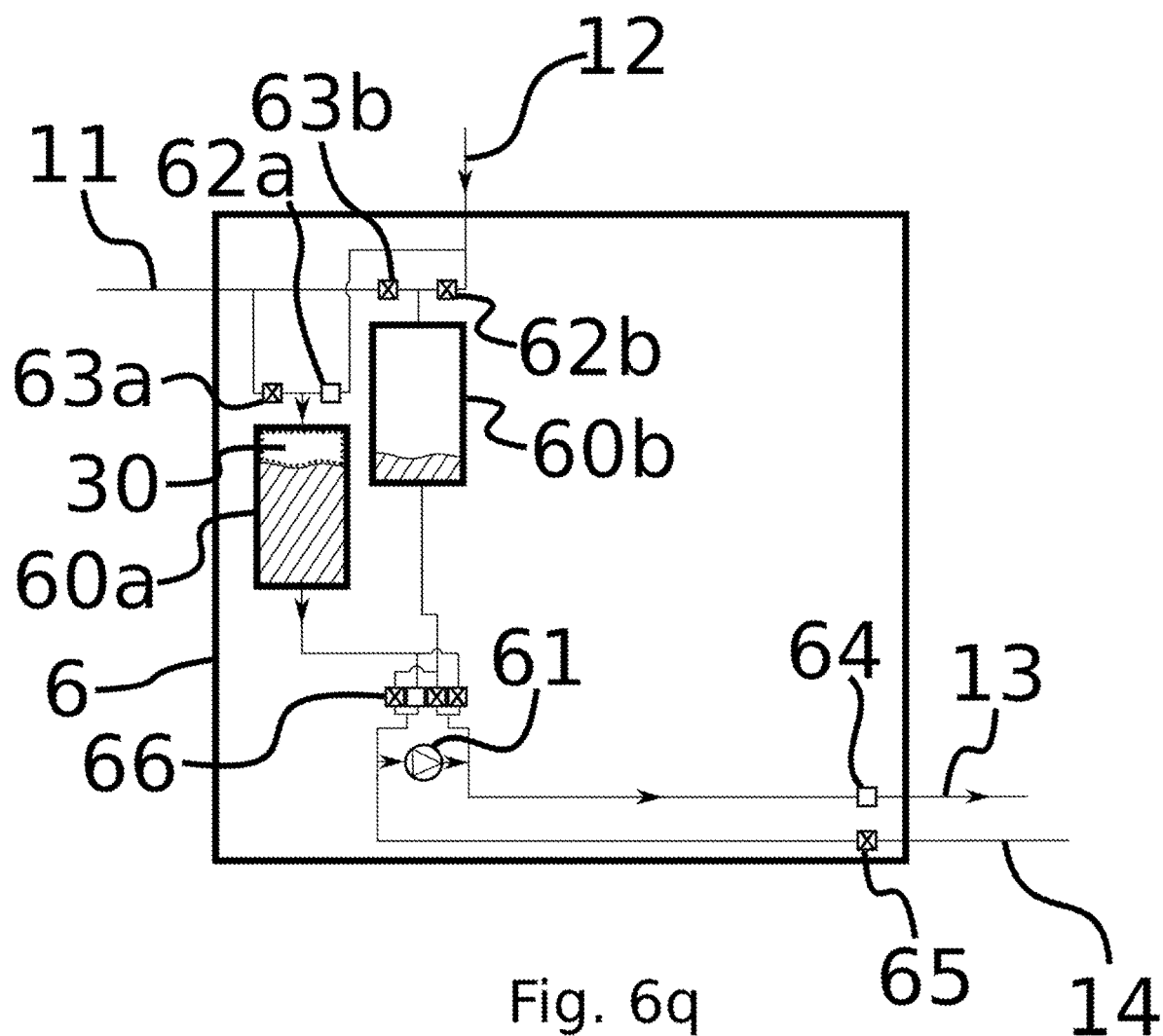
Figure 6R:
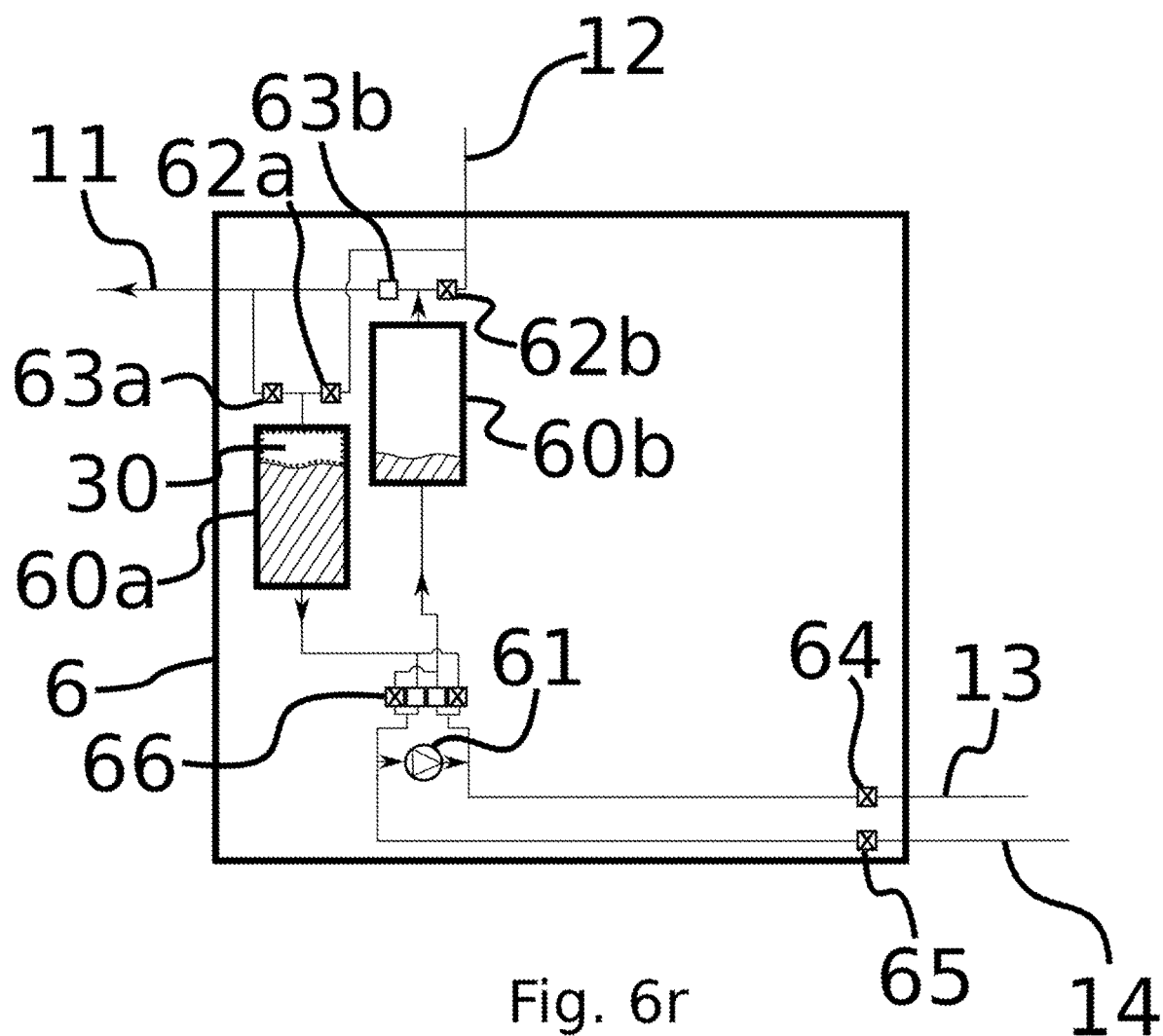
Figure 6S:
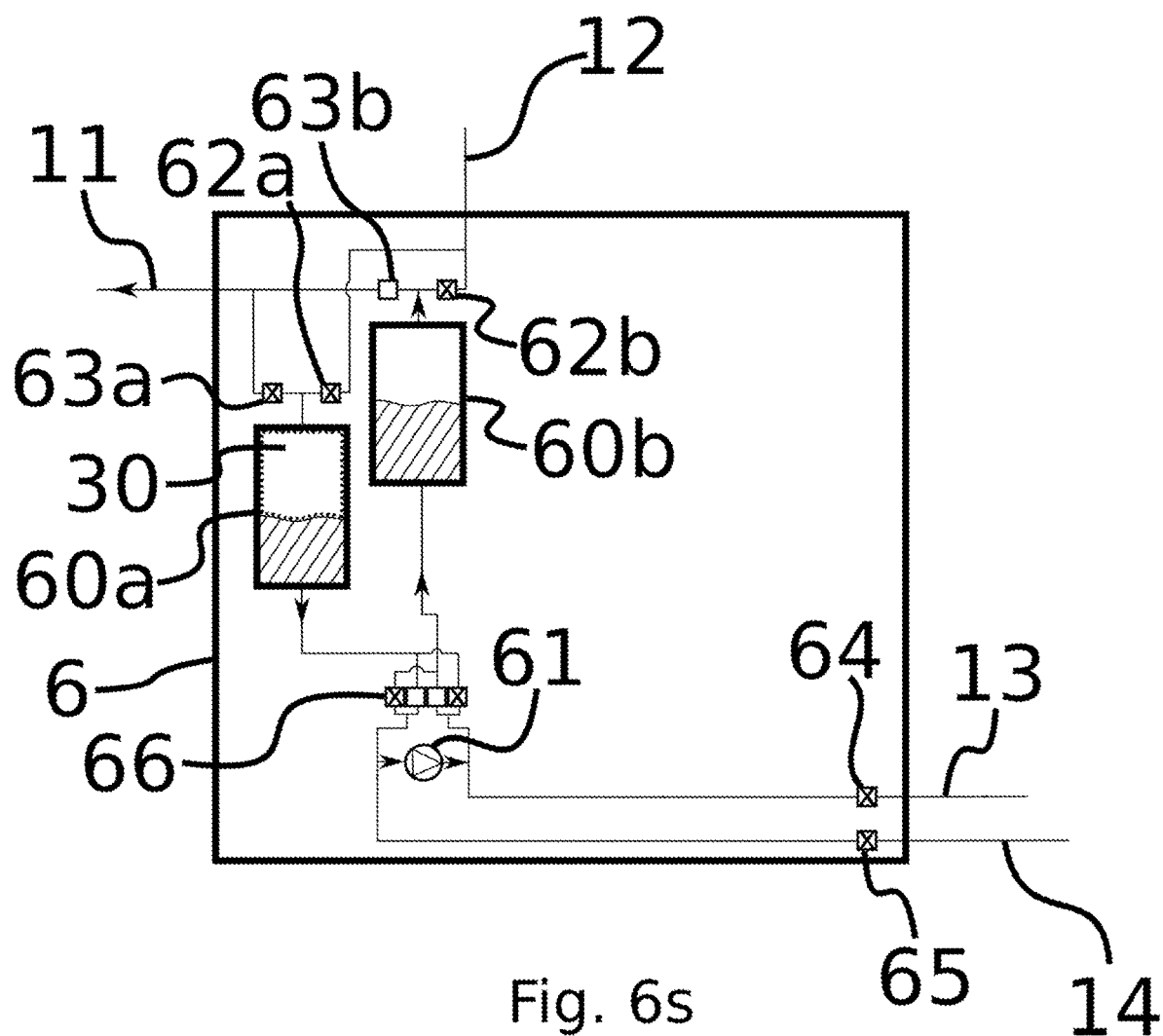
Figure 6T:
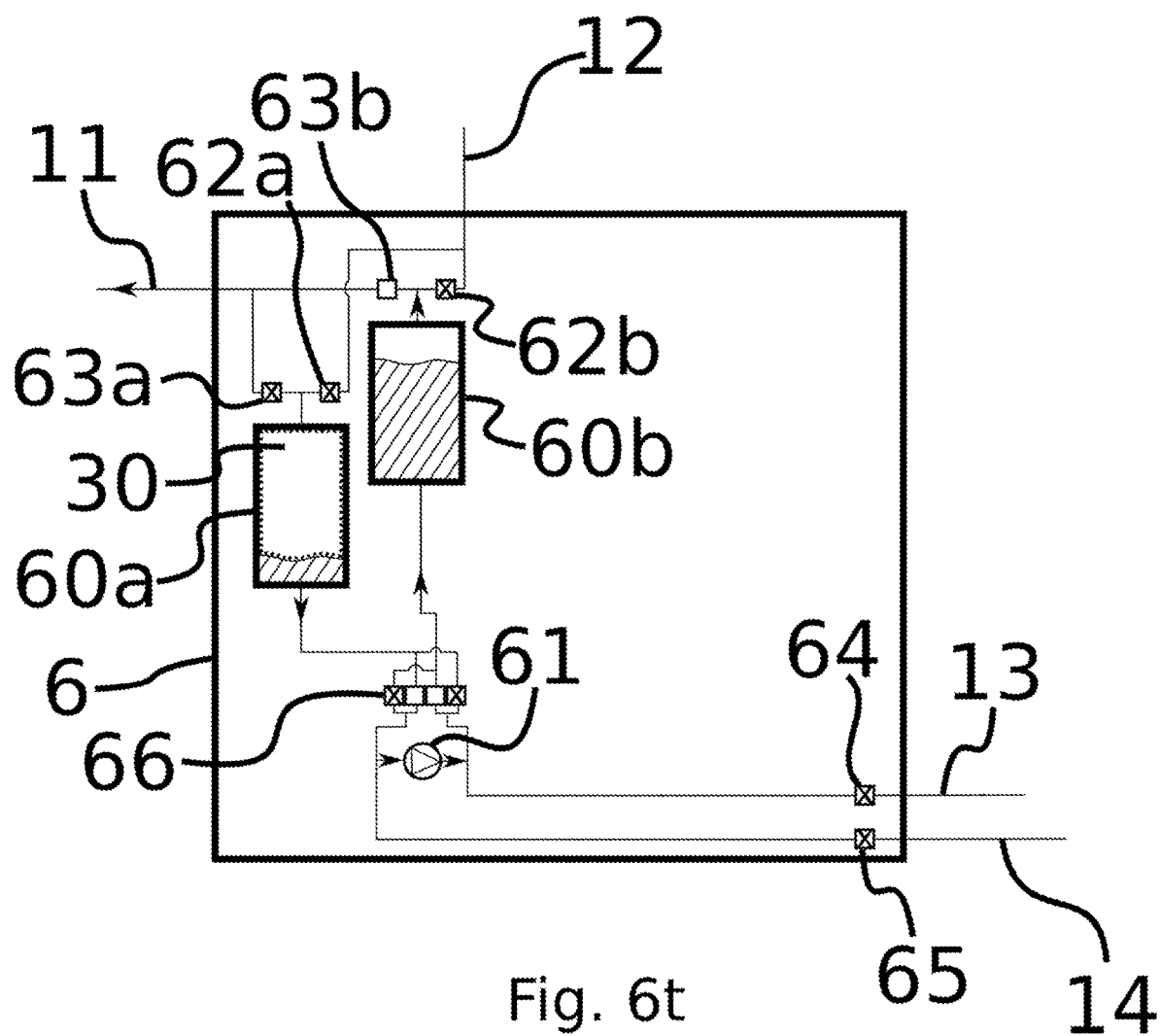
Figure 6U:
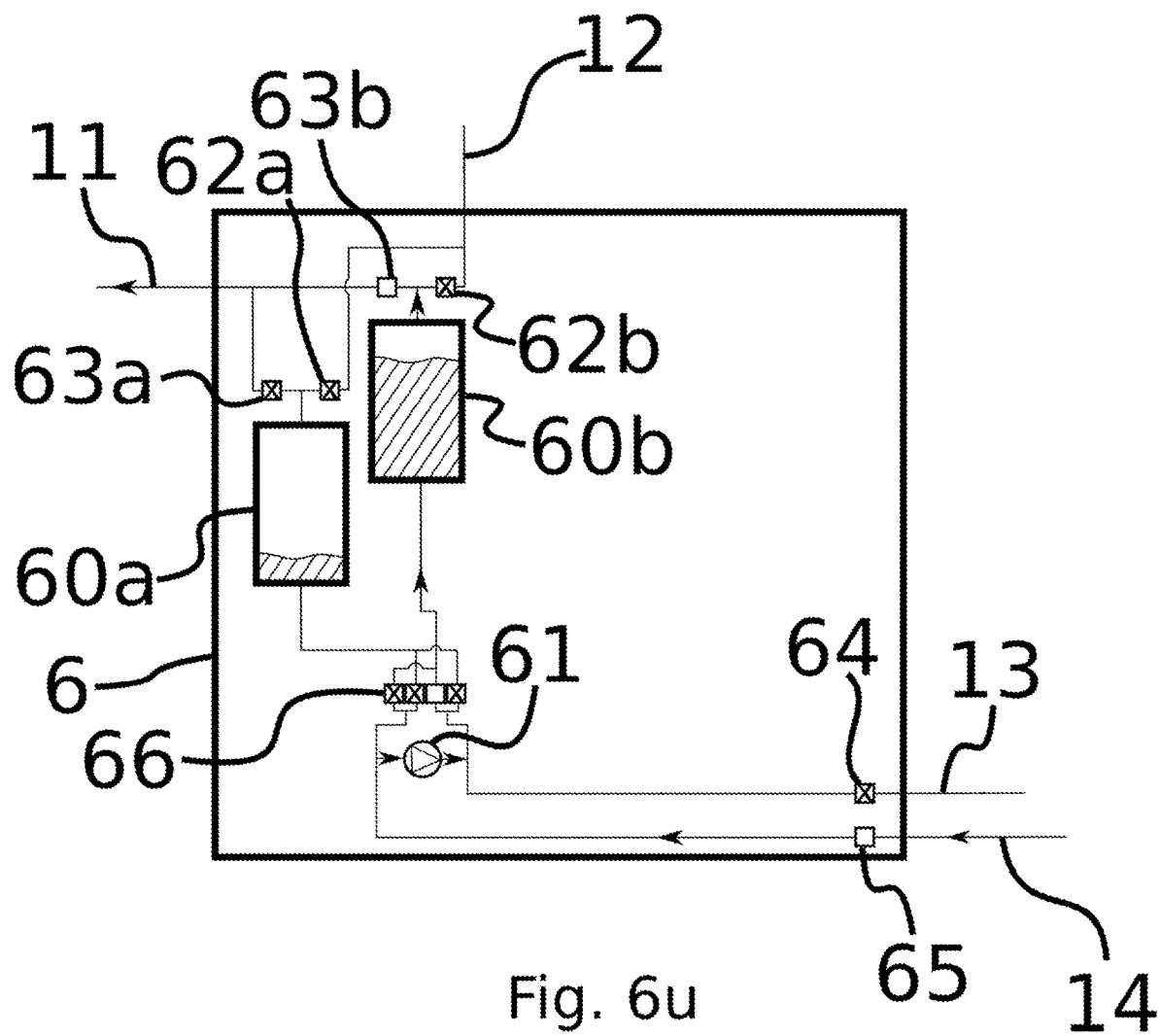
Figure 6F:
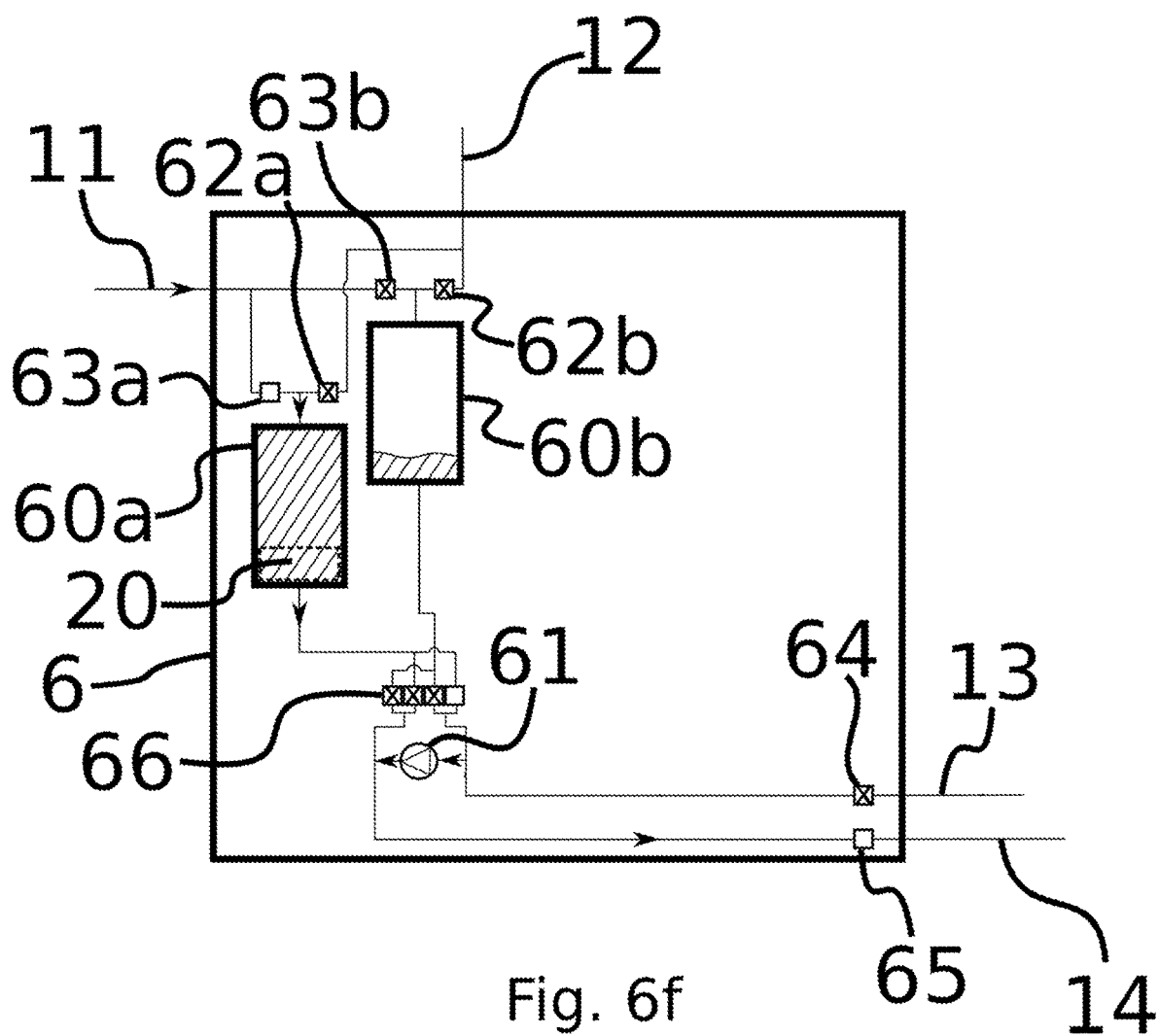
Figure 6V:
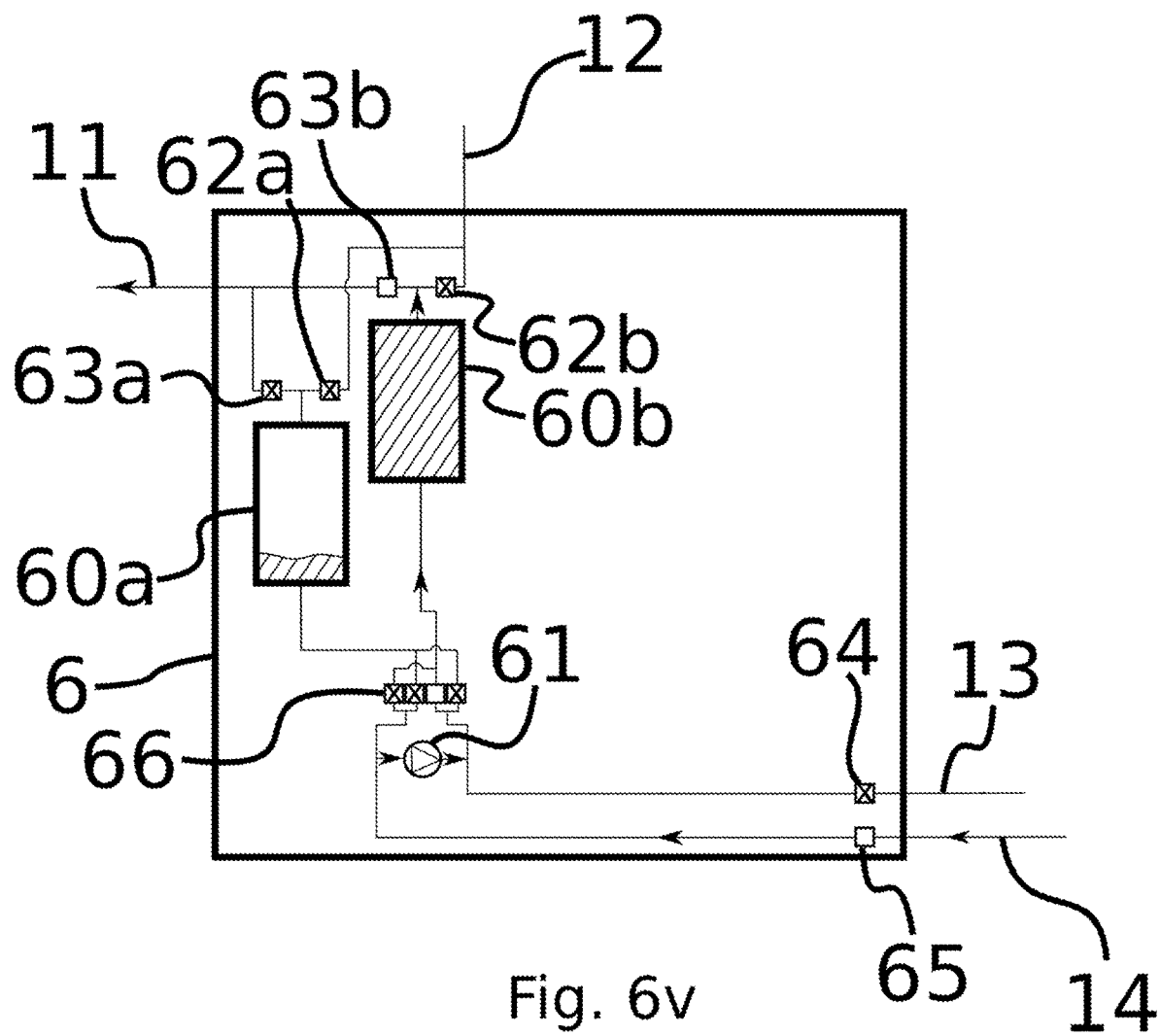
Figure 6W:
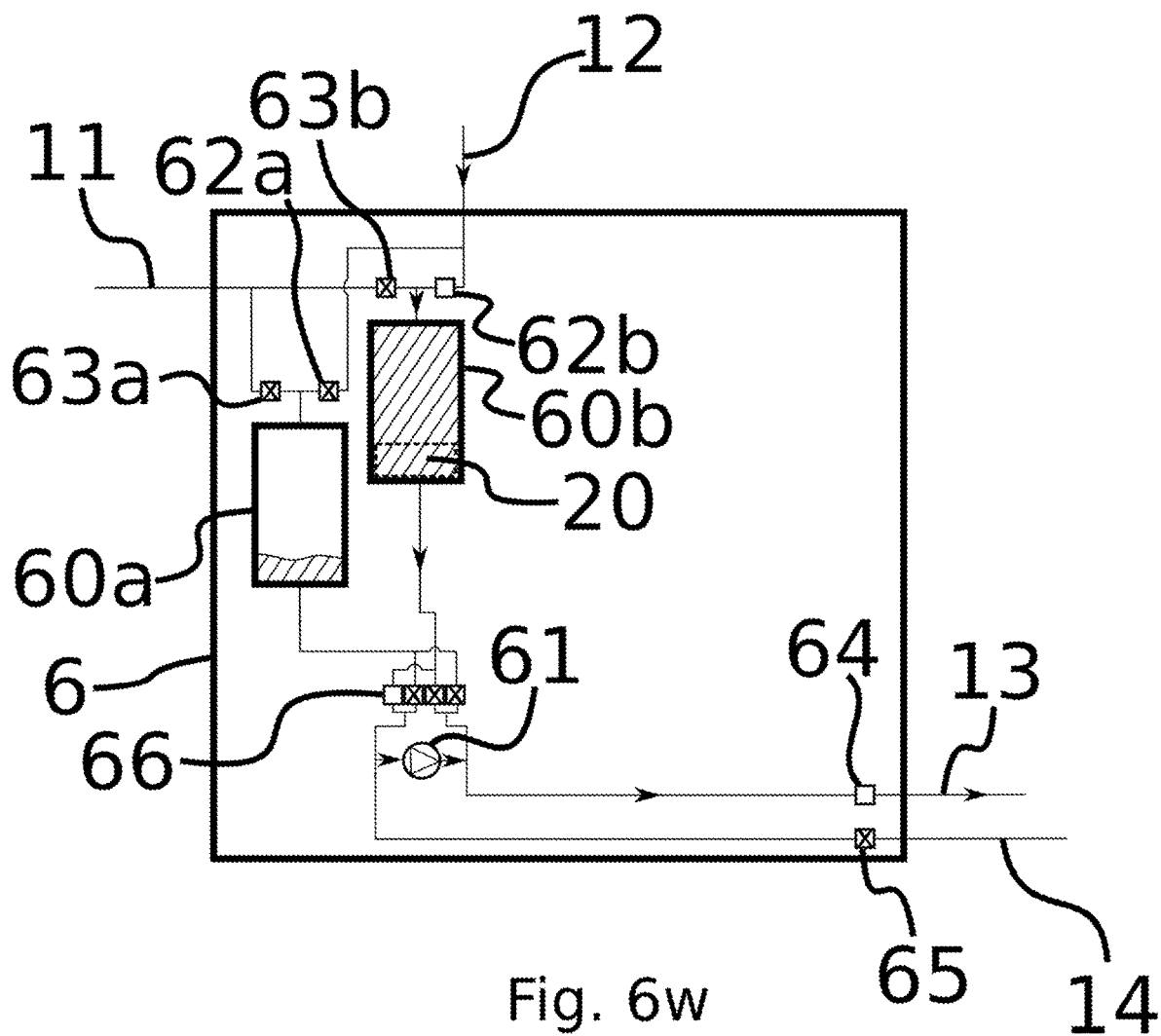
Figure 6X:
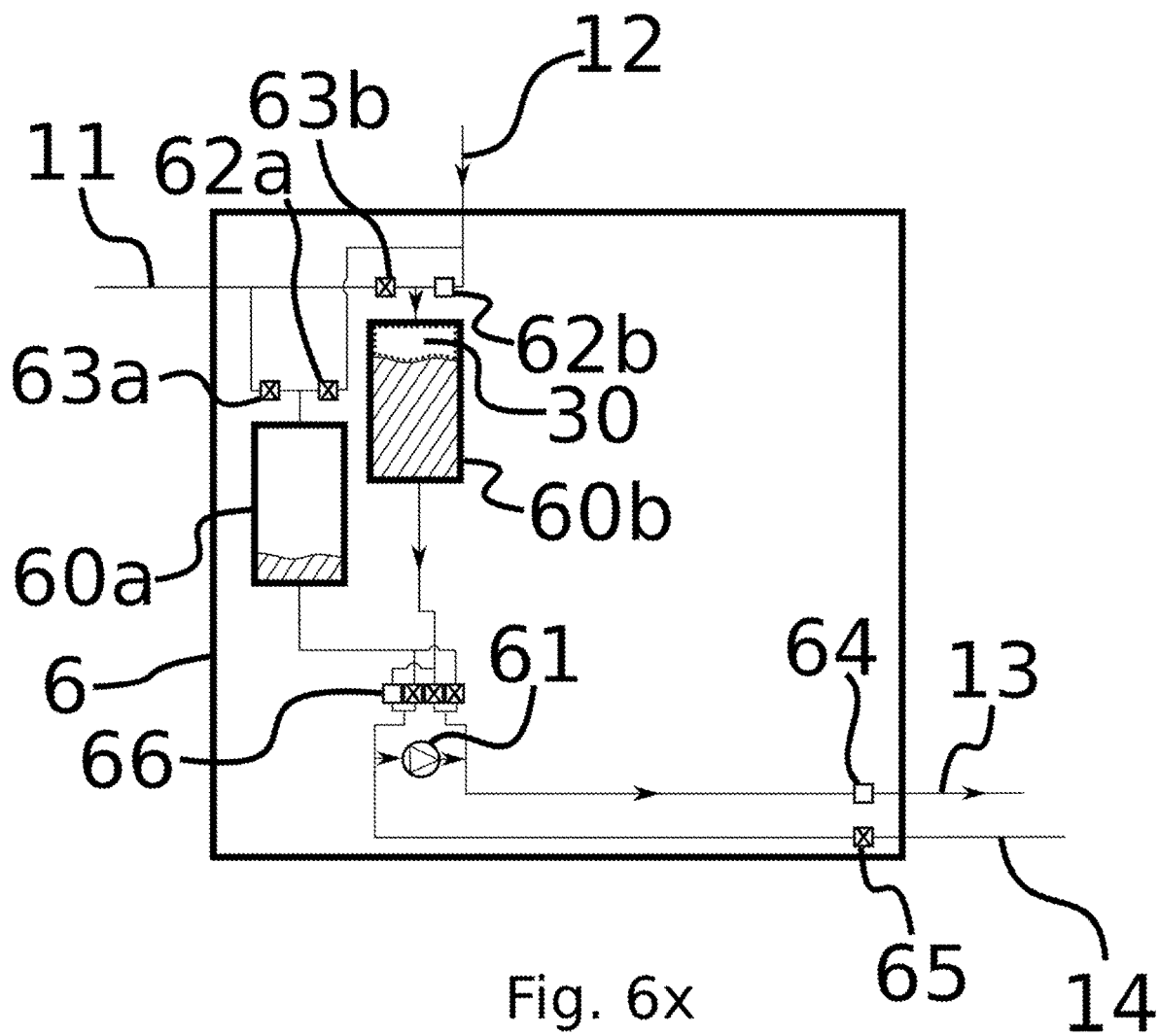
Figure 6Y:
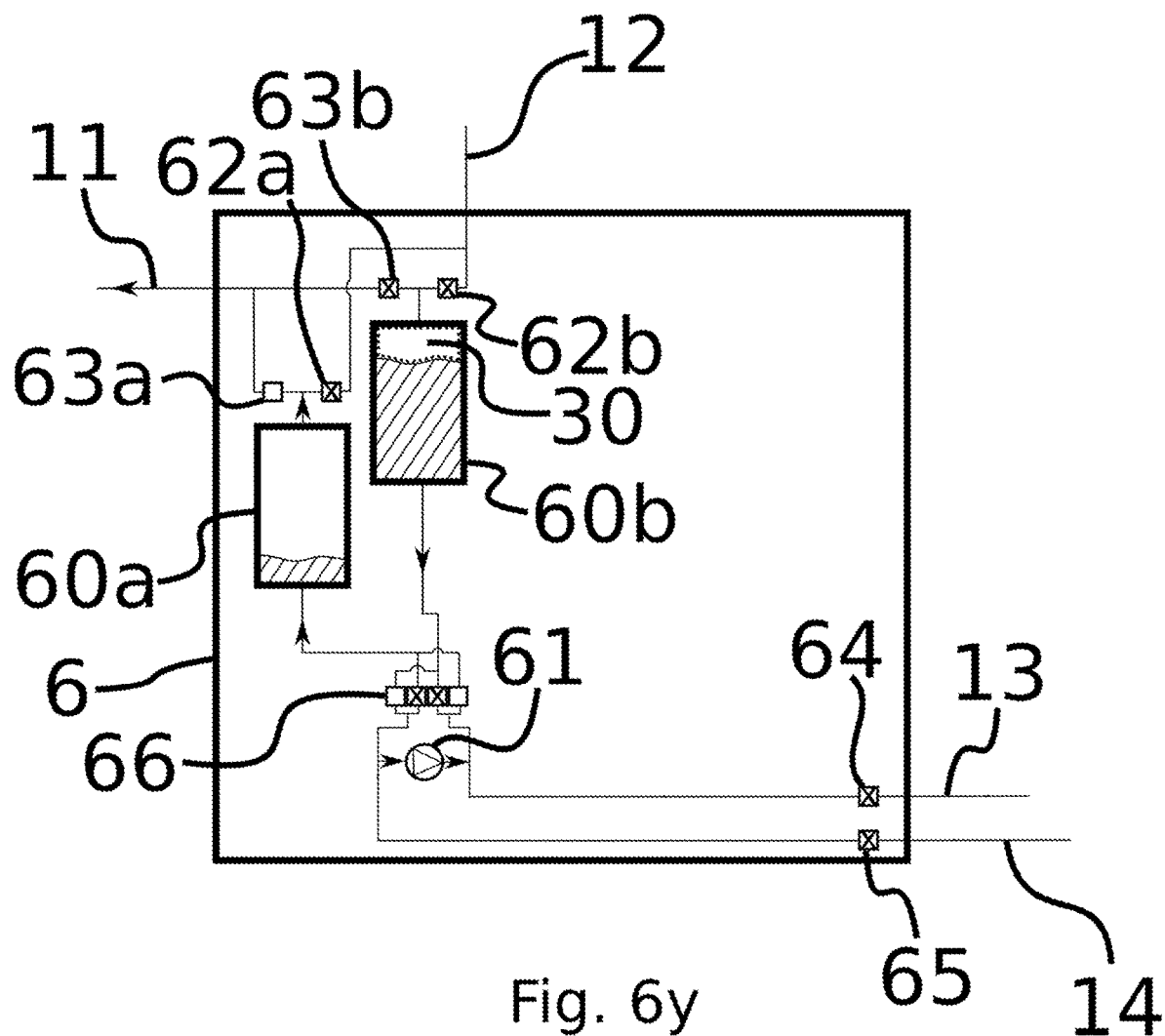

The pressure storage tank 1, the collecting basin 7 and other components such as the working machine 4 are not shown in FIGS. 6a to 6y because they have the same function as in the previous figures.

FIG. 5 shows a possible parallel arrangement of shifting containers 60a, 60b and a piston as shifting mechanism 61. The shifting mechanism 6 shown consists, among other things, of two combined gas and liquid shifting containers 60a and 60b, a separate liquid shifting container 60c and a piston with piston rod, which serves as shifting mechanism 61. A fluidic connection can be established between each of the shifting containers 60a and 60c or 60b and 60c, whereby the shifting mechanism 61 can, among other things, shift liquid between the shifting containers 60a and 60b in both directions. A fluidic connection 11 can be made on the gas side from the shifting containers 60a and 60b to the working machine 4 or the gas source/sink 5 and/or a fluidic connection 12 to the pressure storage tank 1. A fluidic connection 13 to the pressure storage tank 1 and/or a fluidic connection 14 to the collecting basin 7 can be made from the liquid shifting container 60c on the liquid side. With this version of the shifting device 6, the shifting mechanism 61 can alternately and simultaneously act on the shifting containers 60a and 60b.

FIGS. 6 and 6a to 6y show a possible parallel design of shifting containers 60a and 60b and a liquid pump as shifting mechanism 61. From the combined gas and liquid shifting containers 60a and 60b, a fluid connection 11 to the working machine 4 or the gas source/sink 5 and/or a fluid connection 12 to the pressure storage tank 1 can be made on the gas side. In addition, a fluidic connection 13 to the pressure storage tank 1, a fluidic connection 14 to the collecting basin 7 and/or a fluidic connection between the shifting containers 60a and 60b can be established on the liquid side. Together with the valves 64 and 65, the valve block 66, consisting of four individual valves, enables the definition of the direction of flow of liquid through the liquid pump 61 from/to the shifting containers 60a and 60b, from/to the collecting basin 7 and from/to the pressure storage tank 1. This allows liquid to be shifted in both directions between a shifting container 60a or 60b and the pressure storage tank 1, the collecting basin 7 or between the shifting containers 60a and 60b themselves.

FIGS. 6a to 6c show the time sequence of the compression of a unit of gas 30 within a shifting container 60a. Liquid is moved from the parallel shifting container 60b by the shifting mechanism 61 into the shifting container 60a in order to compress the unit of gas 30. Through the fluidic connection 11 gas flows into the shifting container 60b. As soon as the unit of gas 30 has reached the desired pressure level, the fluidic connections 12 and 13 are established between the shifting container 60a and the pressure storage tank 1 as shown in FIG. 6d in order to transport the unit of gas 30 compressed by means of the shifting mechanism 61 into the pressure storage tank 1 by applying the procedure already described, whereby a unit of liquid 20 is taken from the pressure storage tank 1 in order to shift the unit of gas 30 compressed with low power from the shifting container 60a into the pressure storage tank 1. In FIG. 6e the completed shifting process is shown, whereby the unit of liquid 20 is located in the shifting container 60a in order to be shifted into the collecting basin 7 as shown in FIGS. 6f and 6g by establishing the fluidic connection 14 between the shifting device 6 and the collecting basin 7. As the fluidic connection 11 is established between the shifting device 6 and the working machine 4 or directly to the gas source 5, gas can flow into the shifting container 60a. As shown in FIGS. 6h to 6j, the process of compressing a unit of gas 30 in shifting container 60b is repeated in order to be shifted into pressure storage tank 1 as shown in FIGS. 6k and 6l, whereby a unit of liquid 20 is taken from pressure storage tank 1 and shifted into collecting basin 7 as shown in FIGS. 6m and 6n. The processes in FIGS. 6h to 6n are not explained in detail because they correspond in principle to the processes in FIGS. 6a to 6g. FIG. 6o then shows the continuation in time, whereby the state of the shifting device 6 again corresponds to the state in FIG. 6a and the entire process of compressing gas and introducing it into the pressure storage tank 1 can be repeated.

FIGS. 6p to 6y show the time sequence for withdrawing compressed gas 3 from the pressure storage tank 1 by means of the shifting device 6 and bringing it to a lower pressure level in the operating mode "Expansion mode with pre-expansion".

FIG. 6p and FIG. 6q show the time sequence for withdrawing a unit of compressed gas 30 from pressure storage tank 1 by moving a unit of liquid 20 from the shifting container 60a into pressure storage tank 1 by means of shifting device 6 and establishing fluidic connections 12 and 13 between shifting device 6 and pressure storage tank 1. As can be seen in FIGS. 6r to 6t, the fluidic connections 12 and 13 between the shifting container 6a and pressure storage tank 1 are then disconnected and a fluidic connection between the shifting containers 6a and 6b is established by switching valve 66, whereby the compressed unit gas 30 is expanded in shifting container 60*a* by displacing liquid into shifting container 60*b* in a controlled manner by means of displacement mechanism 61. The expanded gas in the shifting container 60*b* is fed through the fluidic connection 11 to the working machine 4 or directly to the gas sink 5. After the desired pressure level has been reached in the shifting container 60*a*, a fluidic connection 14 is established between the shifting container 60*b* and the collecting basin 7, among other things by switching valve 66, as shown in FIGS. 6*u* and 6*v*, in order to shift the quantity of liquid corresponding to the unit liquid 20 from the collecting basin 7 to the shifting container 60*b* by means of shifting mechanism 61. Then, as shown in FIGS. 6*w* and 6*x*, the fluidic connections 12 and 13 between the shifting container 60*b* and pressure storage tank 1 are established, among other things by switching valve 66, in order to take a unit of gas 30 from the pressure storage tank 1 by shifting a unit of liquid 20 from the shifting container 60*b* to the pressure storage tank 1 using shifting mechanism 61. Then, as shown in FIG. 6*y*, the gas 30 unit in the shifting container 60*b* is expanded in the same way as in FIGS. 6*r* to 6*t*. This process and the renewed withdrawal of a further unit of gas from pressure storage tank 1 and the expansion of this unit in the shifting container 60*a* will not be discussed in detail as this can be understood from the above explanations.

A multi-stage or serial arrangement makes sense in the operating modes "compression mode with post-compression" and "expansion mode with pre-expansion". The advantages of feeding compressed gas to the pressure storage tank 1 or withdrawing compressed gas from the pressure storage tank 1 by means of the shifting device 6 have been explained in the previous text. However, the same shifting process can also be applied between two different pressure stages within the shifting device 6. In the following it is being spoken of a first and second stage, whereby further stages can be added according to the same principle.

Figure 7A:
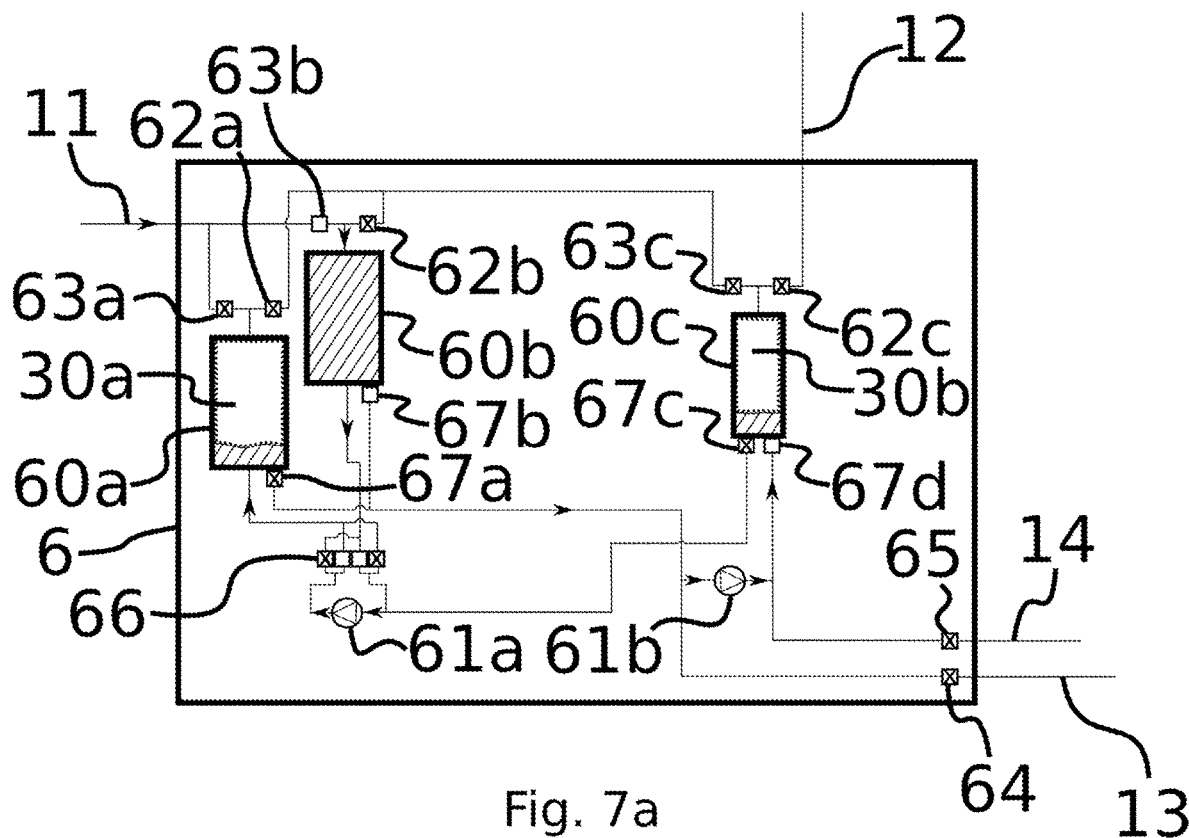
Figure 7B:
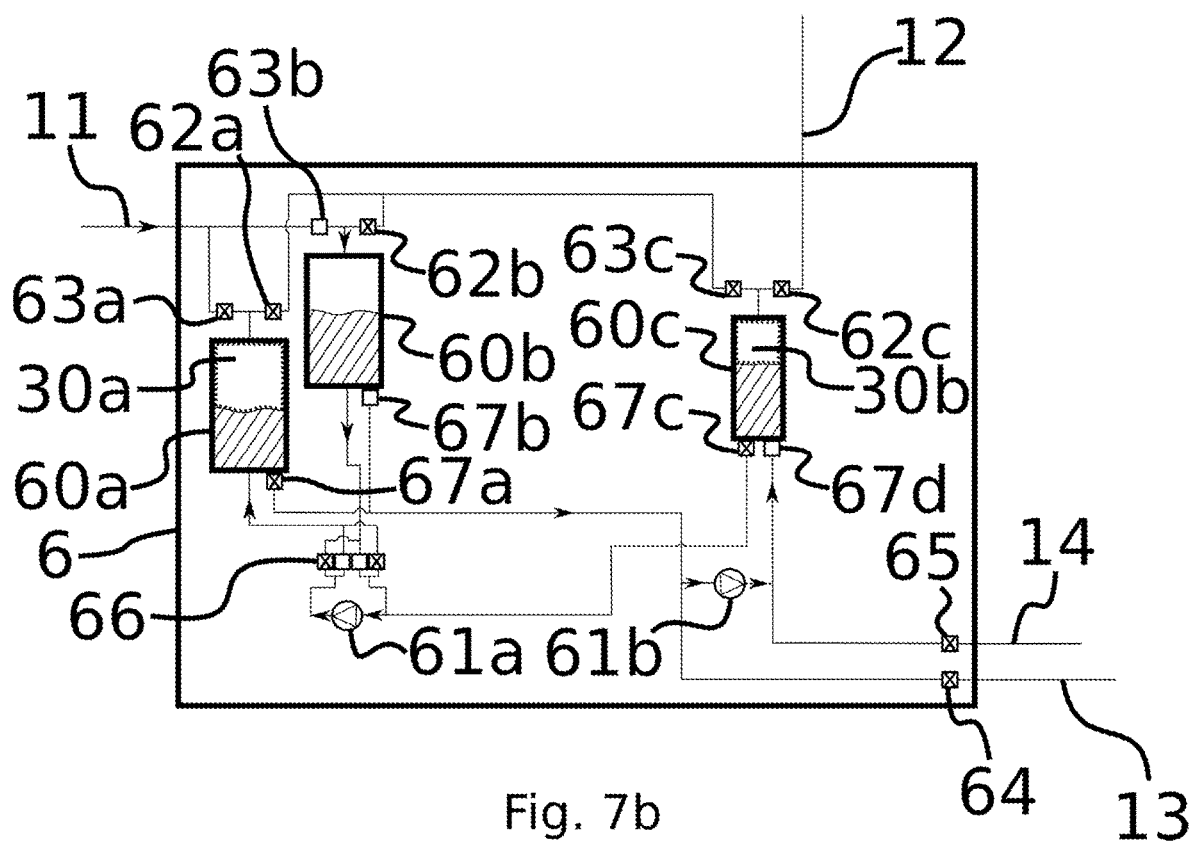
Figure 7C:
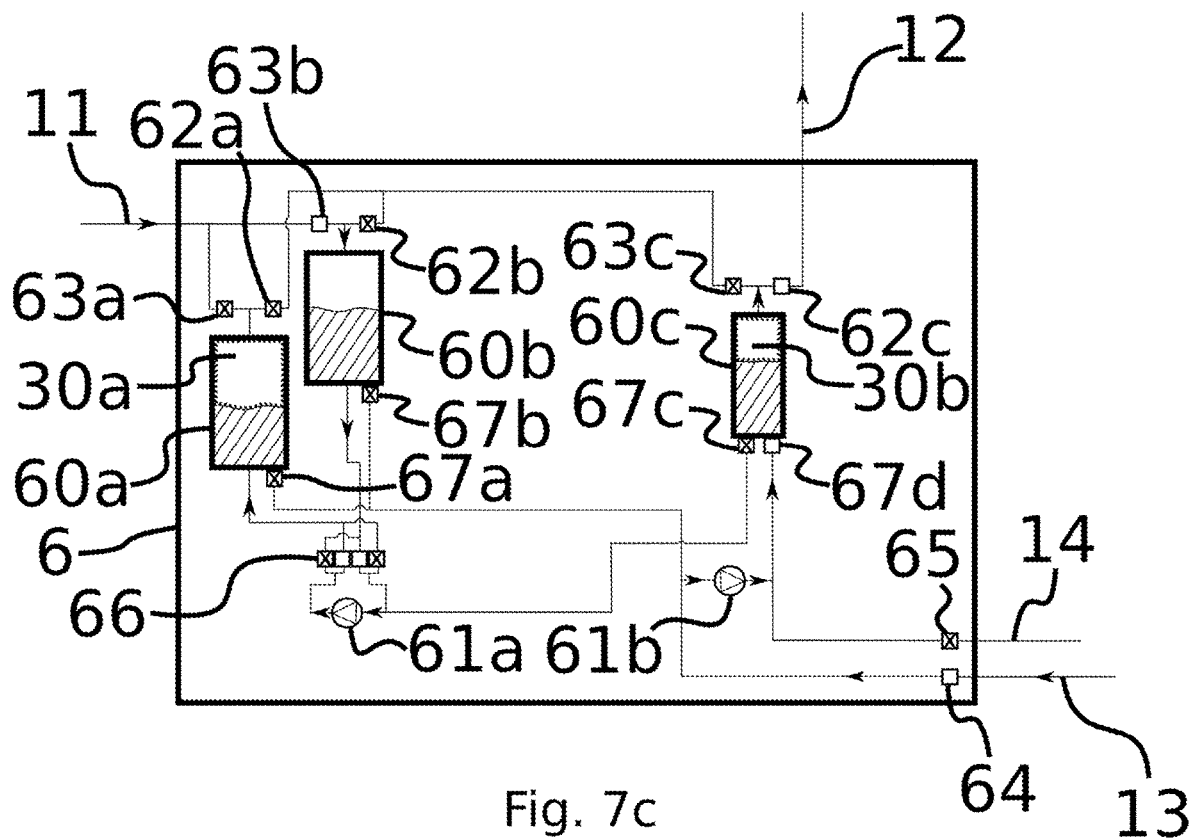
Figure 7D:
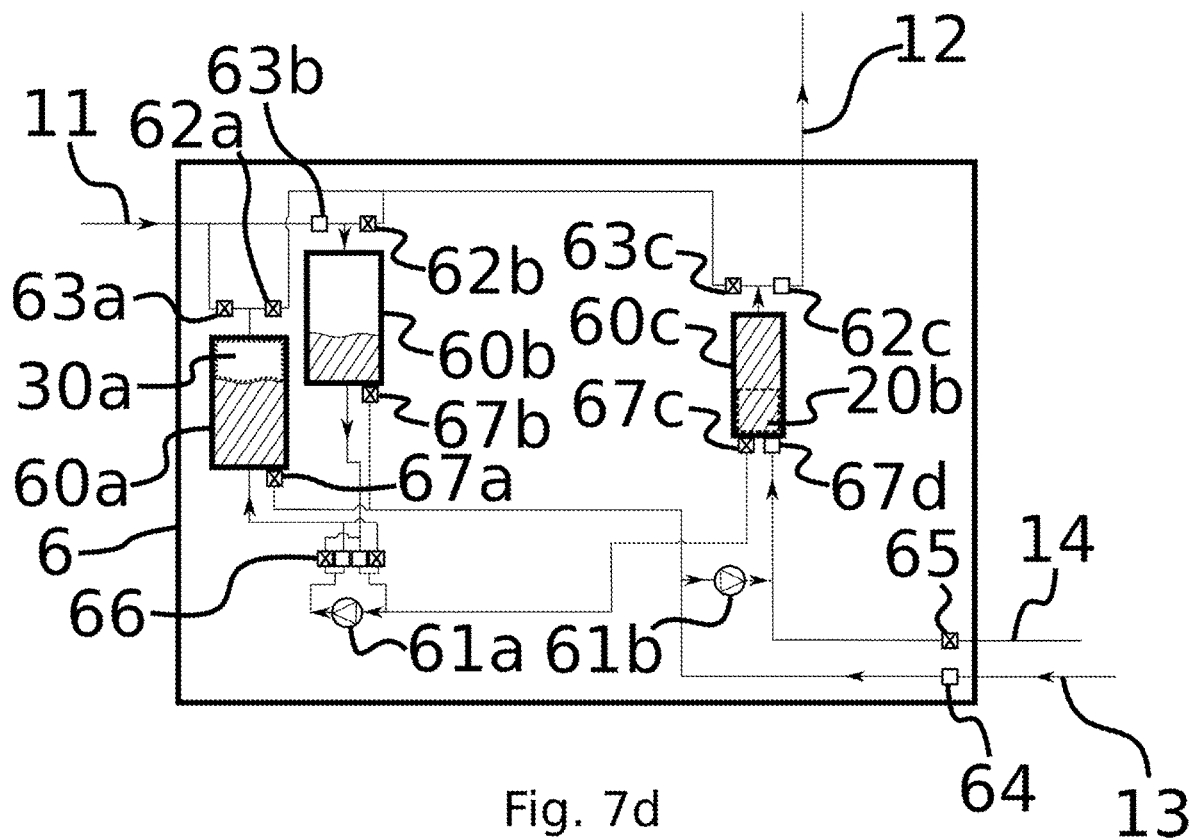
Figure 7E:
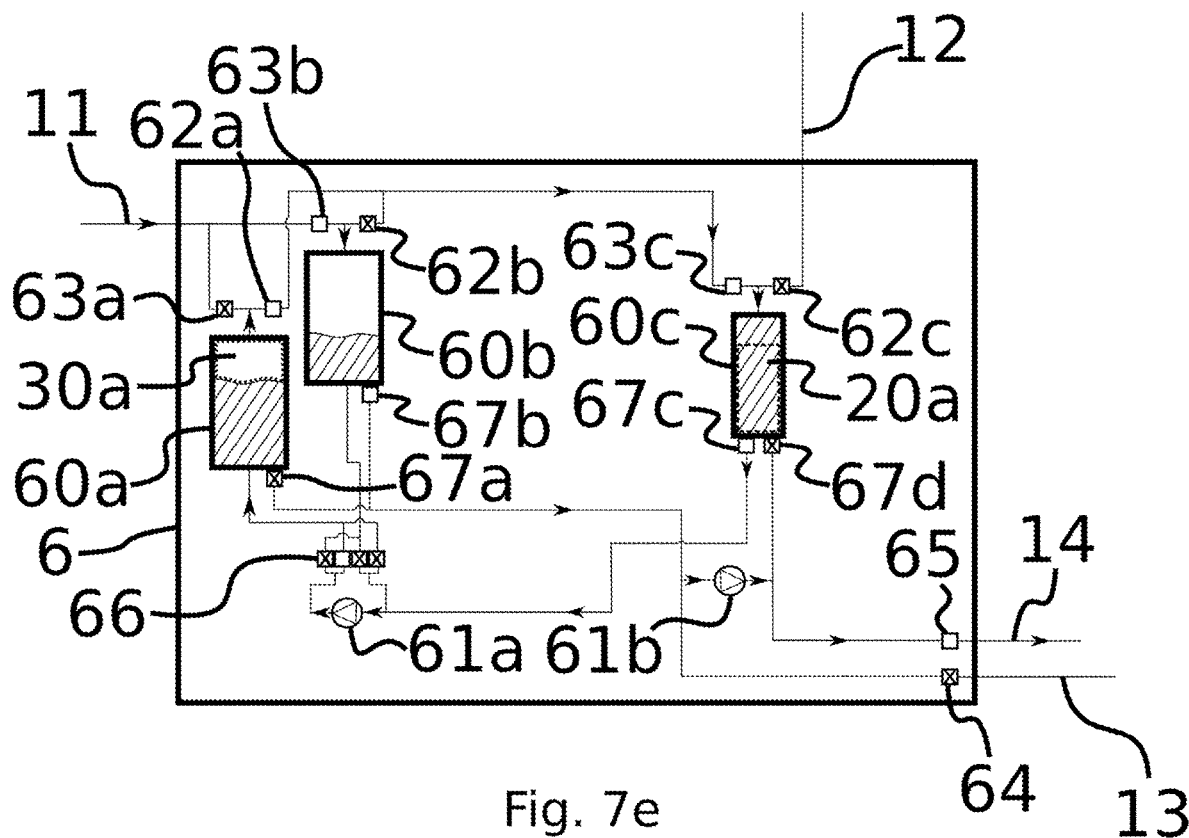
Figure 7F:
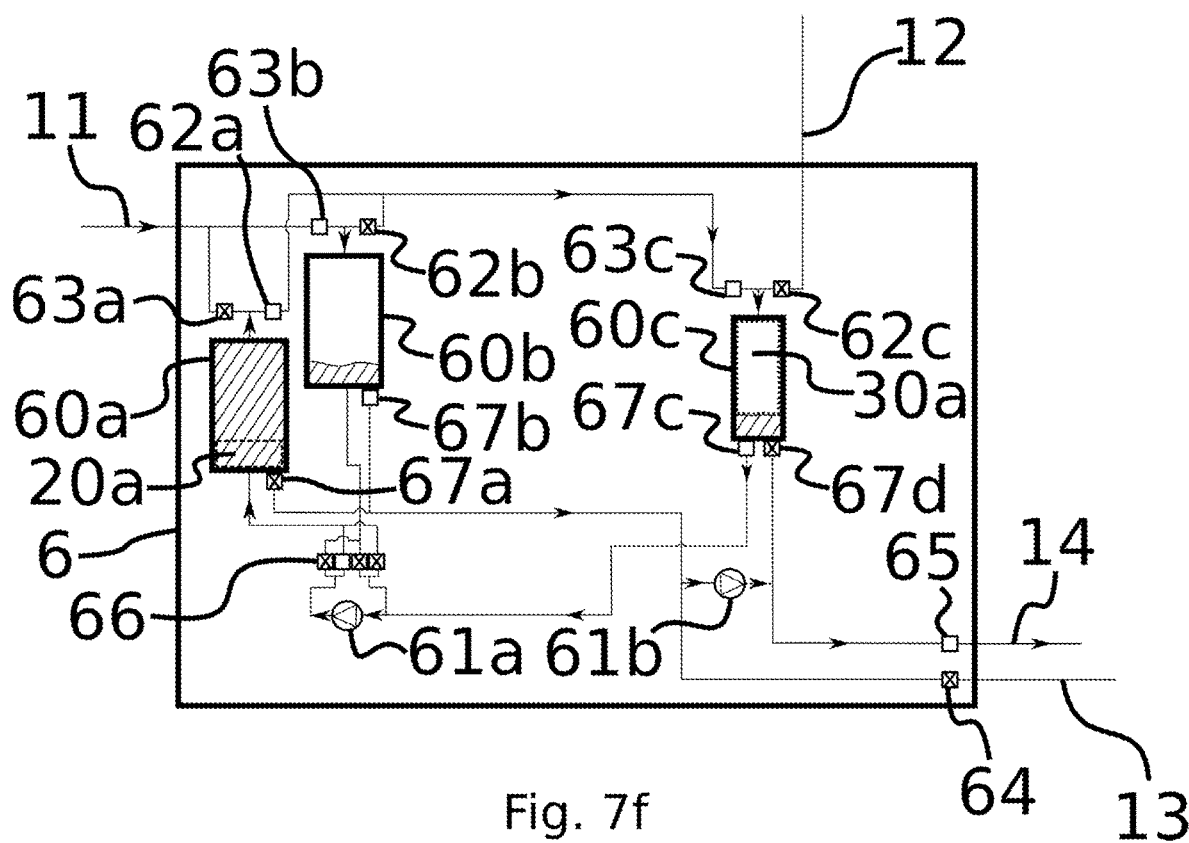
Figure 7G:
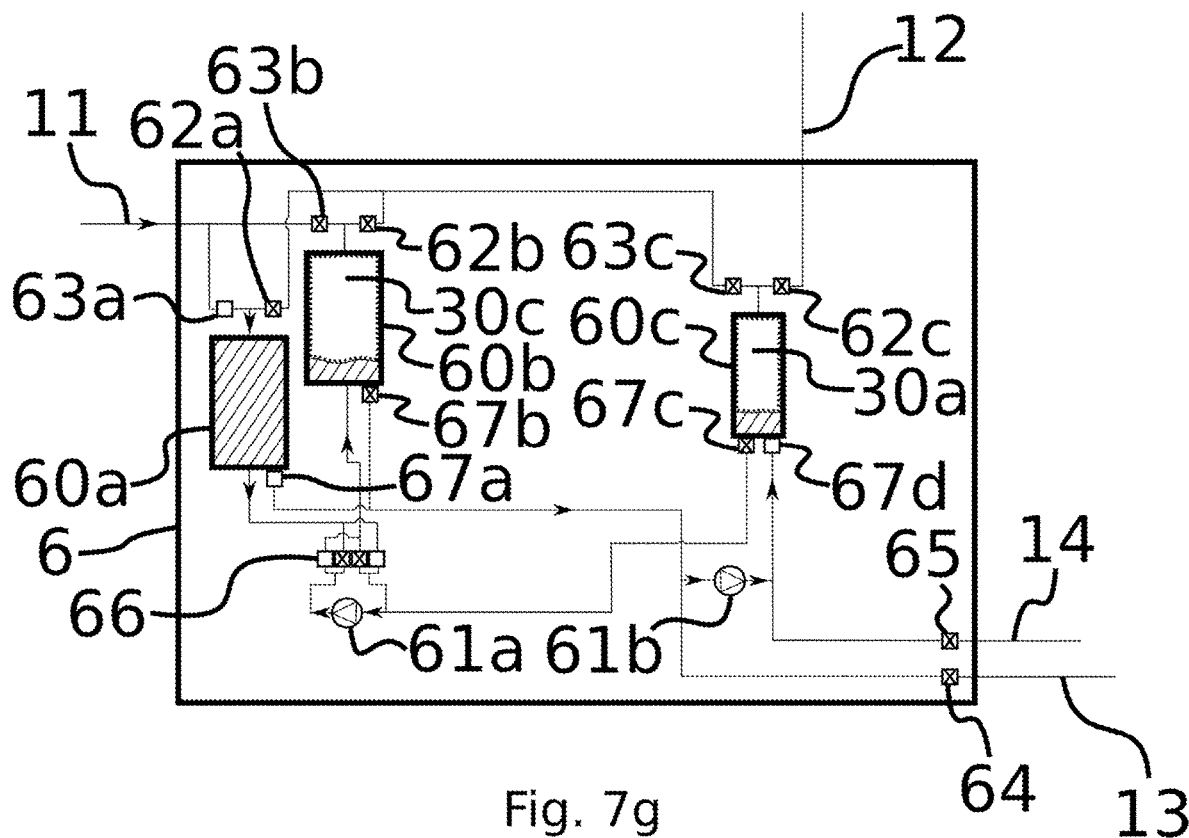
Figure 7H:
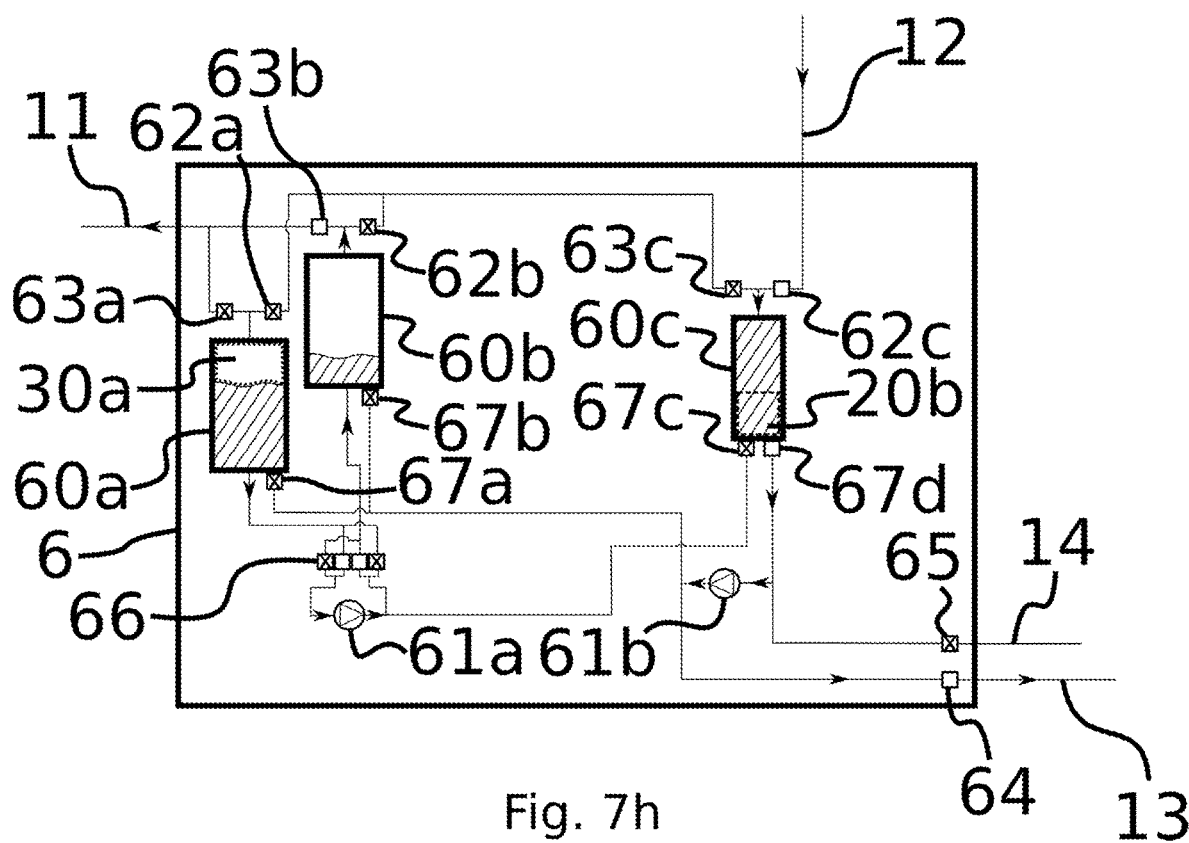
Figure 7I:
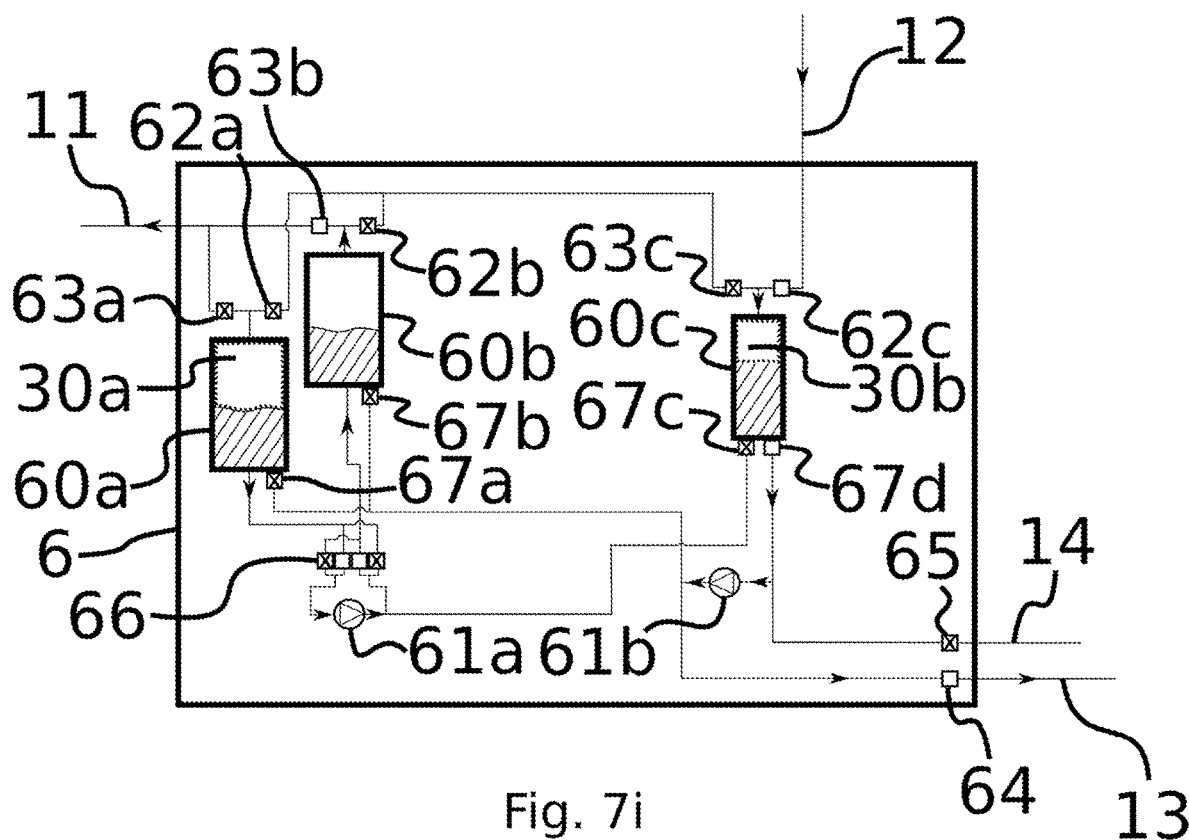
Figure 7J:
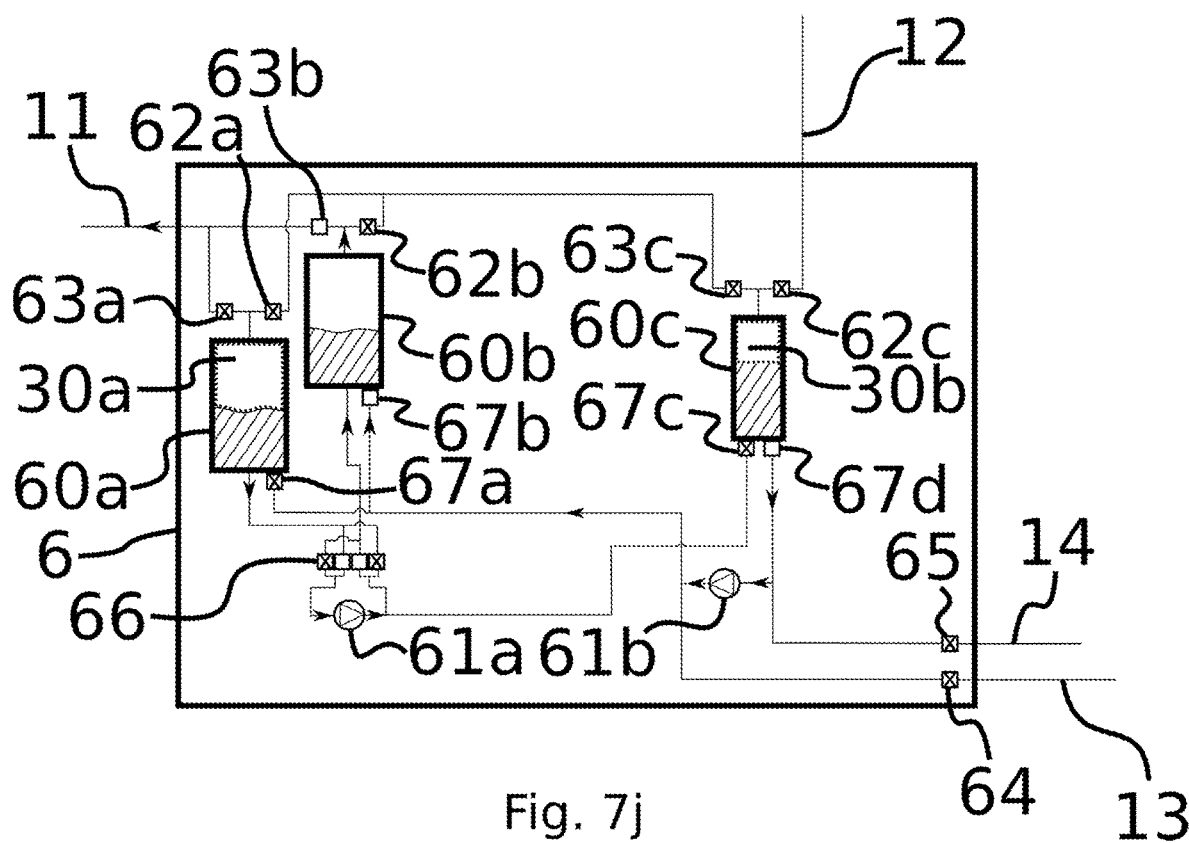
Figure 7K:
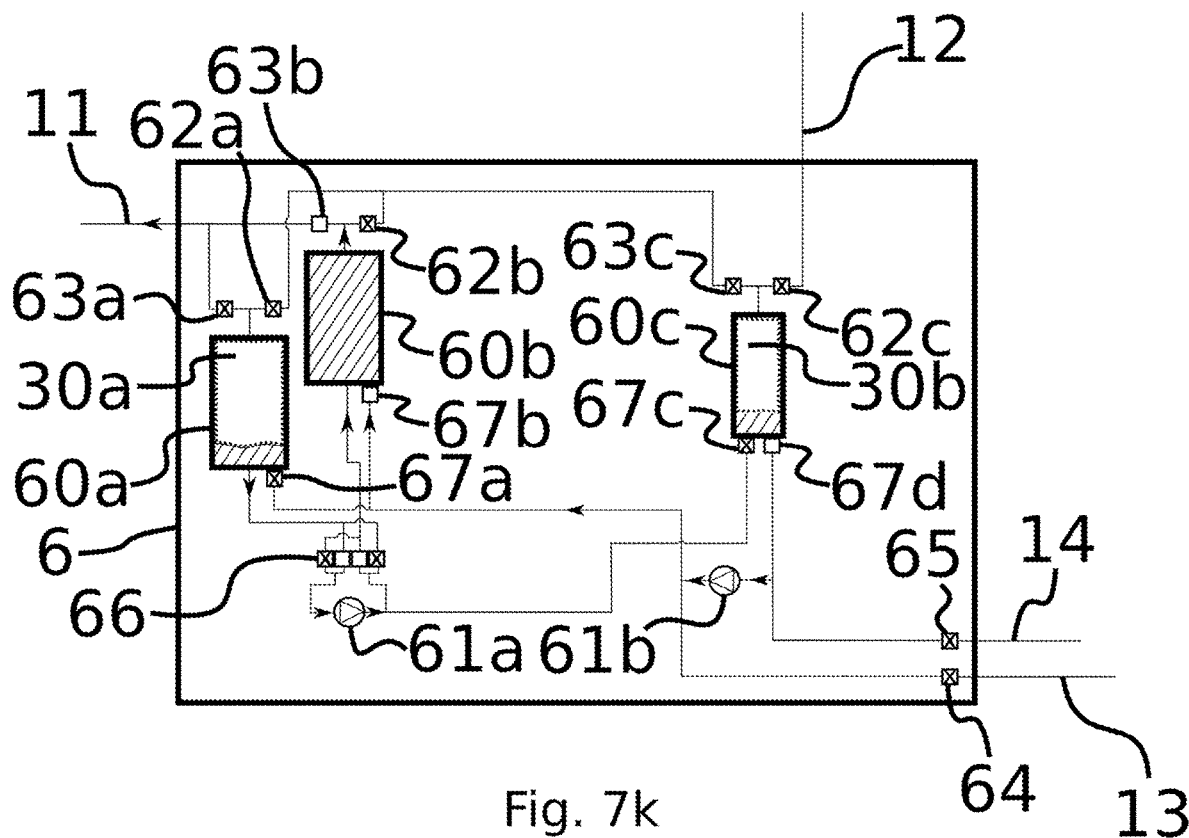
Figure 7L:
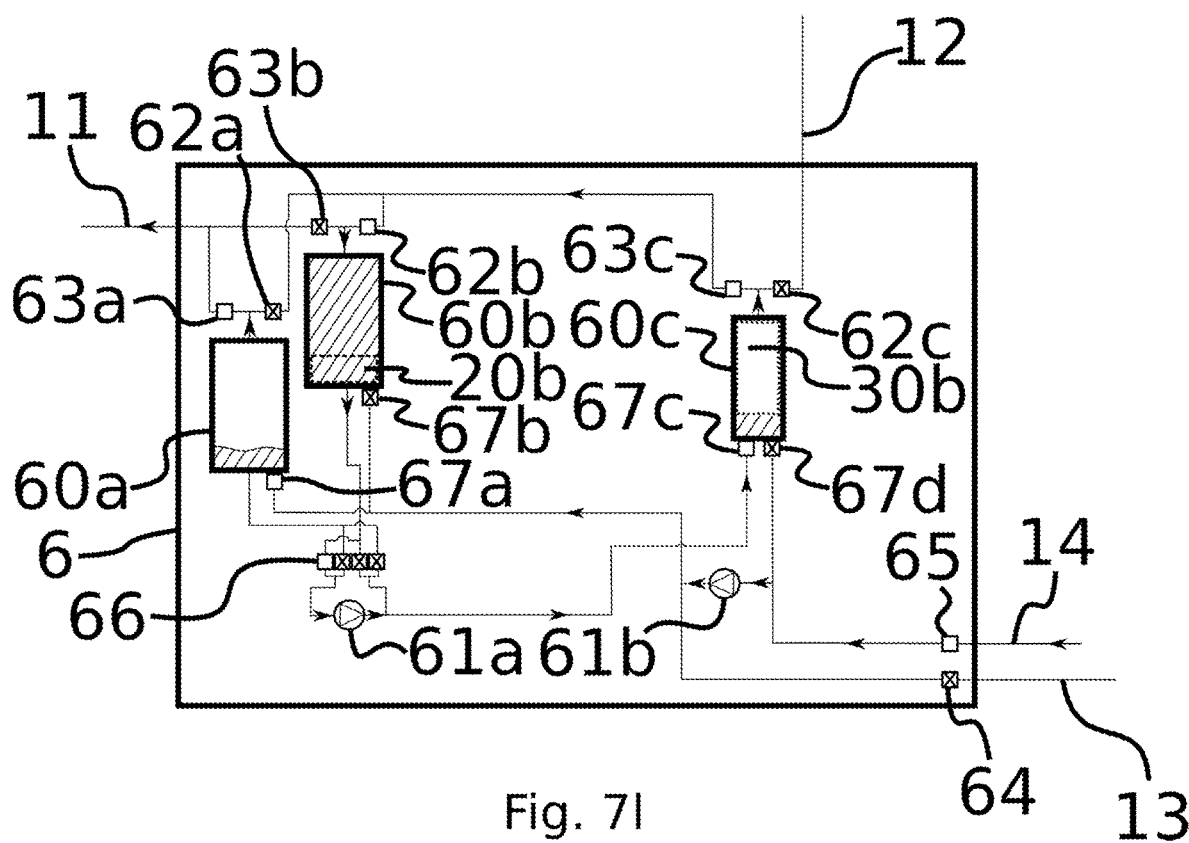
Figures 7M, 7N:
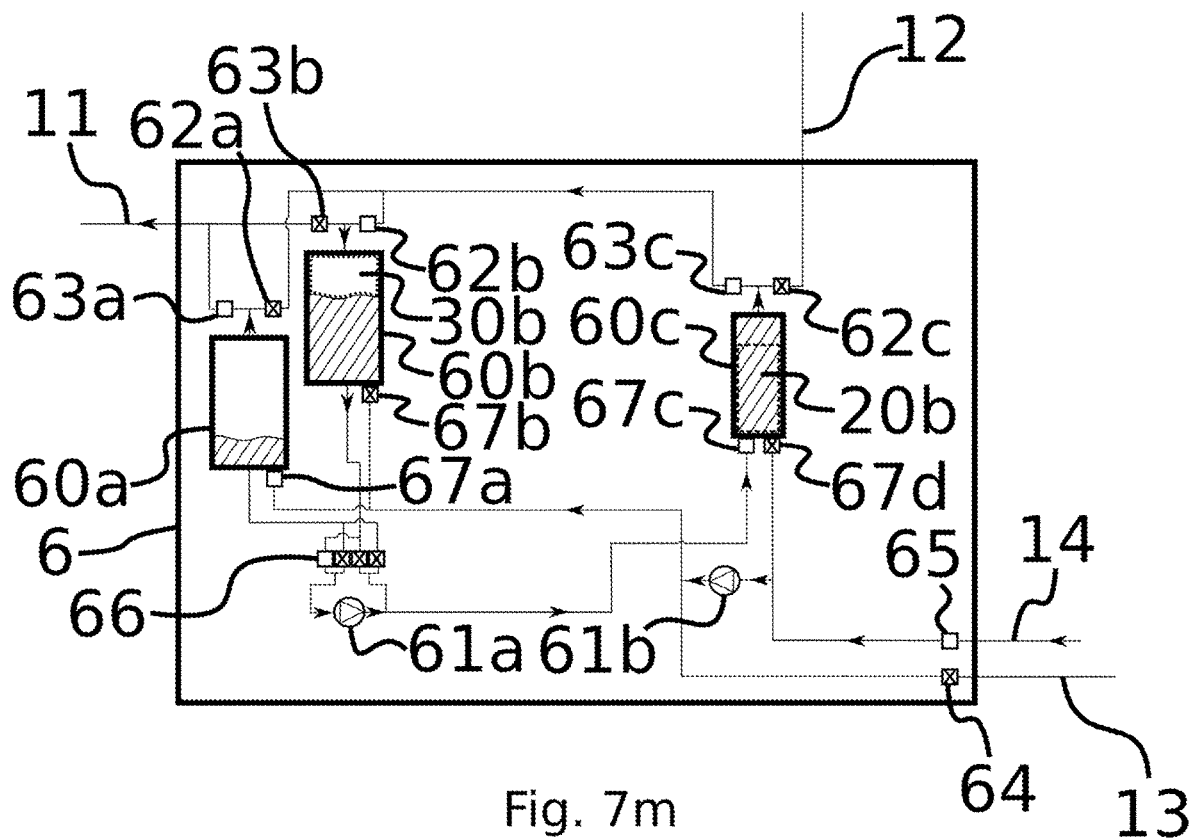

FIGS. 7 and 7*a* to 7*n* explain in more detail how the shifting device 6 works without showing the other components of the pressure storing system as shown in FIG. 1, since their function has not changed.

FIGS. 7 and 7*a* to 7*n* show a possible parallel and serial design of shifting containers and two liquid pumps 61*a* and 61*b* as shifting mechanisms, whereby the shifting process is applied between the second stage and pressure storage tank 1 but also between the first stage and the second stage. The first stage consists of two shifting containers 60*a* and 60*b*, a shifting mechanism 61*a* and the corresponding valves. The second stage therefore includes the shifting container 60*c*, the shifting mechanism 61*b* and the corresponding valves. On the gas side, the shifting mechanism can be connected to the working machine 4 or the gas source/sink 5 via fluidic connection 11 and to the pressure storage tank 1 via fluidic connection 12. On the liquid side, the shifting device 6 can be connected to the pressure storage tank 1 via fluidic connections 13 and to the collecting basin 7 via fluidic connection 14.

FIGS. 7*a* and 7*b* show the time sequence of the compression of a unit of gas 30*b* within the shifting container 60*c* by shifting liquid from the shifting container 60*b* into the shifting container 60*c* using the shifting mechanism 61*b*. At the same time, a unit of gas 30*a* is also compressed in the shifting container 60*a* by shifting liquid from shifting container 60*b* into shifting container 60*a* by means of shifting mechanism 61*a*. When the desired pressure level is reached in the shifting container 60*c*, the compressed unit gas 30*b* is shifted from the shifting container 60*c* to the pressure reservoir 1 as shown in FIGS. 7*c* and 7*d* by shifting a unit liquid 20 from the pressure storage tank 1 to the shifting container 60*c* using the shifting mechanism 61*b*. Meanwhile, the unit gas 30 a is further compressed in the shifting container 60*a* until the desired pressure level is reached. Then, as shown in FIGS. 7*e* and 7*f*, the compressed unit of gas 30*a* is moved into the shifting container 60*c* by shifting a unit of liquid 20*a* from the shifting container 60*c* into the shifting container 60*a* using the shifting mechanism 61*a*. At the same time, by means of the shifting mechanism 61*b*, the quantity of the unit of liquid 20 is correspondingly shifted from the shifting container 60*b* through the fluidic connection 14 into the collecting basin 7.

FIG. 7*g* shows the initial state of the shifting mechanism 6, in which the unit gas 30*a* is compressed in the shifting container 60*c* and introduced into the pressure storage tank, and another unit gas 30*c* is compressed in the shifting container 60*b* and then shifted into the shifting container 60*c*, analogous to the processes shown in FIGS. 7*a* to 7*f*.

FIGS. 7*h* to 7*n* show the time sequence for removing compressed gas 3 from the pressure storage tank 1 by means of the shifting device 6 and bringing it to a lower pressure level in the operating mode "Expansion mode with pre-expansion".

FIGS. 7*h* and 7*i* show the withdrawal of a unit of compressed gas 30*b* from the pressure storage tank 1 by moving a unit of liquid 20*b* from the shifting container 60*c* to pressure storage tank 1 by means of shifting device 6 and establishing fluid connections 12 and 13 between shifting device 6 and pressure storage tank 1. At the same time, a unit of gas 30*a* is expanded in the shifting container 60*a* by shifting liquid from the shifting container 60*a* to the shifting container 60*b* in a controlled manner by means of the shifting mechanism 61*a*. As shown in FIGS. 7*j* and 7*k*, the gas 30*a* unit in shifting container 60*a* is further expanded until the desired pressure level is reached. Meanwhile, the compressed gas unit 30*b*, which is located in shifting container 30*c*, is also expanded by moving liquid from shifting container 60*c* to shifting container 60*b* by means of shifting mechanism 61*b* until the desired pressure level is reached. Then, as shown in FIGS. 7*l* and 7*m*, the expanded gas 30*b* unit is moved from the shifting container 60*c* into the shifting container 60*b* by shifting a liquid 20*b* from the shifting container 60*b* into the shifting container 60*c* using the shifting mechanism 61*a*. FIG. 7*n* shows the initial state of the shifting device 6, which is followed by the expansion of the gas 30*b* unit in the shifting container 60*b*, but also by the further withdrawal of a gas unit from the pressure storage tank 1 and its shifting into the shifting container 60*c* by shifting the liquid 20*c* unit from the shifting container 60*c* into the pressure storage tank 1 by means of the shifting mechanism 61*b*, analogous to the processes shown in FIGS. 7*h* to 7*m*.

FIG. 8 shows a possible separating device 31 to separate liquid 2 and compressed gas 3 in pressure storage tank 1. The separator 31 is here exemplarily designed as a bubble, which can change its shape in order to adapt to the filling level of pressure storage tank 1. This function can of course also be performed by other types of separator, such as a piston. The separation of the liquid 2 from the gas 3 may be necessary to limit the amount of dissolved gas in the liquid or to allow any orientation of the pressure storage tank 1 without having to consider the direction of action of forces such as gravitational or buoyancy forces.

FIG. 9 shows a possible arrangement of a regenerator 69 and/or a heat exchanger 68 in a shifting container 60, which is used to remove heat which is removed from the gas in the shifting container 60 via the heat exchanger 68 and/or transferred to the liquid via the regenerator 69, or vice versa heat which is supplied via the heat exchanger 68 and/or transferred from the liquid via the regenerator 69 to the gas.

FIG. 10 shows an energy storage system as shown in FIG. 1, with the difference that the collecting basin 7 is connected to the working machine 4 by a fluidic connection 15 and can therefore be brought to any pressure level. If in the energy storage system only the shifting device 6 is used for compression or expansion of gas, without working machine 4, then the collecting basin 7 is connected to the shifting device 6 by means of the fluidic connection 15 in order to control the pressure level in the collecting basin 7.

FIG. 11 shows the combination of pressure containers 101, 102, . . . to a pressure storage tank 1. This arrangement increases the energy density of the pressure storing system by reducing the amount of liquid in comparison to the pressure storage tank volume.

The invention claimed is:

1. A method for managing a pressure storage system with at least one pressure storage tank, the method comprising:
   filling the pressure storage tank with compressed gas; and/or
   withdrawing compressed gas from the pressure storage tank,
   wherein the pressure storage tank is partially filled with liquid and the rest of the volume is filled with compressed gas, wherein the charging of the pressure storage tank with a unit of compressed gas is accompanied by the withdrawal of a unit of liquid from the pressure storage tank, whereby the withdrawn unit of liquid is being used to displace the unit of compressed gas into the pressure storage tank by means of a shifting device consisting of at least one shifting mechanism and at least one shifting container, or vice versa the withdrawal of a unit of compressed gas from the pressure storage tank is accompanied by the charging of the pressure storage tank with a unit of liquid, whereby the unit of liquid is being used to withdraw the unit of compressed gas from the pressure storage tank by means of the shifting device, whereby the shifting of compressed gas into or out of the pressure storage tank is performed at low power when required, which means that no height difference between the pressure storage tank and the shifting device is necessary, and no hermetically sealed gas cushion in the pressure storage tank and/or in the shifting device is necessary, and for the shifting of the unit of liquid only the overcoming of a pressure difference caused by friction and flow losses as well as a pressure difference caused by a possibly existing height difference is necessary.

2. The method for operating a pressure storage system according to claim 1, wherein a working machine is used to compress gas using mechanical energy or vice versa to expand compressed gas by releasing mechanical energy which is provided or absorbed by a drive or output correspondingly, and wherein this working machine is fluidically connected to a gas source/sink, wherein from the shifting device on the side of the gas when required a fluidic connection to the working machine and/or the pressure storage tank is established and that on the side of the liquid when required a fluidic connection to the pressure storage tank and/or to the collecting basin is established by opening of respective valves in order to enable the shifting of liquid between the shifting device and the pressure storage tank or the collecting basin and in order to enable the shifting of gas between the shifting device and the pressure storage tank or the working machine at the same time.

3. The method for managing a pressure storage system according to claim 2, wherein the shifting device is operated inter alia with several, separate and/or combined shifting containers, which are mechanically or fluidically connected to one another and are arranged in parallel and/or serially.

4. The method for managing a pressure storage system according to claim 2, wherein the shifting device is used for compressing gas or expanding gas, respectively, by selectively shifting liquid between the shifting device and the pressure storage tank, the collecting basin or within the shifting device itself, i.e. between shifting containers.

5. The method for managing a pressure storage system according to claim 2, wherein liquid which is located within the shifting device, the pressure storage tank or the collecting basin is used as heat transfer medium and/or heat storage medium in order to supply or remove heat to or from the gas before, during and/or after the compression or expansion of gas, within a shifting container.

6. The method of managing a pressure storage system according to claim 2, wherein the heat exchange between the gas and the liquid within the shifting containers is increased by means of a regenerator to transfer heat from the gas to the liquid or to transfer heat from the liquid to the gas.

7. The method for managing a pressure storage system according to claim 2, wherein the pressure storage tank consists of at least two separate pressure containers and during the charging of the first pressure container with compressed gas, the liquid is displaced into a second pressure container, which is charged with compressed gas after the first pressure container has been charged, and the liquid is only displaced into the collecting basin during the charging of the last pressure container, wherein the procedure is the same when removing compressed gas from the pressure storage tank, in that the individual pressure containers are emptied one after the other.

8. A system for operating a pressure storage system, the system comprising:
   at least one pressure storage tank,
   a collecting basin both partly filled with a liquid and partly filled with gas, a working machine for converting compressed gas into mechanical energy and vice versa, connected to a gas source/sink,
   wherein a shifting device is present, with fluidic connections on the liquid side to the pressure storage tank and to the collecting basin and with fluidic connections on the gas side to the working machine and to the pressure storage tank, wherein the shifting device comprises at least one separate or combined shifting container, and valves for selectively shutting off one or more of the fluidic connections for gas or liquid, wherein no height difference between the pressure storage tank, the shifting device and/or the collecting basin is necessary, and wherein no hermetically sealed gas cushion in the pressure storage tank, in the shifting device and/or in the collecting basin is necessary, and wherein, in the case of the shifting compressed gas into or out of the pressure storage tank for the shifting of liquid, only the overcoming of a pressure difference caused by friction and flow losses as well as of a pressure difference caused by a possibly existing height difference is necessary.

9. The system for operating a pressure storage system according to claim 8, wherein the pressure storage system includes at least the following components:
   the pressure storage tank, partially filled with liquid and compressed gas, whereby these two media being openly adjacent to each other or separated from each other by a suitable separating device, namely by means of a bladder, piston or membrane, and a collecting basin,
a shifting device, consisting of at least one separate or combined shifting container, wherein the media contained therein being openly adjacent to each other or separated from each other by a suitable separating device in the form of a bladder, a piston or a membrane, and a shifting mechanism for the displacement of liquid within the shifting device, i.e. between shifting containers and/or between the shifting device and the pressure storage tank or the collecting basin,
a fluidic connection between the shifting device and the pressure storage tank for the at low power when required displacement of fluid between the shifting device and the pressure storage tank,
a fluidic connection between the shifting device and the collecting basin for the at low power when required displacement of fluid between the shifting device and the collecting basin,
a fluidic connection between the shifting device and the pressure storage tank for the at low power when required displacement of gas between the shifting device and the pressure storage tank,
a fluidic connection between the shifting device and the working machine and/or the gas source/sink for the at low power when required displacement of gas between the shifting device and the working machine and/or the gas source/sink,
controllable valves to define the flow directions of the fluid and gas during operation,
a working machine, for compressing and/or expanding gas,
an input/output drive for converting energy from any form of energy into mechanical energy in order to drive the working machine and, if necessary, the shifting mechanism or vice versa, suitable for receiving mechanical energy from the working machine and, if necessary, from the shifting mechanism and for converting and outputting it in any form of energy.

10. The system for operating a pressure storage system according to claim 9, wherein the shifting mechanism is integrated into the working machine or combined with the working machine or replaces it or forms one to several stages of it.

11. The system for operating a pressure storage system according to claim 9, wherein the shifting mechanism has a separate drive/output or is coupled to the drive/output of the working machine and consists of a piston or a pump.

\* \* \* \* \*